US011816745B2

(12) United States Patent
Hernblad

(10) Patent No.: US 11,816,745 B2
(45) Date of Patent: Nov. 14, 2023

(54) CUSTOMER-BASED WIRELESS FOOD ORDERING AND PAYMENT SYSTEM AND METHOD

(71) Applicant: Konrad Hernblad, Philadelphia, PA (US)

(72) Inventor: Konrad Hernblad, Philadelphia, PA (US)

( * ) Notice: Subject to any disclaimer, the term of this patent is extended or adjusted under 35 U.S.C. 154(b) by 407 days.

(21) Appl. No.: 16/917,457

(22) Filed: Jun. 30, 2020

(65) Prior Publication Data

US 2021/0090187 A1   Mar. 25, 2021

Related U.S. Application Data

(63) Continuation-in-part of application No. 14/201,614, filed on Mar. 7, 2014, now abandoned, which is a
(Continued)

(51) Int. Cl.
*G06Q 50/12* (2012.01)
*G06Q 20/32* (2012.01)
(Continued)

(52) U.S. Cl.
CPC ........... *G06Q 50/12* (2013.01); *G06F 3/0482* (2013.01); *G06Q 10/02* (2013.01); *G06Q 20/047* (2020.05);
(Continued)

(58) Field of Classification Search
CPC ........... G06Q 30/0635; G06Q 30/0605; G06Q 20/29; G06Q 20/202; G06Q 10/107;
(Continued)

(56) References Cited

U.S. PATENT DOCUMENTS 5,235,509 A * 8/1993 Mueller ................. G07G 3/003
705/25
6,973,437 B1 * 12/2005 Olewicz ................ G06Q 50/12
705/15
(Continued)

FOREIGN PATENT DOCUMENTS

JP      2002133234 A *   5/2002
JP      2003256742 A *   9/2003
WO   WO-2004036494 A1 * 4/2004 ............. G06Q 20/28

OTHER PUBLICATIONS

Beldona, Srikanth, Nadria Buchanan, and Brian L. Miller. "Exploring the Promise of e-Tablet Restaurant Menus." International journal of contemporary hospitality management 26.3 (2014): 367-382. Web. (Year: 2014).*

*Primary Examiner* — Ashford S Hayles
(74) *Attorney, Agent, or Firm* — Charles McCloskey

(57) ABSTRACT

An interactive system and method allows customers to electronically place and pay for menu orders without wait staff intervention at food service establishments and which processes orders. The invention has at least one ordering device with data input, a display, and wireless communications, and one or more computer servers for processing menu orders and payments. The ordering devices and computer servers cooperatively utilize means for adding a menu item to an order from a list or entering a code; means for wirelessly transmitting orders to food preparation areas; means on a terminal and a mobile device to use cashless payment mediums; means for identifying the dining party leader; means for consolidating a customer's reward points; means for offering discounts and accepting coupons; means for pre-ordering menu items; means for reserving seating; means for accessing the internet from a terminal; and means for splitting orders for batch processing.

18 Claims, 78 Drawing Sheets

Related U.S. Application Data continuation-in-part of application No. 10/244,092, filed on Sep. 13, 2002, now abandoned.

(60) Provisional application No. 60/354,884, filed on Feb. 6, 2002.

(51) Int. Cl.
| | |
|---|---|
| *G06F 3/0482* | (2013.01) |
| *G06Q 20/04* | (2012.01) |
| *G06Q 10/02* | (2012.01) |
| *G06Q 30/0601* | (2023.01) |
| *G06Q 30/06* | (2012.01) |

(52) U.S. Cl.
CPC ....... *G06Q 20/325* (2013.01); *G06Q 20/3223* (2013.01); *G06Q 30/0635* (2013.01)

(58) Field of Classification Search
CPC .......... G06Q 20/3224; G06Q 30/0269; G06Q 30/0633; G06Q 50/12; G06Q 50/01; G06Q 30/0255; G06Q 30/0201; G06Q 30/06

See application file for complete search history.

(56) References Cited

U.S. PATENT DOCUMENTS

| | | | | |
|---|---|---|---|---|
| 7,953,873 | B1* | 5/2011 | Madurzak | G06Q 30/02 709/229 |
| 8,355,955 | B1* | 1/2013 | Mirchandani | G06Q 30/0255 705/26.1 |
| 9,269,103 | B1* | 2/2016 | Kumar | H04W 4/80 |
| 2002/0055878 | A1* | 5/2002 | Burton | G06Q 30/0643 705/27.2 |
| 2002/0147647 | A1* | 10/2002 | Ragsdale-Elliott | G06Q 50/12 705/15 |
| 2003/0078793 | A1* | 4/2003 | Toth | G06Q 30/02 705/15 |
| 2004/0148228 | A1* | 7/2004 | Kwei | G06Q 30/0623 705/26.4 |
| 2004/0210621 | A1* | 10/2004 | Antonellis | G06Q 10/087 709/200 |
| 2005/0096997 | A1* | 5/2005 | Jain | G06Q 30/0601 705/26.1 |
| 2005/0177427 | A1* | 8/2005 | Mount | G06Q 30/0238 705/14.38 |
| 2005/0216300 | A1* | 9/2005 | Appelman | G06Q 30/0601 705/26.1 |
| 2006/0053061 | A1* | 3/2006 | Evans | G06Q 30/06 705/15 |
| 2006/0178943 | A1* | 8/2006 | Rollinson | G06Q 30/0601 705/26.1 |
| 2006/0206390 | A1* | 9/2006 | Asano | G06Q 20/326 705/26.1 |
| 2006/0218057 | A1* | 9/2006 | Fitzpatrick | G06Q 10/04 705/28 |
| 2007/0061209 | A1* | 3/2007 | Jackson | G07G 1/00 705/15 |
| 2007/0088624 | A1* | 4/2007 | Vaughn | G06Q 30/02 705/26.81 |
| 2007/0203801 | A1* | 8/2007 | Istfan | G06Q 50/12 705/26.1 |
| 2008/0172460 | A1* | 7/2008 | Anderson | G06Q 10/10 709/204 |
| 2008/0294607 | A1* | 11/2008 | Partovi | G06Q 30/00 |
| 2009/0031232 | A1* | 1/2009 | Brezina | H04M 15/745 715/764 |
| 2009/0119168 | A1* | 5/2009 | Otto | G06Q 30/0601 705/26.1 |
| 2009/0150193 | A1* | 6/2009 | Hong | G06Q 30/0601 705/26.1 |
| 2009/0167553 | A1* | 7/2009 | Hong | G06Q 10/06 340/4.61 |
| 2009/0216646 | A1* | 8/2009 | Seven | G06Q 30/0258 705/14.17 |
| 2009/0259718 | A1* | 10/2009 | O'Sullivan | G06Q 10/10 709/204 |
| 2009/0288012 | A1* | 11/2009 | Hertel | G06Q 20/105 715/769 |
| 2009/0319314 | A1* | 12/2009 | Good | G06Q 20/10 715/752 |
| 2010/0125490 | A1* | 5/2010 | Kiciman | G06Q 30/0207 705/14.1 |
| 2010/0161432 | A1* | 6/2010 | Kumanov | G06Q 20/102 705/40 |
| 2010/0169161 | A1* | 7/2010 | Sacco | G06Q 10/107 705/14.66 |
| 2010/0241707 | A1* | 9/2010 | Burton | G06Q 30/06 709/203 |
| 2010/0312649 | A1* | 12/2010 | Lurie | G06Q 30/0269 705/14.66 |
| 2010/0324996 | A1* | 12/2010 | Kim | G06Q 30/02 705/14.66 |
| 2011/0029363 | A1* | 2/2011 | Gillenson | G06Q 30/0231 705/14.15 |
| 2011/0040655 | A1* | 2/2011 | Hendrickson | H04L 67/52 705/26.1 |
| 2011/0106664 | A1* | 5/2011 | Landau | G06Q 40/12 705/26.1 |
| 2011/0125550 | A1* | 5/2011 | Erhart | H04W 4/21 705/7.29 |
| 2011/0125566 | A1* | 5/2011 | McLaughlin | G06Q 30/06 705/16 |
| 2011/0218867 | A1* | 9/2011 | Cerrato | G06Q 50/12 705/15 |
| 2011/0246287 | A1* | 10/2011 | Wright | G06Q 30/00 705/14.45 |
| 2011/0258058 | A1* | 10/2011 | Carroll | G06Q 30/06 705/15 |
| 2011/0270662 | A1* | 11/2011 | Rocco | G06Q 50/12 705/14.27 |
| 2011/0282734 | A1* | 11/2011 | Zu | G06Q 30/02 705/14.49 |
| 2011/0289433 | A1* | 11/2011 | Whalin | H04L 51/52 715/753 |
| 2011/0313897 | A1* | 12/2011 | Mulakaluri | G06Q 40/12 705/30 |
| 2011/0320250 | A1* | 12/2011 | Gemmell | G06Q 30/02 705/14.1 |
| 2012/0036028 | A1* | 2/2012 | Webb | G06Q 50/12 705/15 |
| 2012/0054002 | A1* | 3/2012 | Rotbard | G06Q 30/0217 705/16 |
| 2012/0072855 | A1* | 3/2012 | Baldwin | H04L 51/043 715/752 |
| 2012/0116915 | A1* | 5/2012 | Zheng | G06Q 50/01 705/26.7 |
| 2012/0143753 | A1* | 6/2012 | Gonzalez | G06Q 20/12 705/41 |
| 2012/0158589 | A1* | 6/2012 | Katzin | G06Q 20/22 705/44 |
| 2012/0191522 | A1* | 7/2012 | McLaughlin | G06Q 50/01 705/26.8 |
| 2012/0203619 | A1* | 8/2012 | Lutnick | G06Q 30/02 705/14.1 |
| 2012/0226614 | A1* | 9/2012 | Gura | G06Q 30/0605 705/44 |
| 2012/0232974 | A1* | 9/2012 | Castiglione | G06Q 30/0215 705/14.21 |
| 2012/0239494 | A1* | 9/2012 | Hu | G06Q 30/0207 705/14.49 |
| 2012/0239683 | A1* | 9/2012 | Starkman | G06F 16/9535 707/769 |
| 2012/0246004 | A1* | 9/2012 | Book | G06Q 30/02 705/347 |

(56) References Cited

U.S. PATENT DOCUMENTS

| | | | | |
|---|---|---|---|---|
| 2012/0278064 A1* | 11/2012 | Leary | G06F 40/253 | 704/9 |
| 2012/0303425 A1* | 11/2012 | Katzin | G06Q 20/4016 | 705/16 |
| 2012/0310747 A1* | 12/2012 | Calabria | G06Q 30/0631 | 705/14.67 |
| 2013/0006733 A1* | 1/2013 | Fisher | G06Q 50/01 | 705/14.12 |
| 2013/0046610 A1* | 2/2013 | Abraham | G06Q 30/00 | 705/14.1 |
| 2013/0090959 A1* | 4/2013 | Kvamme | G06Q 10/02 | 705/5 |
| 2013/0110641 A1* | 5/2013 | Ormont | G06Q 50/01 | 705/14.66 |
| 2013/0124314 A1* | 5/2013 | Navar | G06Q 30/0251 | 705/14.66 |
| 2013/0151357 A1* | 6/2013 | Havas | G06Q 50/12 | 705/15 |
| 2013/0179268 A1* | 7/2013 | Hu | G06Q 50/01 | 705/14.66 |
| 2013/0226651 A1* | 8/2013 | Napper | G06Q 20/12 | 701/527 |
| 2013/0332527 A1* | 12/2013 | Du | G06Q 30/0605 | 709/204 |
| 2014/0058902 A1* | 2/2014 | Taylor | G06Q 30/0635 | 705/26.81 |
| 2014/0074743 A1* | 3/2014 | Rademaker | G06Q 30/0601 | 705/334 |
| 2014/0214465 A1* | 7/2014 | L'Heureux | G06Q 10/08 | 705/7.13 |
| 2015/0170099 A1* | 6/2015 | Beach-Drummond | G06Q 30/0603 | 705/26.81 |
| 2015/0262121 A1* | 9/2015 | Riel-Dalpe | G06Q 50/12 | 705/15 |
| 2016/0034845 A1* | 2/2016 | Hiyama | G06Q 30/0633 | 705/7.15 |
| 2016/0364678 A1* | 12/2016 | Cao | G06Q 10/083 | |
| 2017/0138749 A1* | 5/2017 | Pan | G01C 21/3438 | |

* cited by examiner

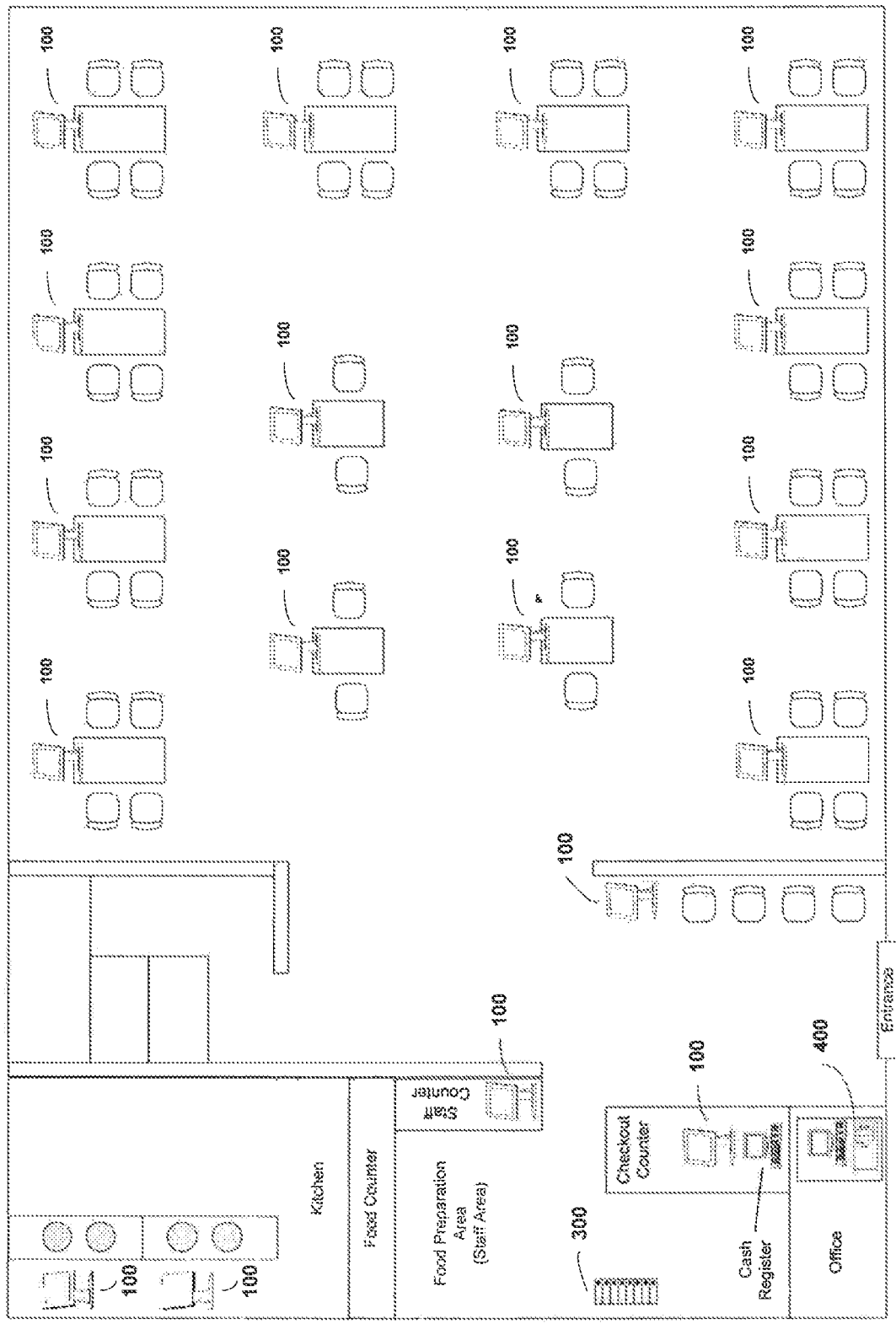
FIG. 1.1

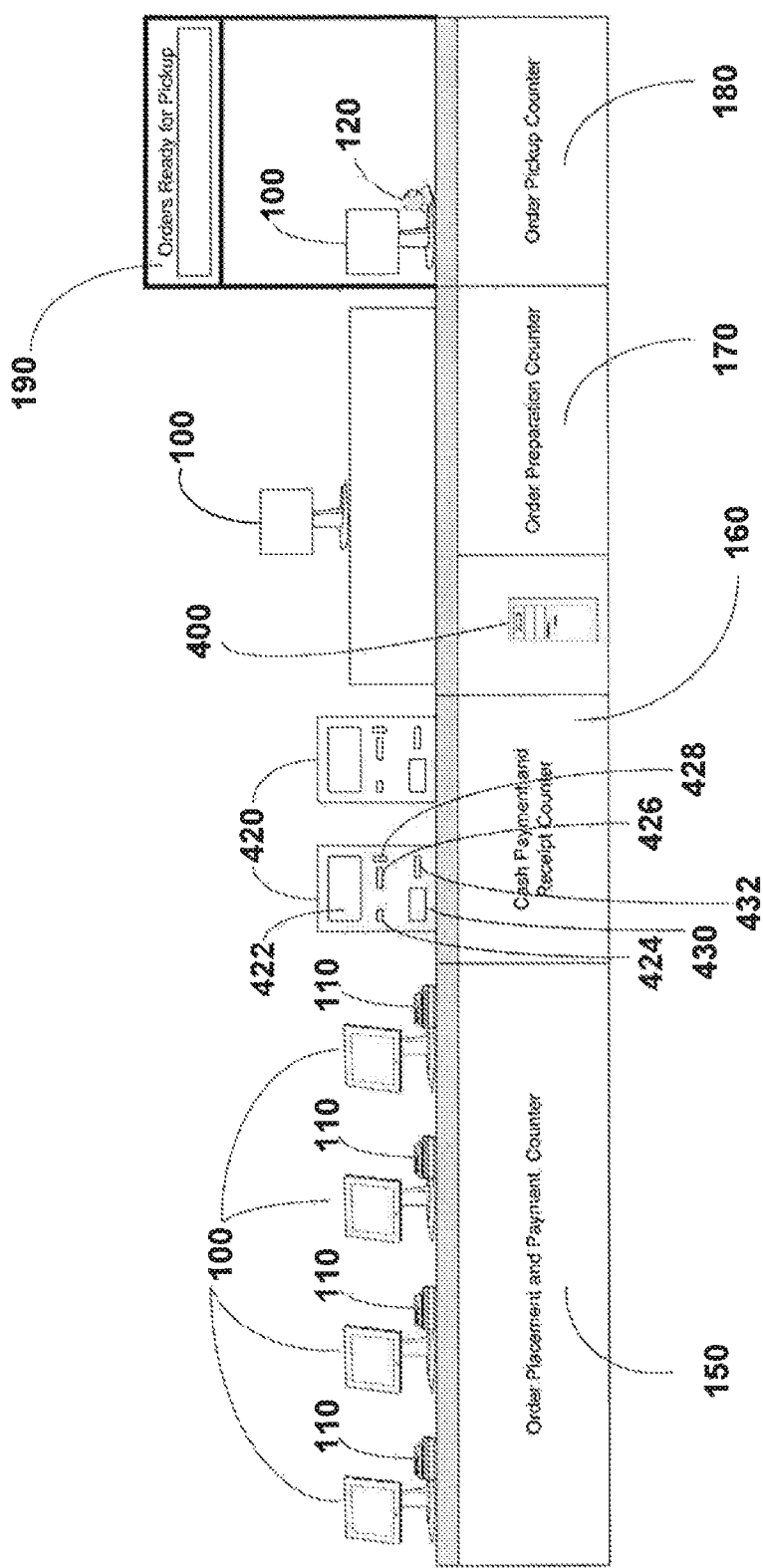
FIG. 1.2

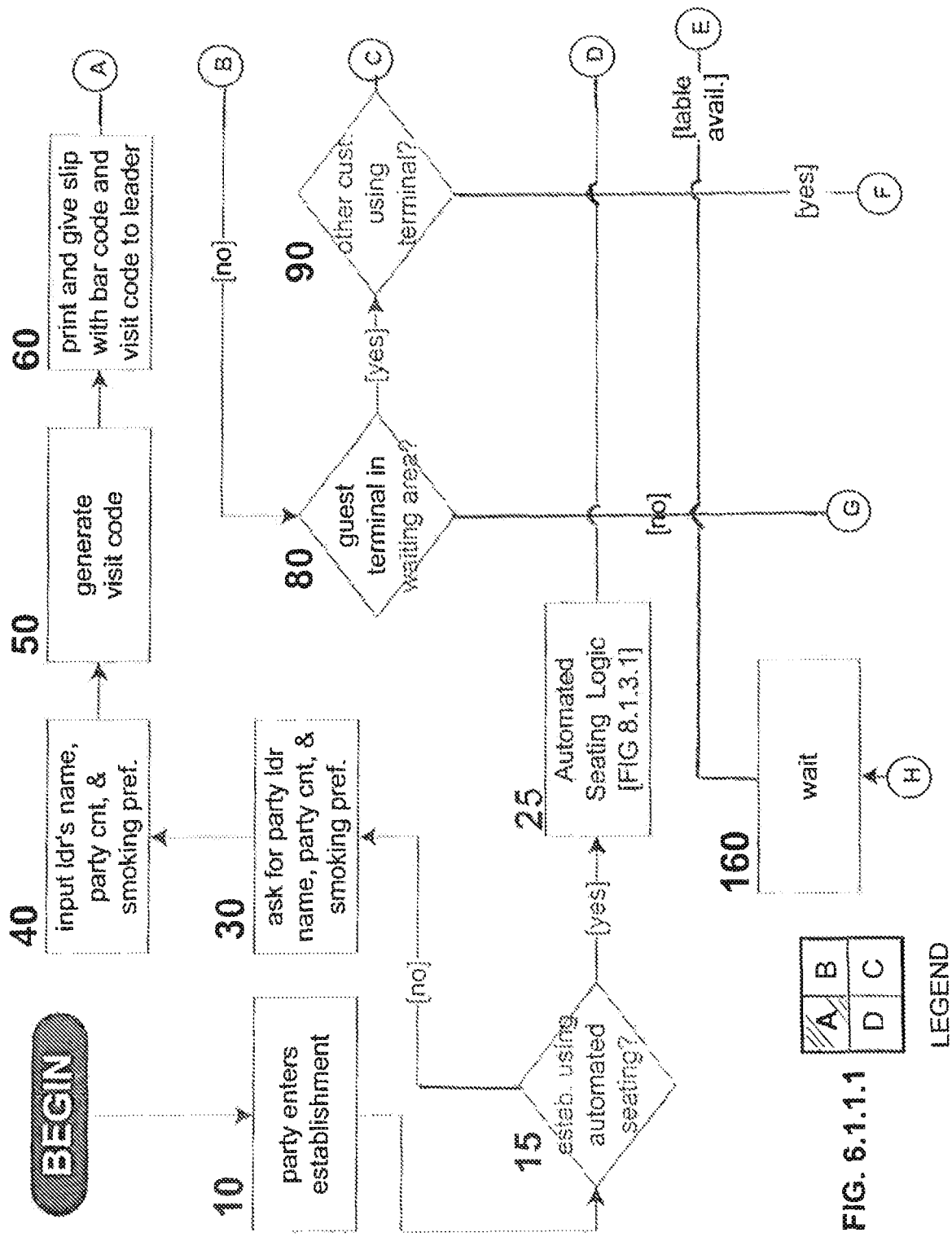
FIG. 6.1.1.1

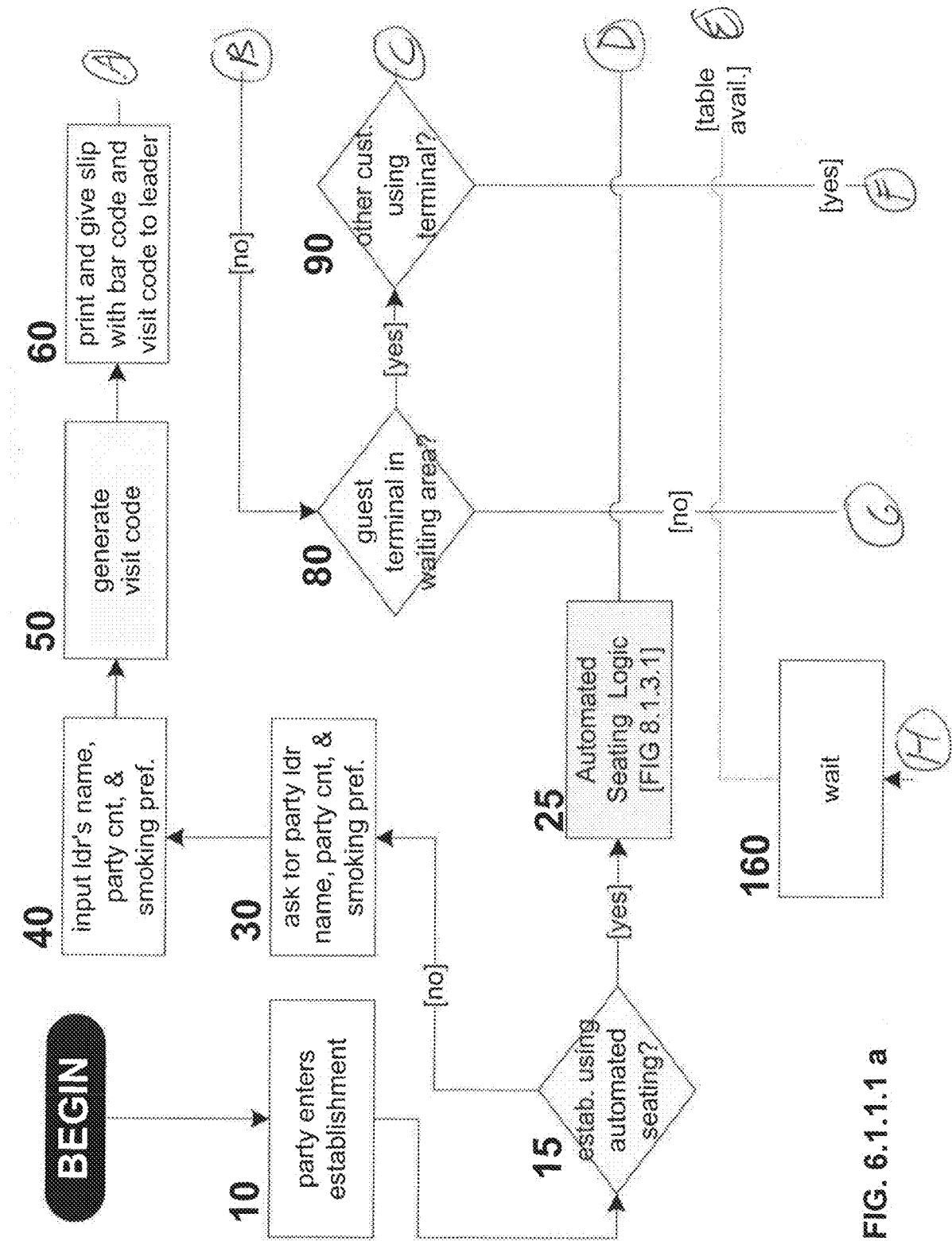
FIG. 6.1.1.1 a

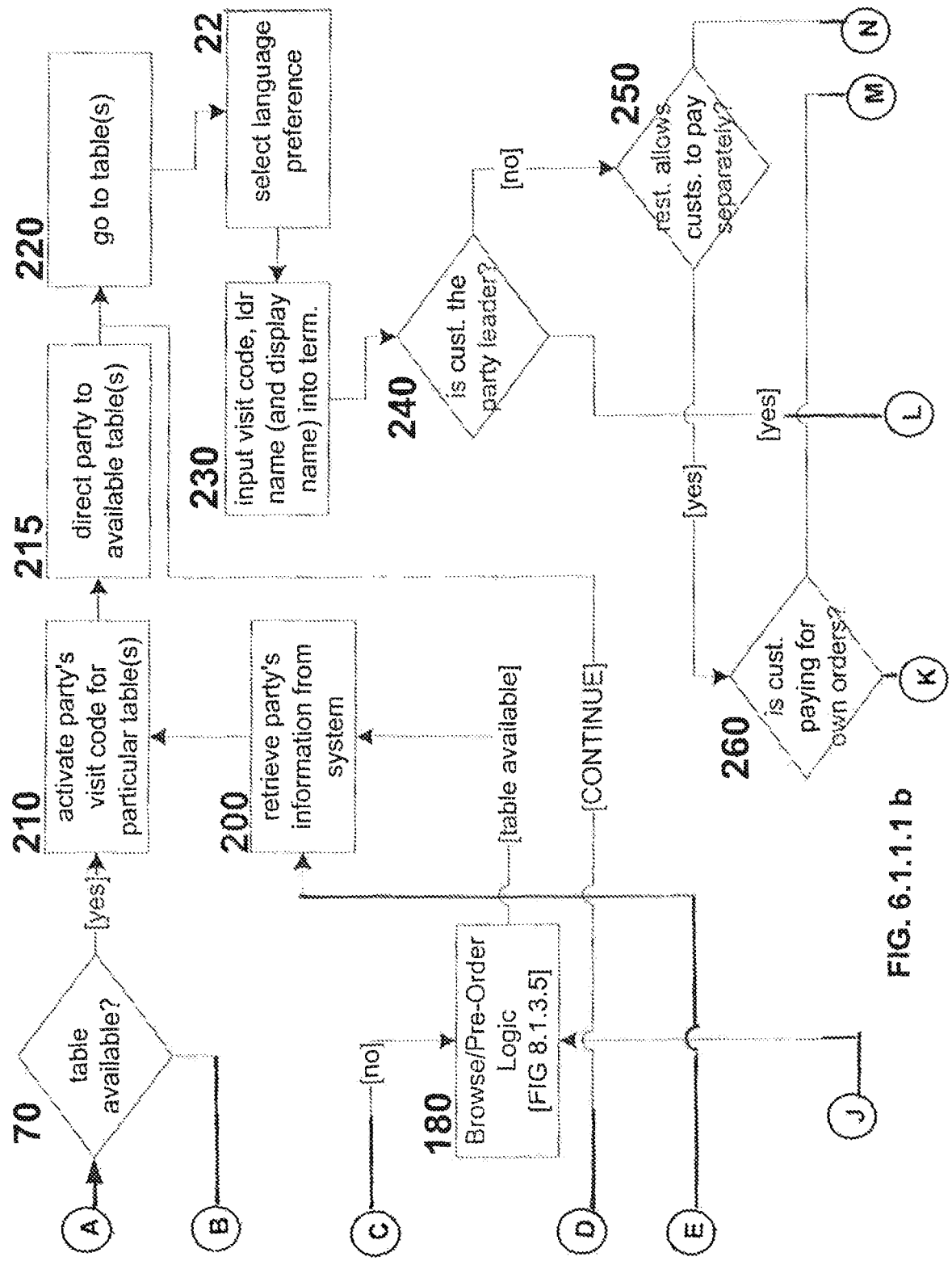
FIG. 6.1.1.1 b

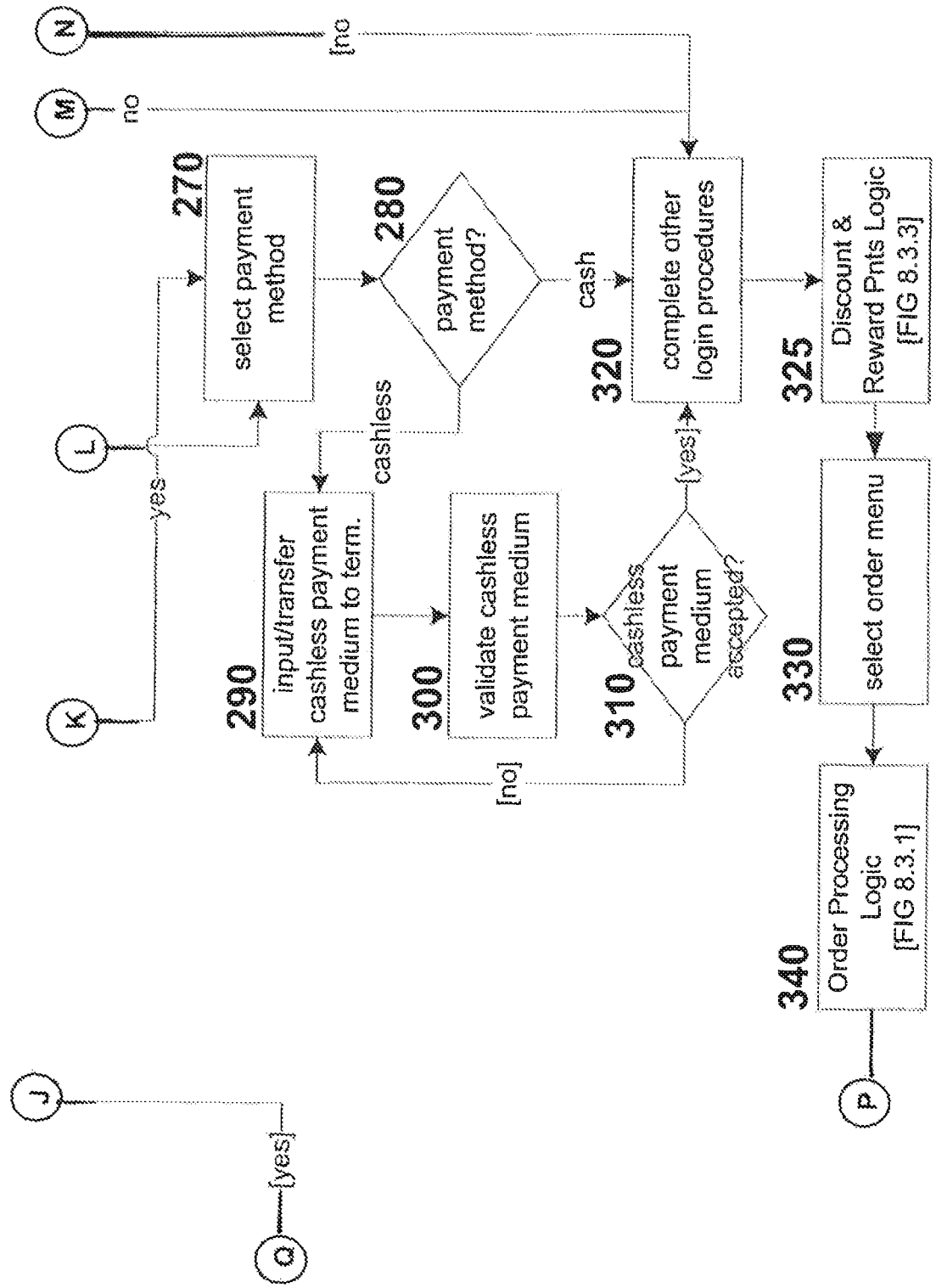
FIG. 6.1.1.1c

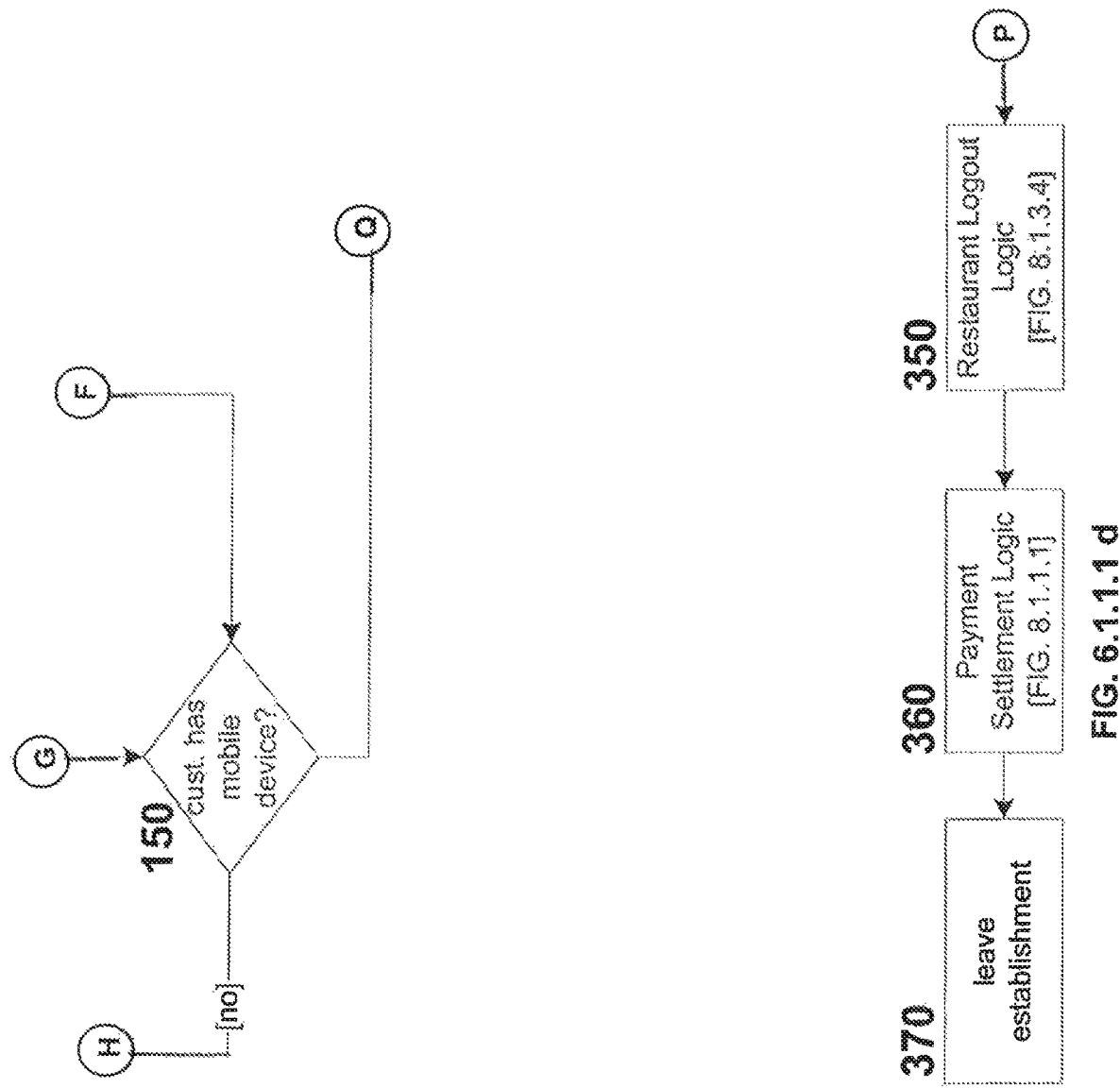

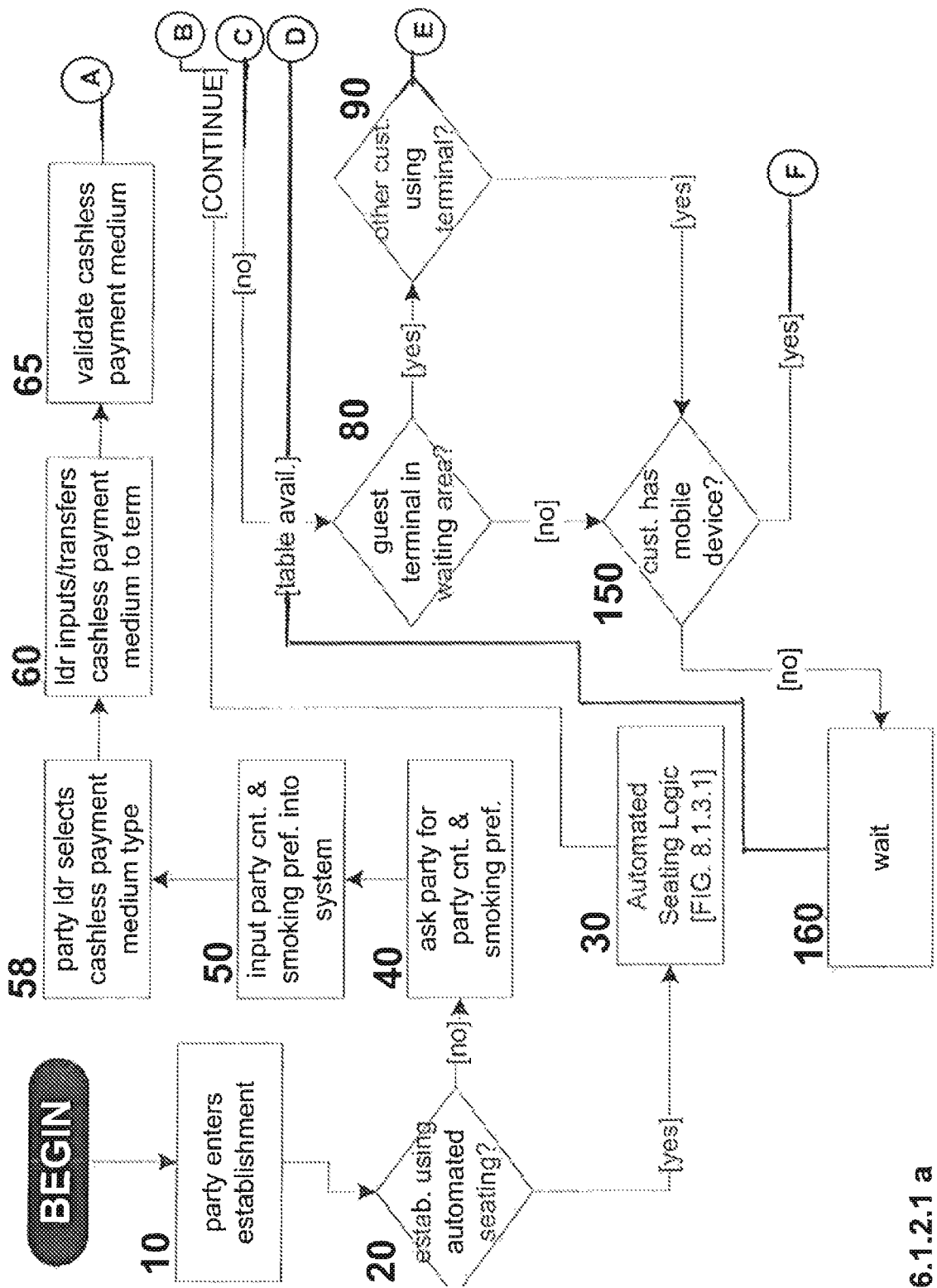
FIG. 6.1.2.1 a

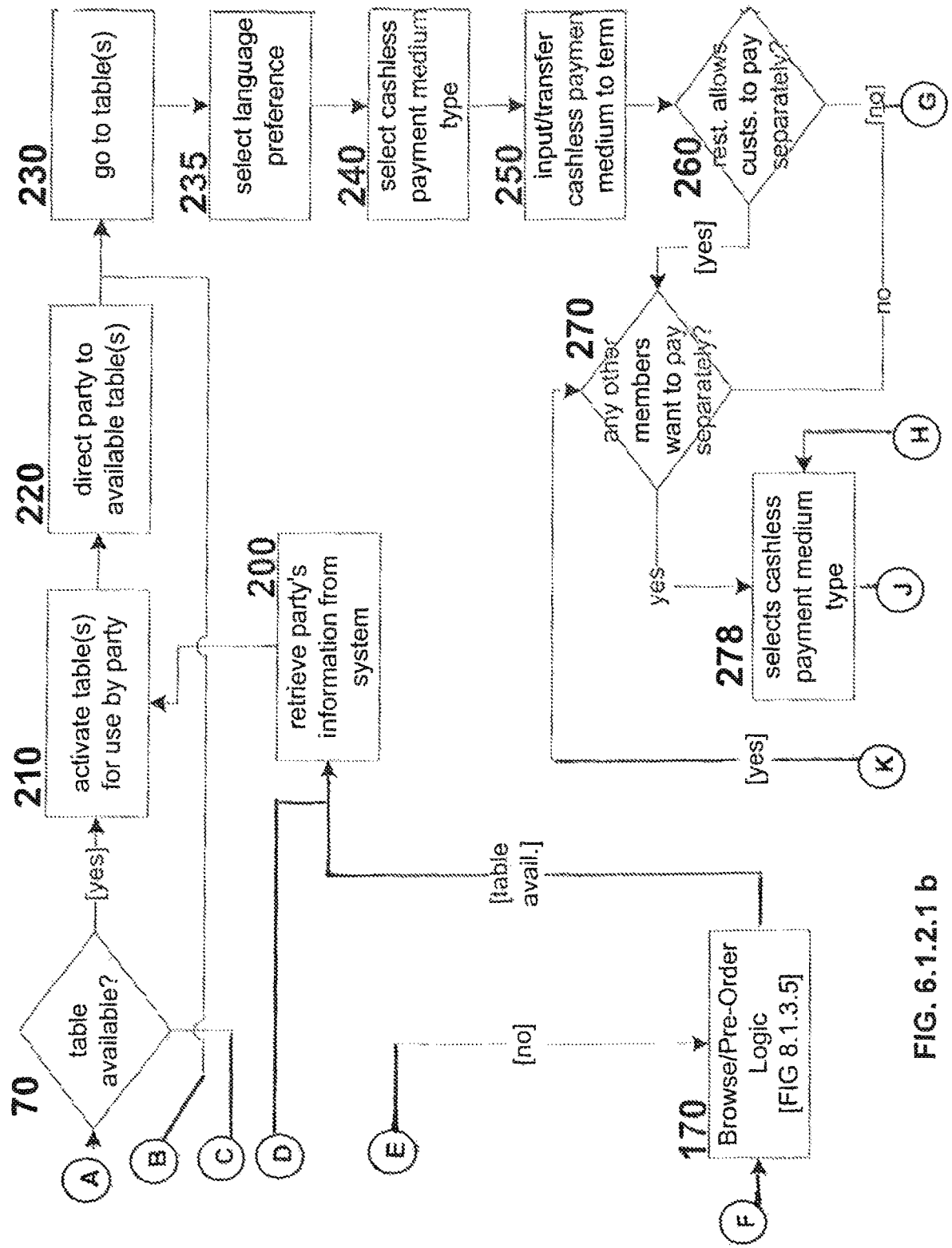
FIG. 6.1.2.1 b

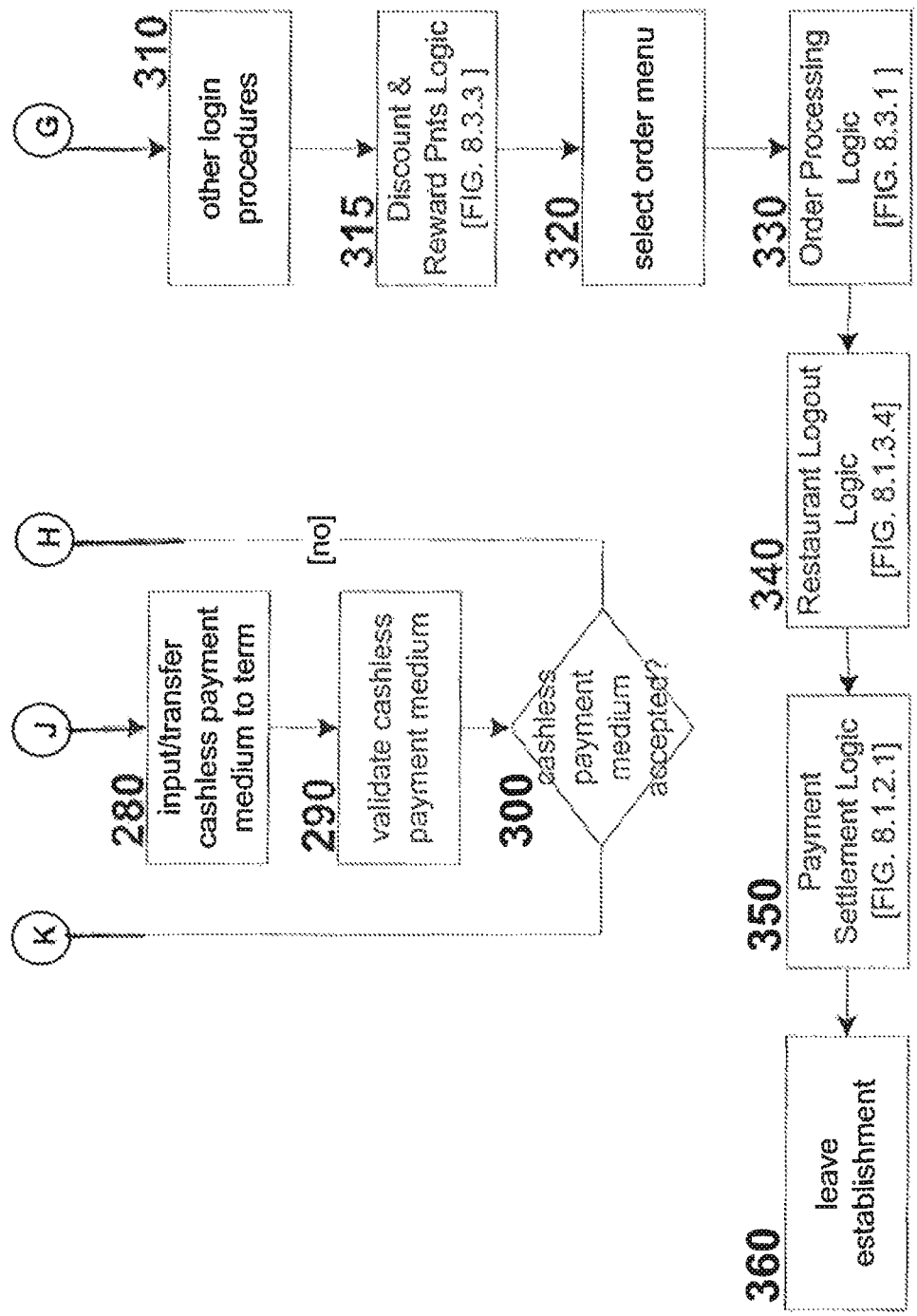
FIG. 6.1.2.1 c

FIG. 6.1.3.1a  Login Screen

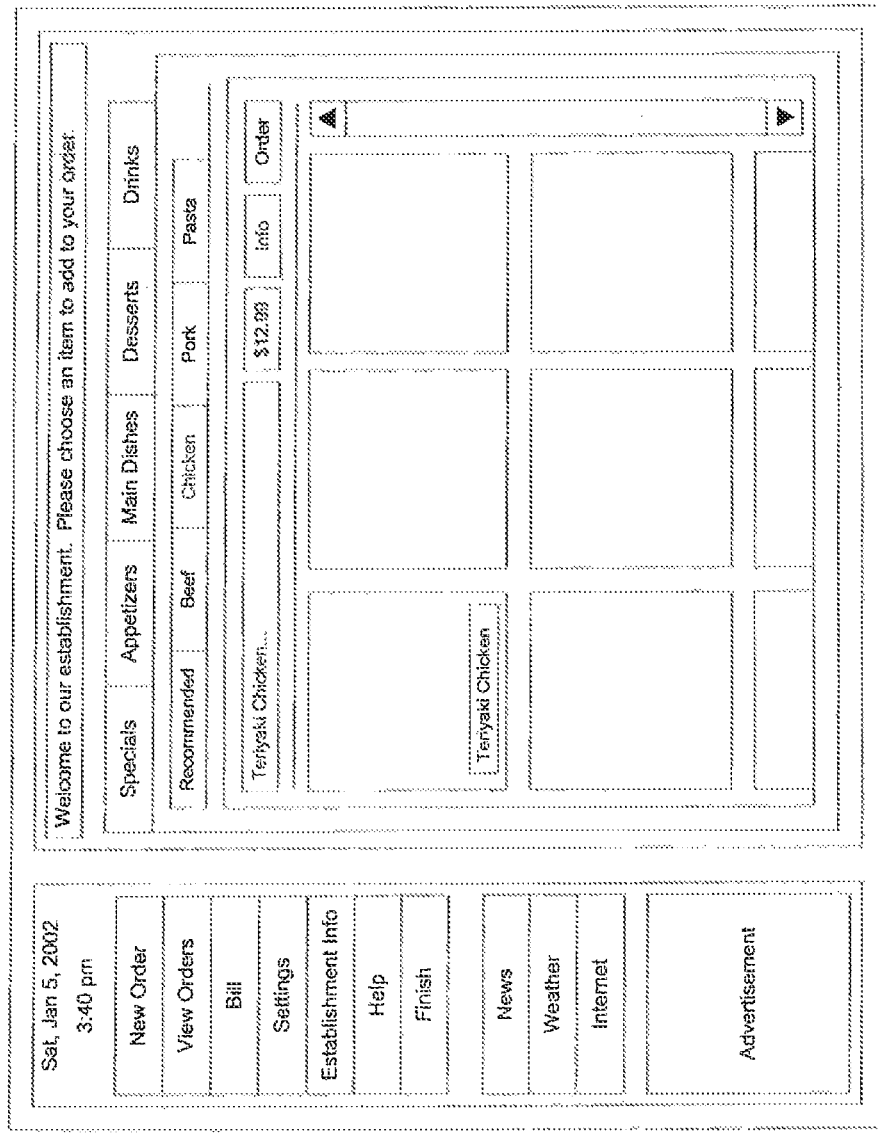
FIG. 6.1.3.1b  Main Ordering Screen

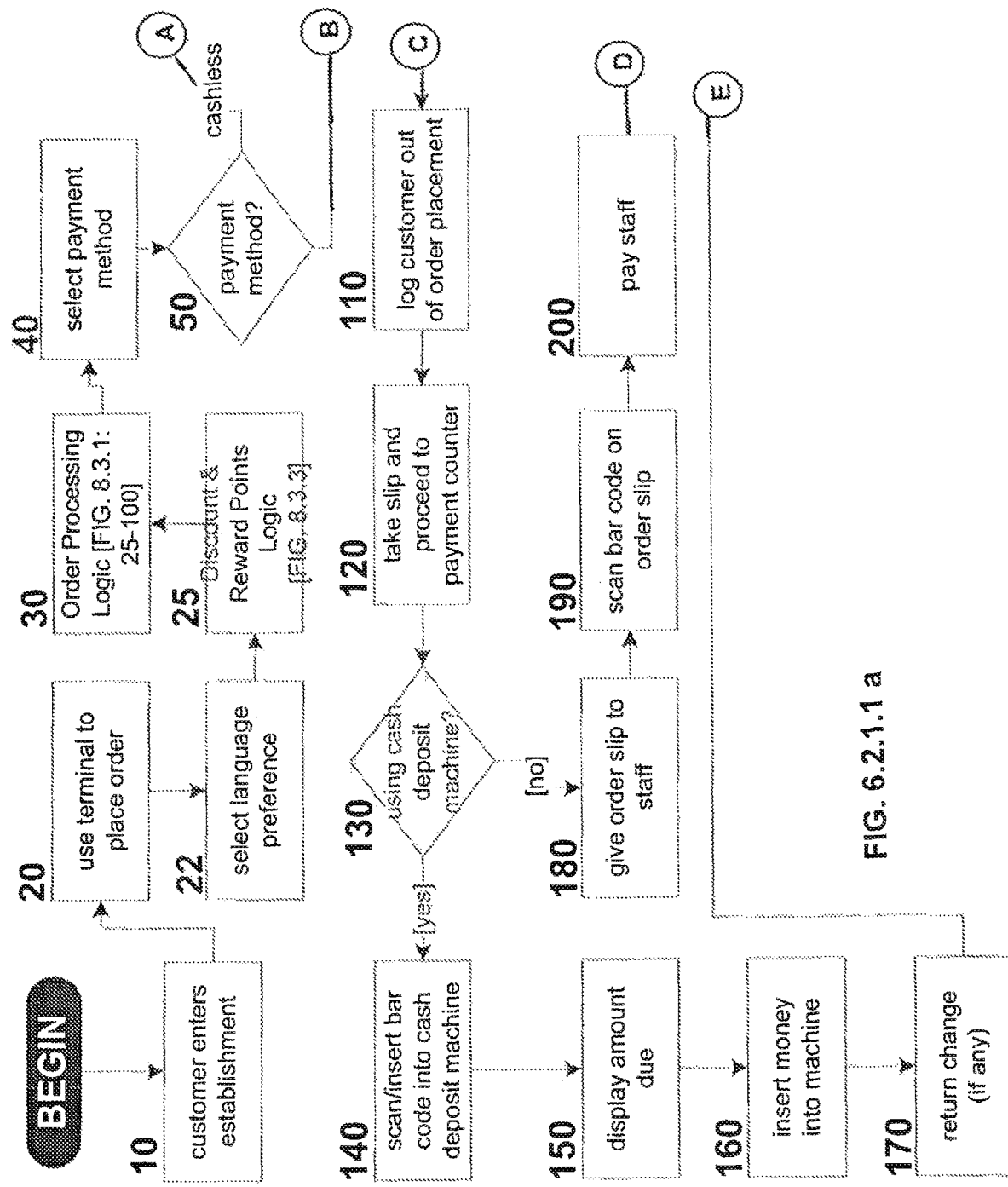
FIG. 6.2.1.1 a

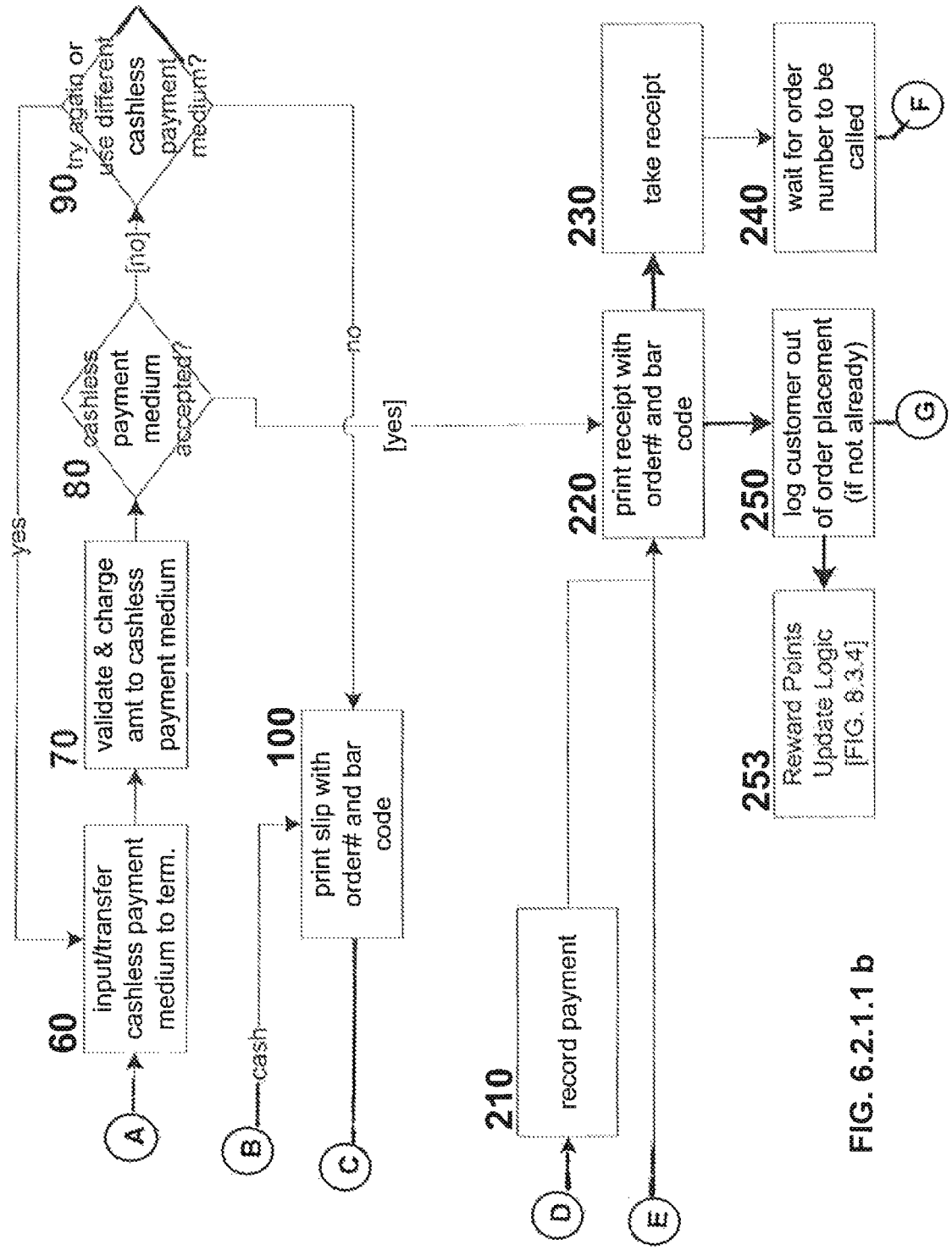

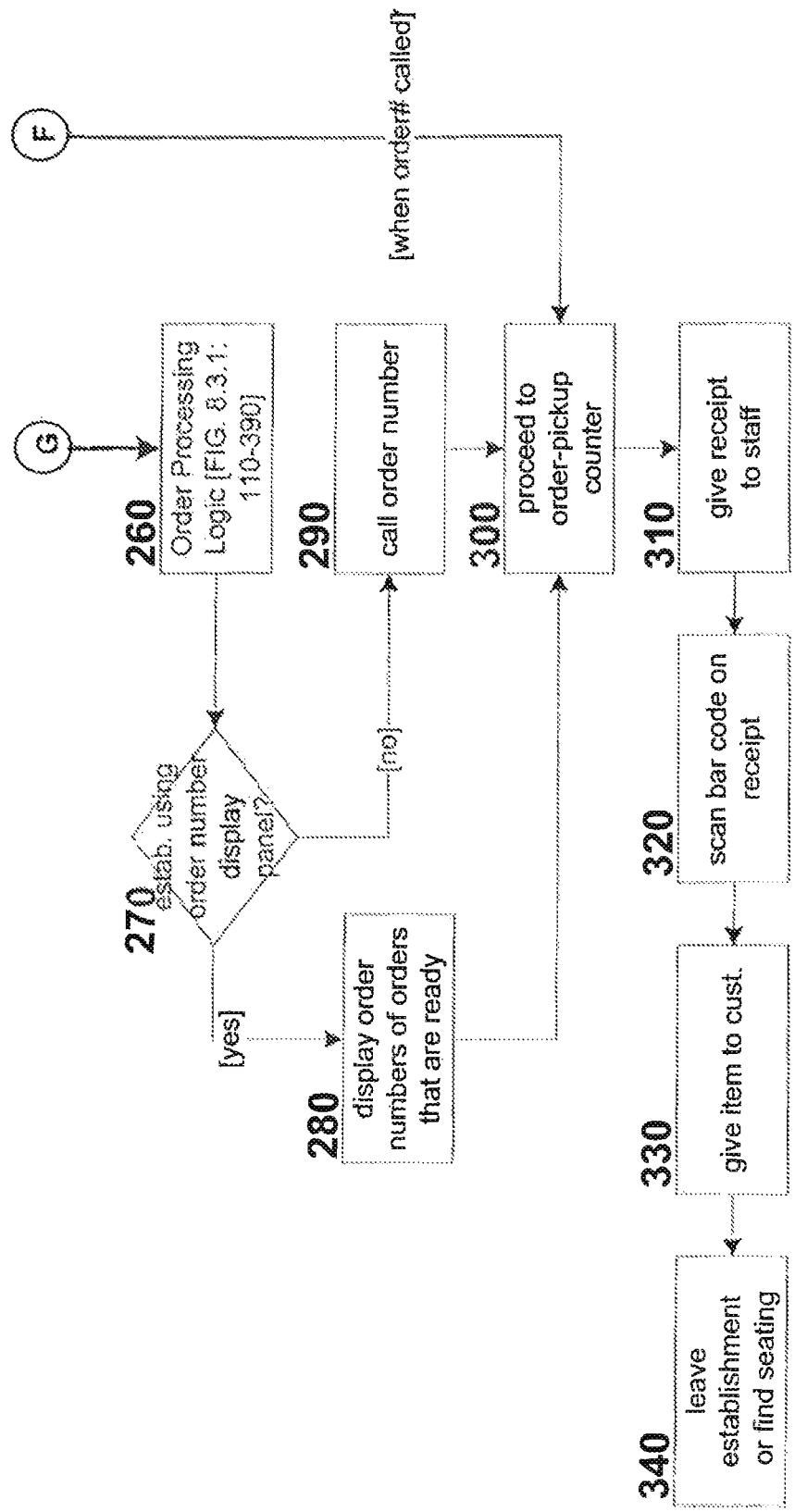
FIG. 6.2.1.1 c

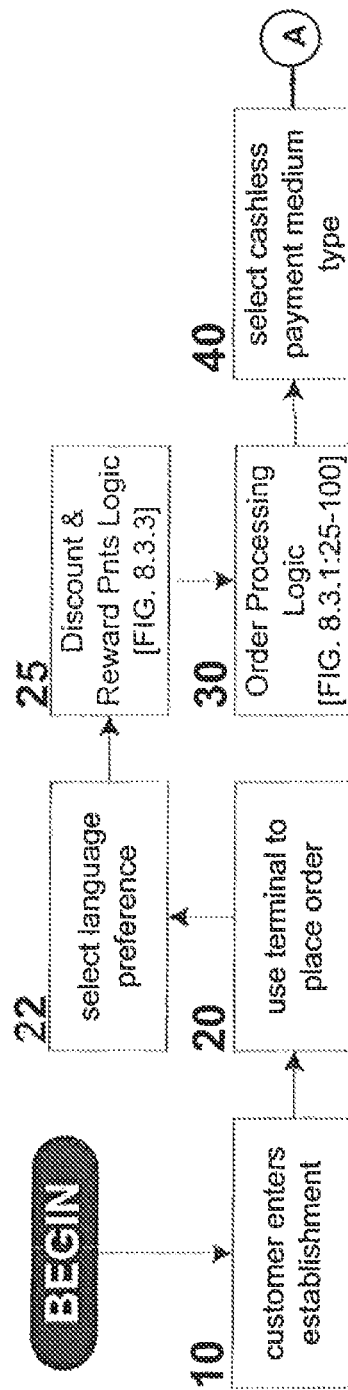
FIG. 6.2.2.1a

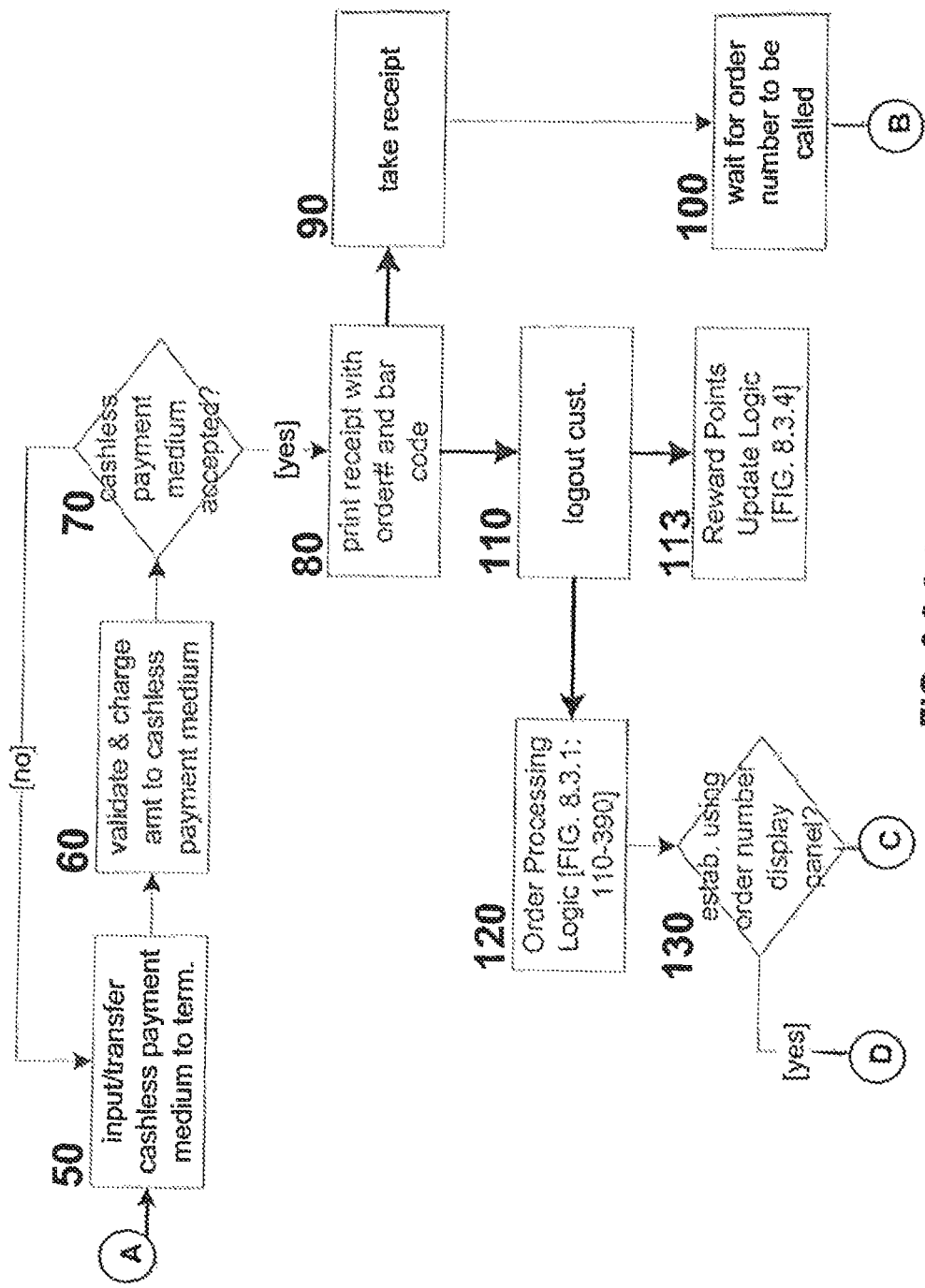
FIG. 6.2.2.1 b

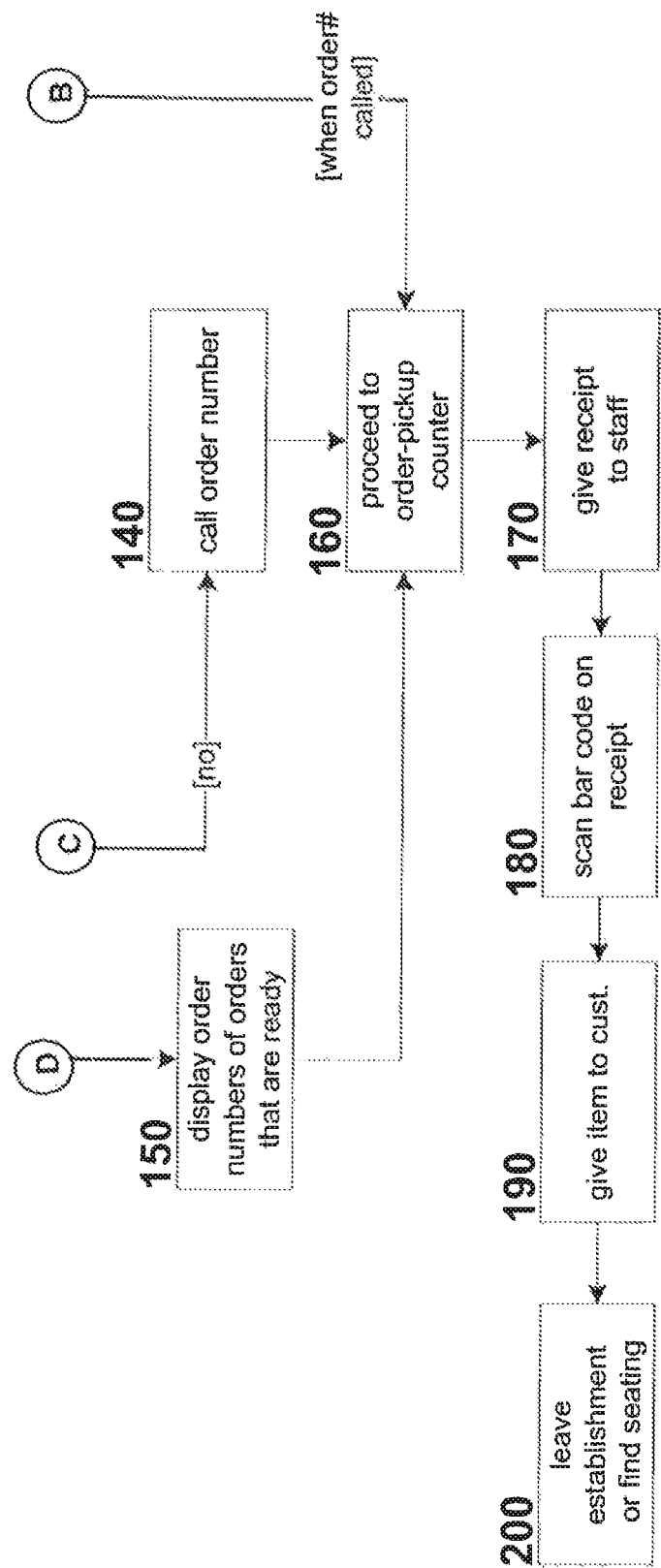
FIG. 6.2.2.1 c

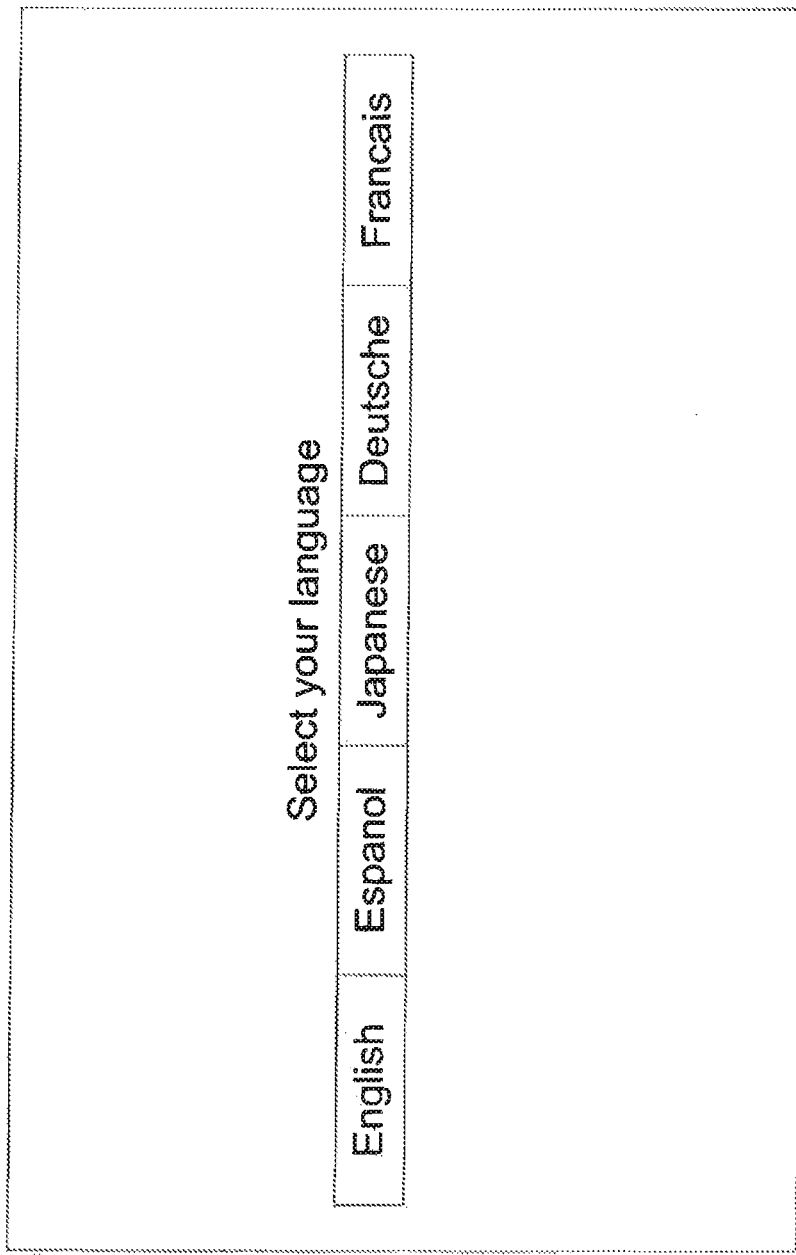
FIG. 6.2.3.1a  Login Screen

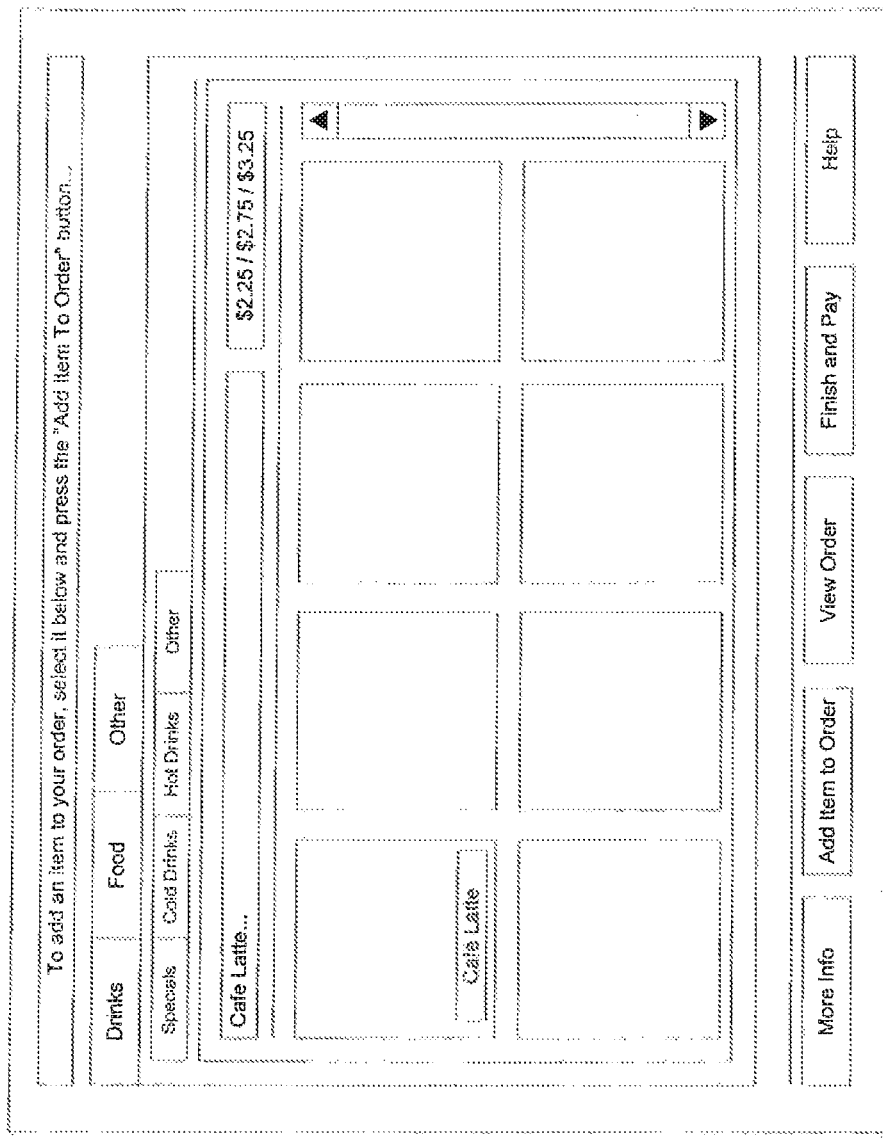
FIG. 6.2.3.1b  Main Ordering Screen

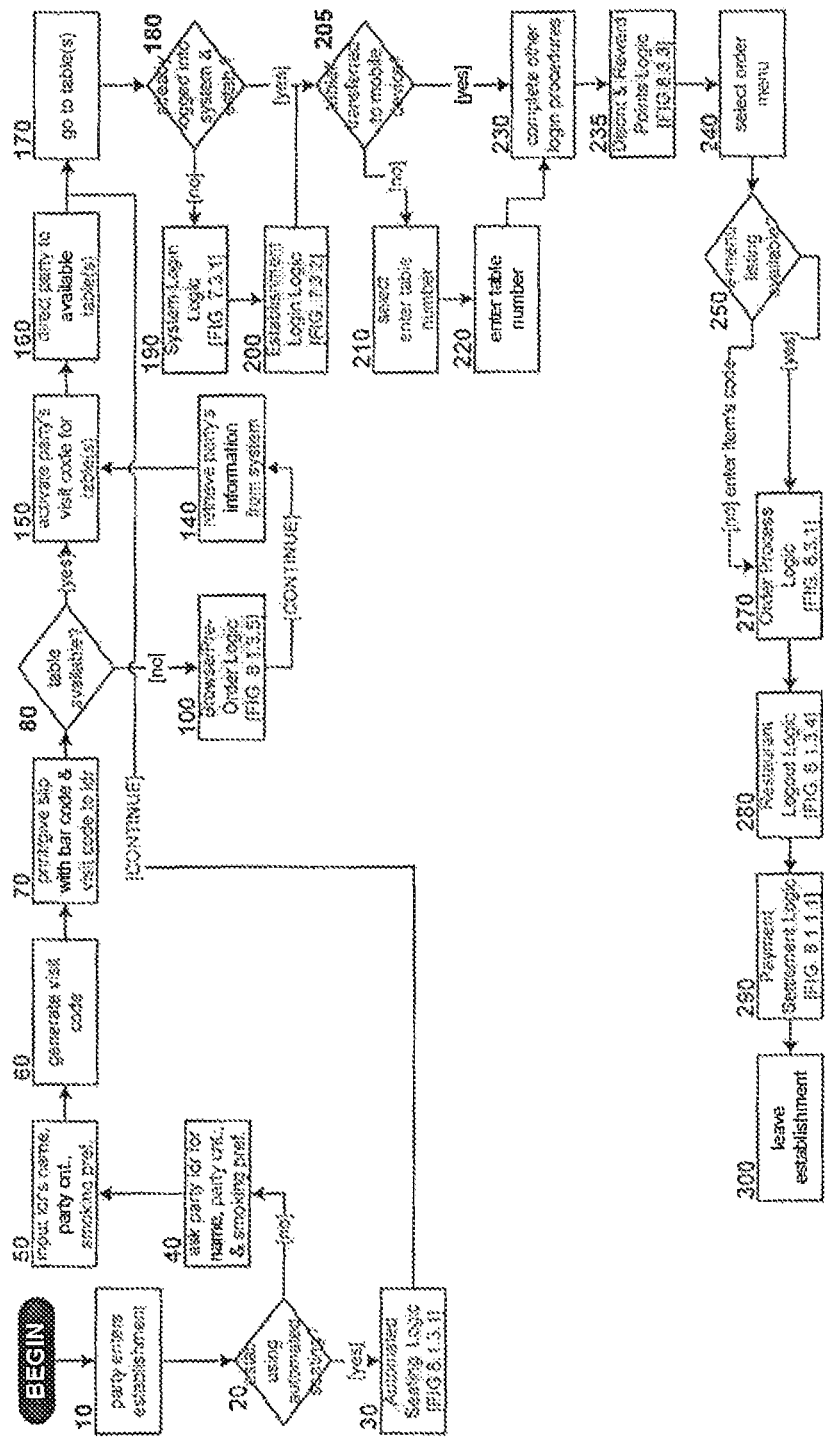
FIG. 7.1.1.1

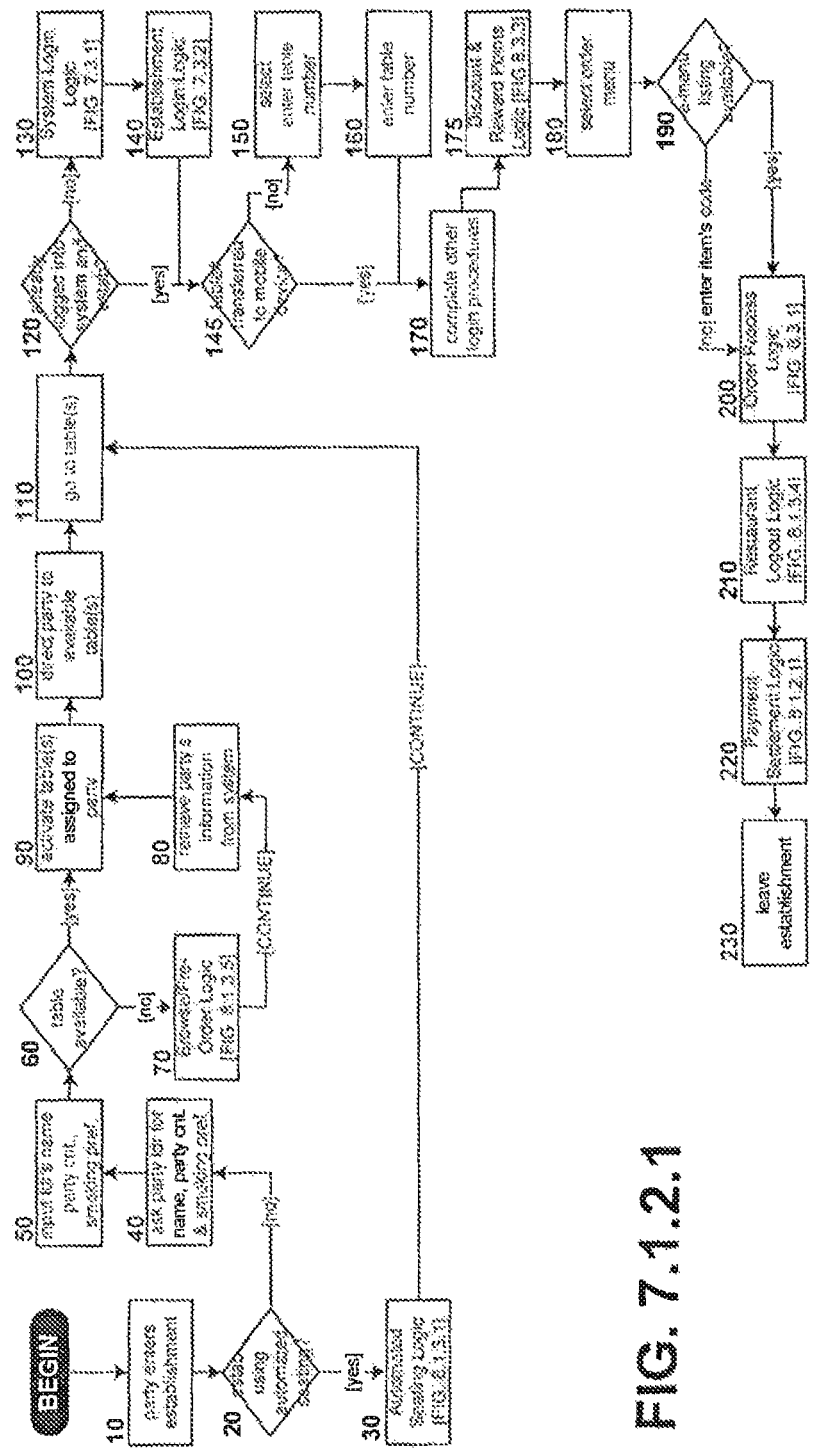
FIG. 7.1.2.1

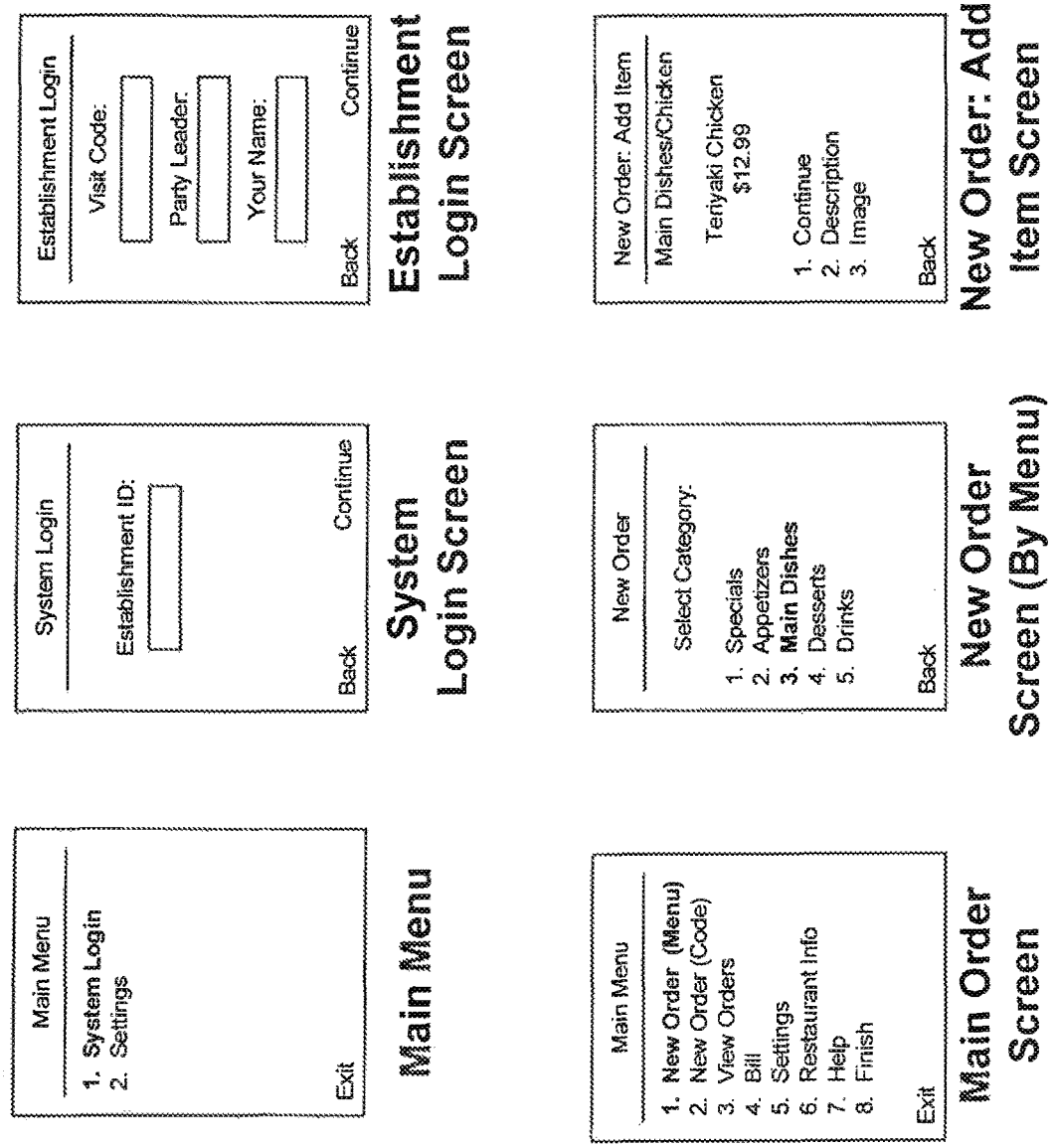
FIG. 7.1.3.1

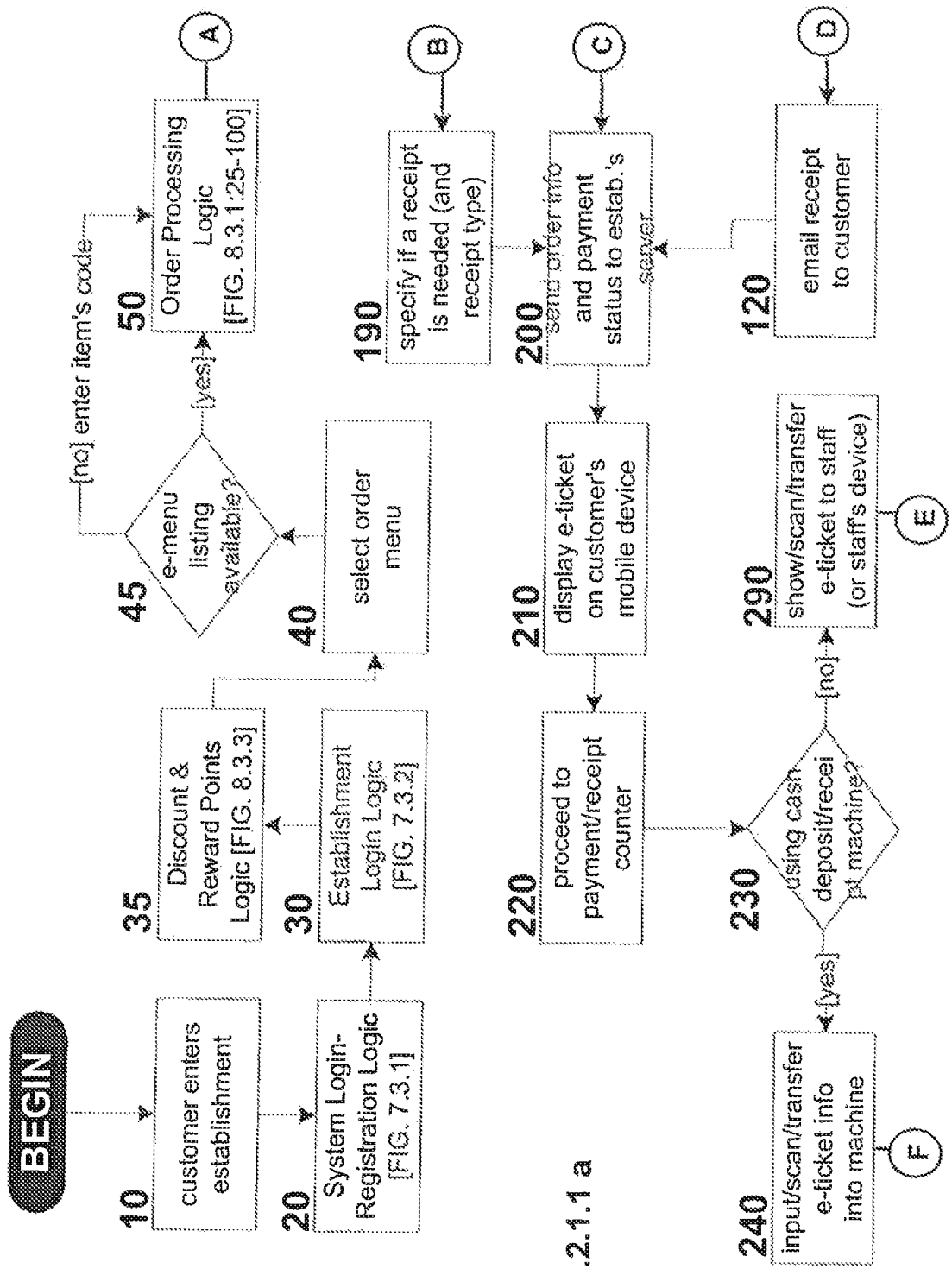
FIG. 7.2.1.1 a

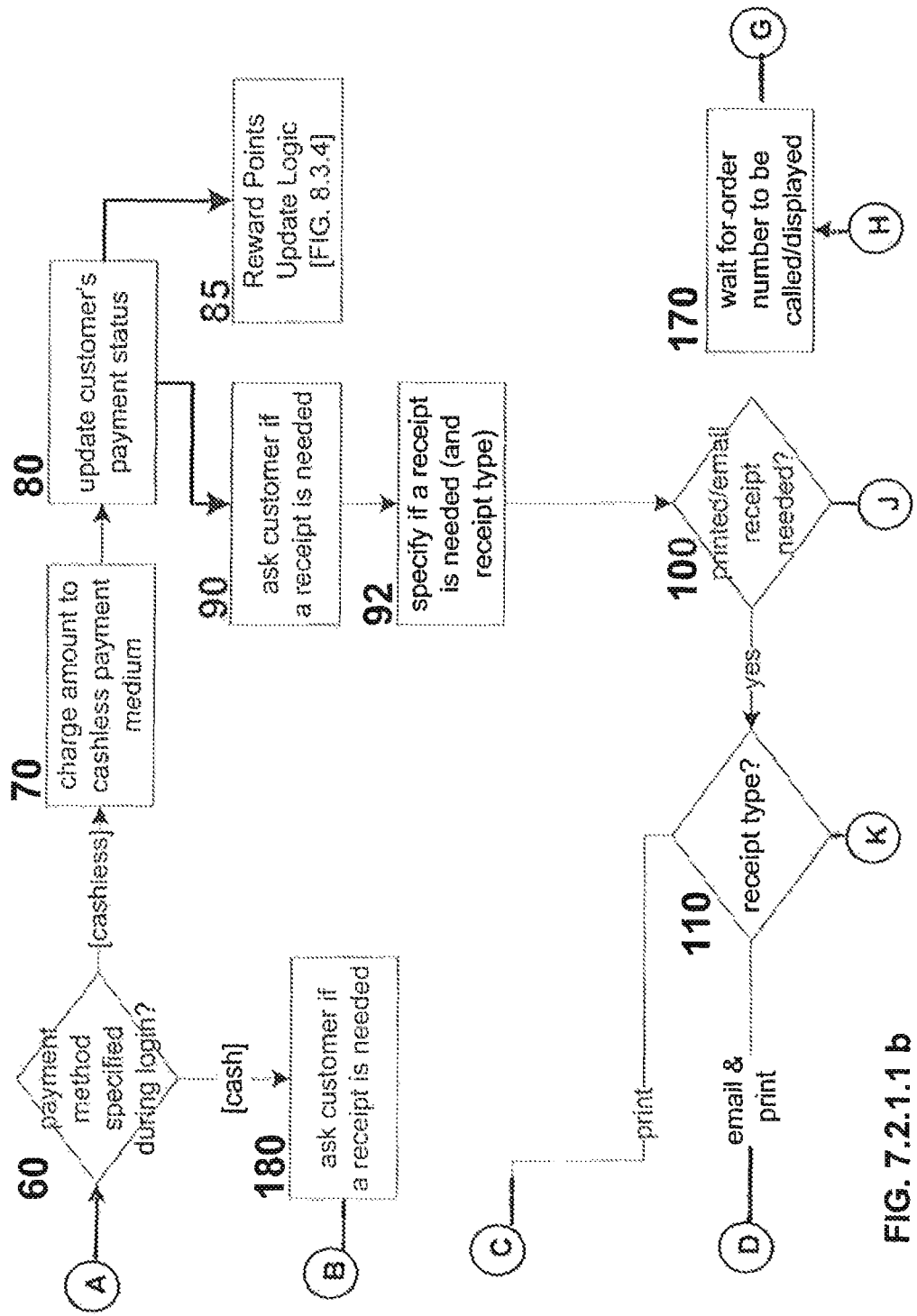
FIG. 7.2.1.1 b

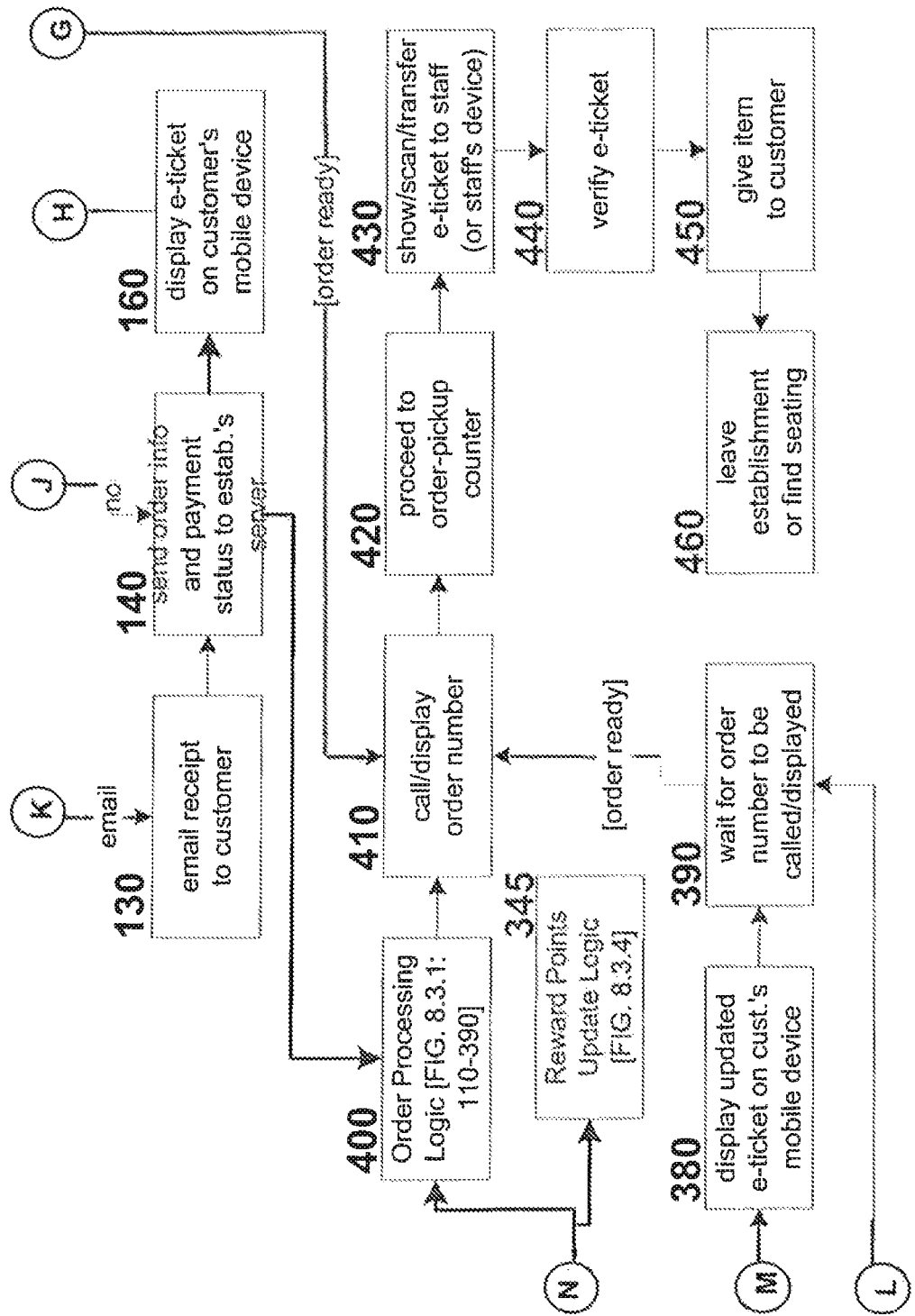
FIG. 7.2.1.1c

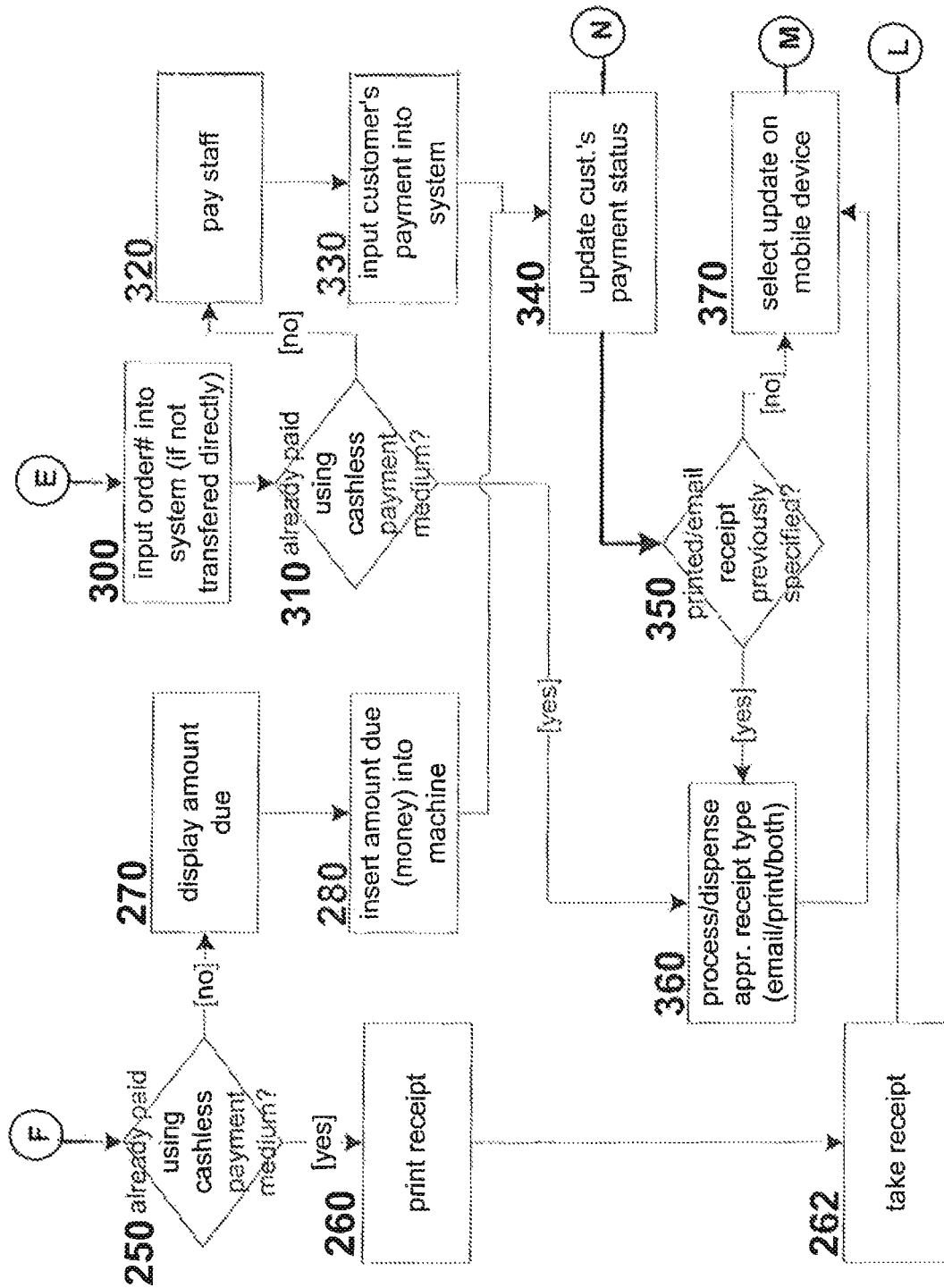
FIG. 7.2.1.1 d

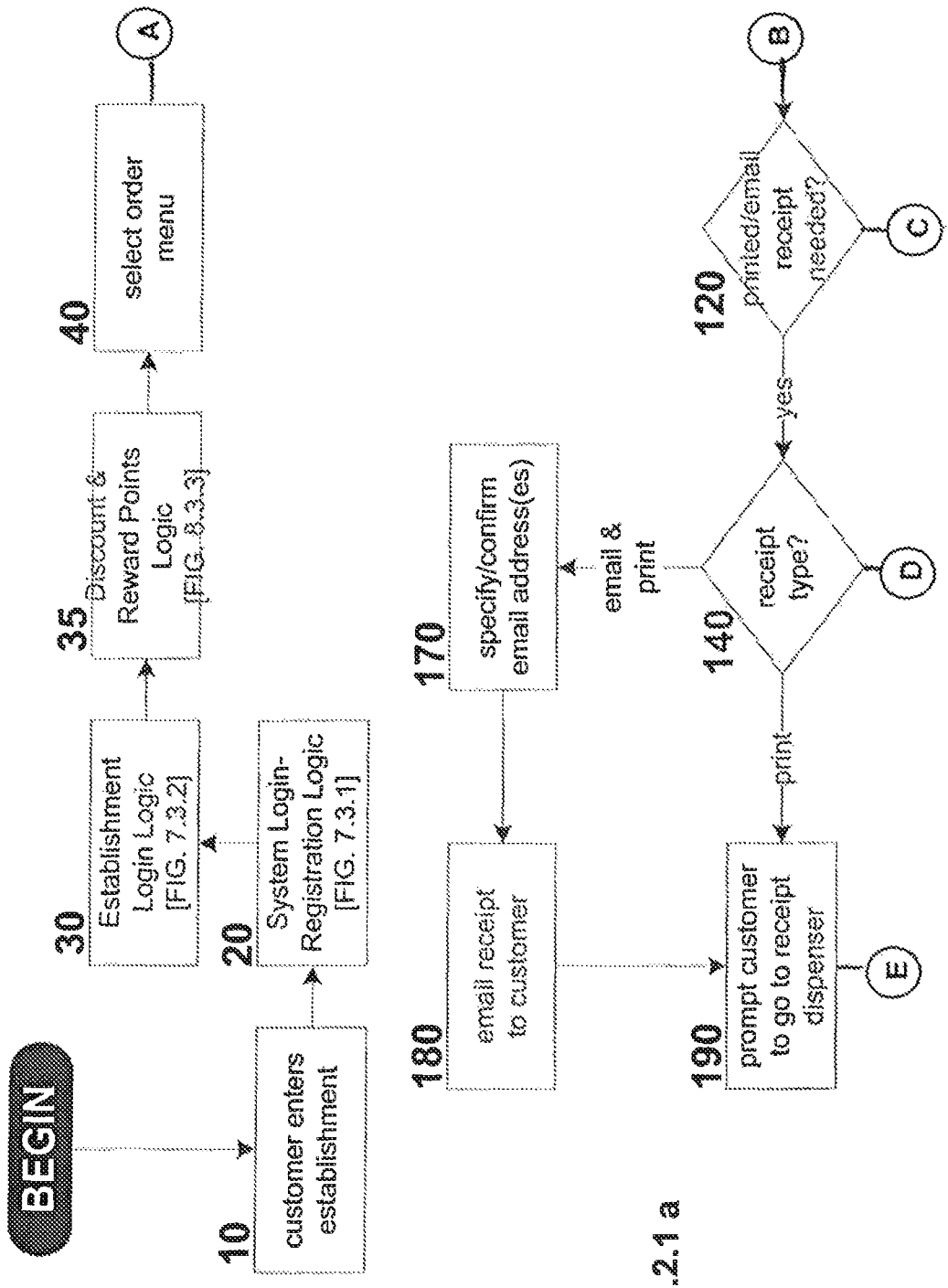
FIG. 7.2.2.1 a

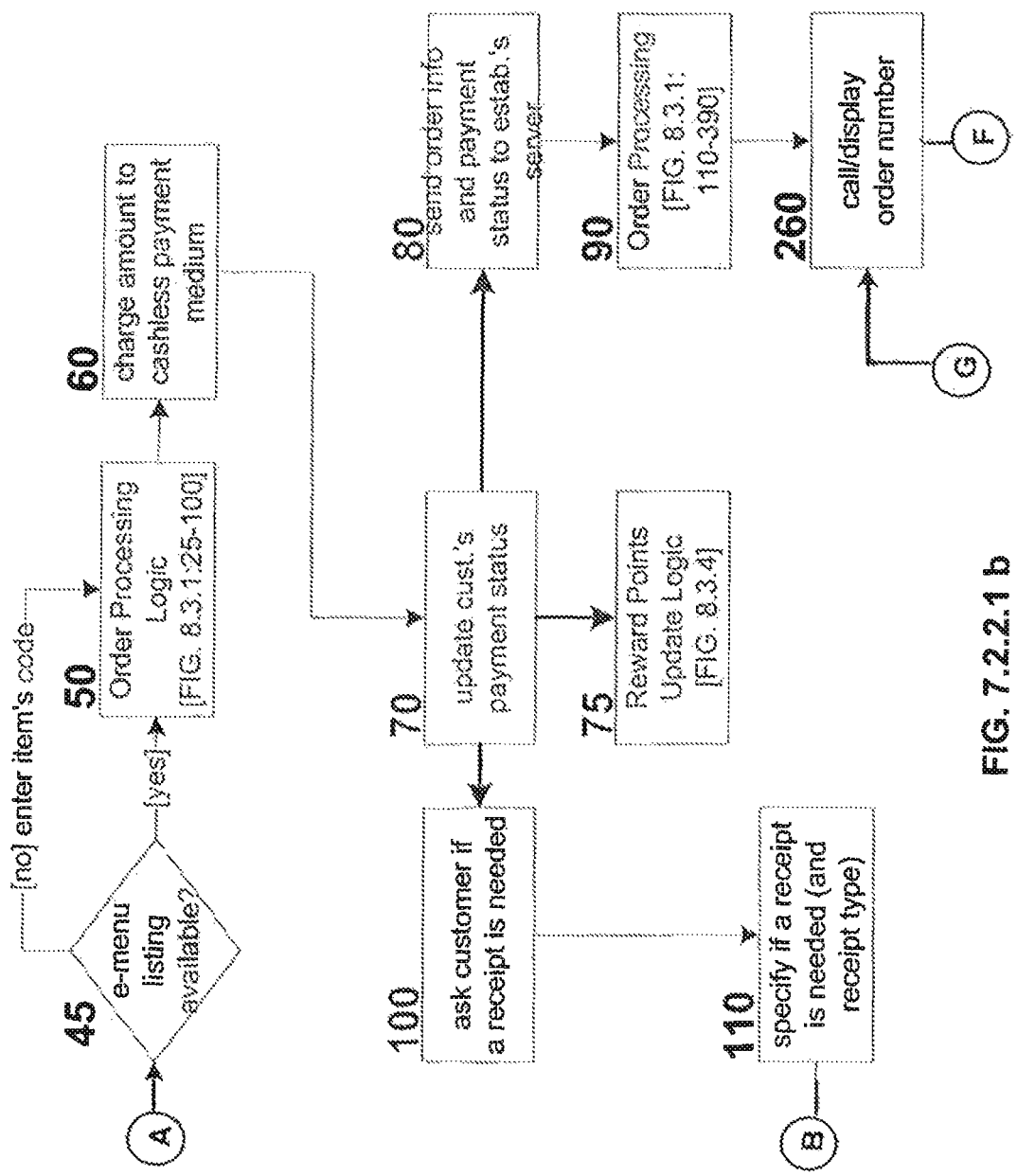
FIG. 7.2.2.1 b

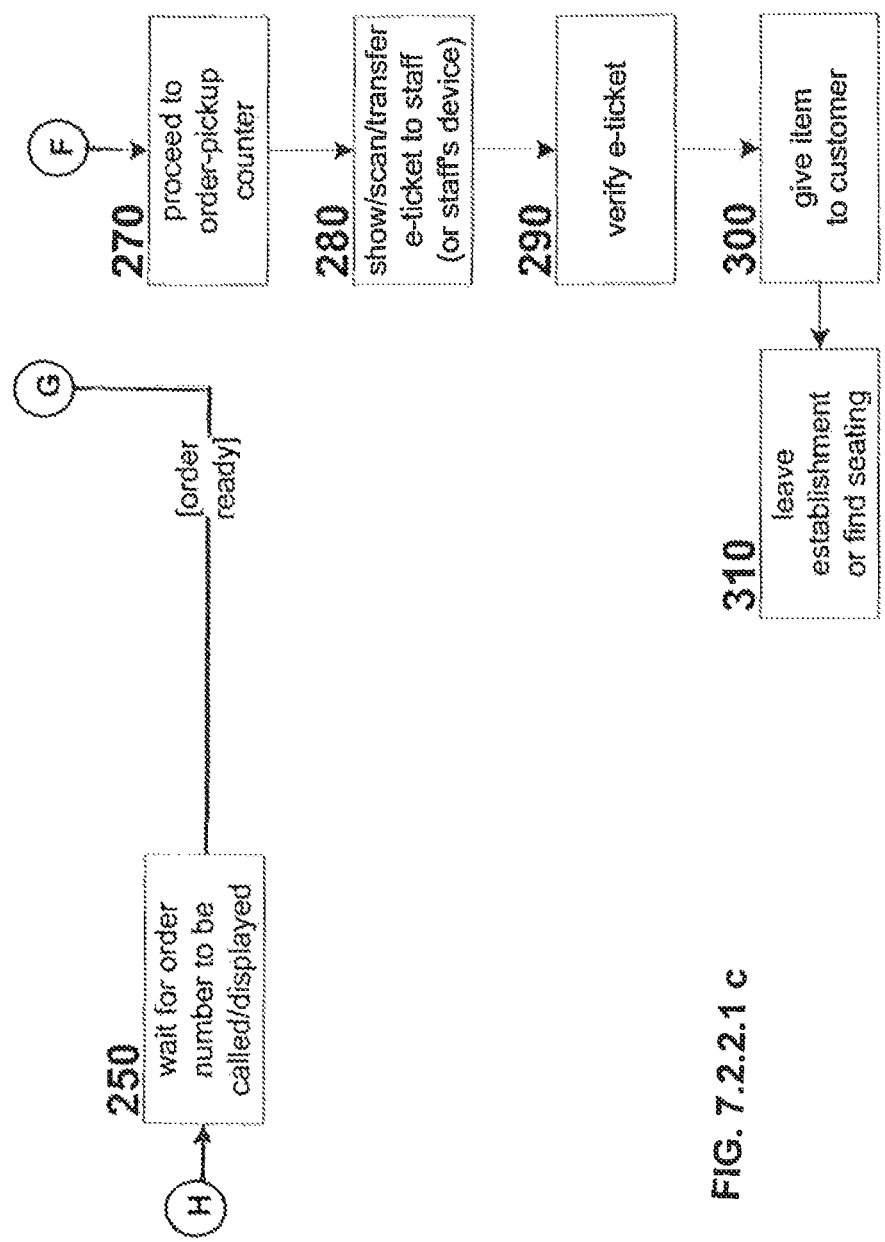
FIG. 7.2.2.1c

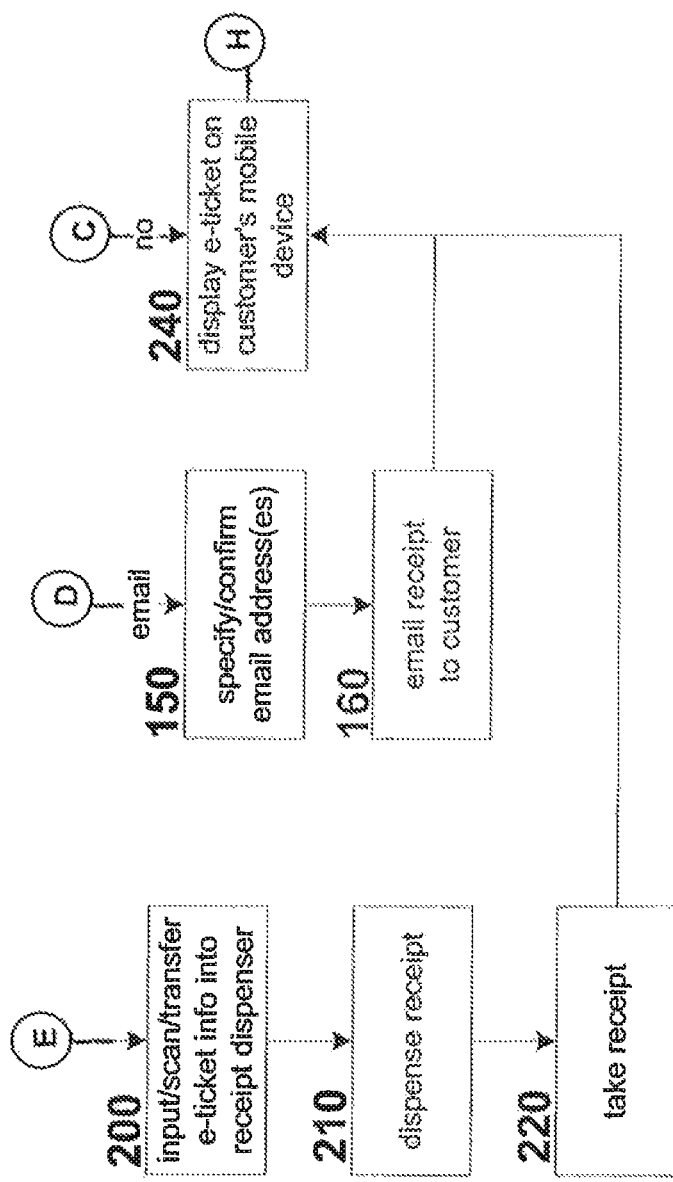
FIG. 7.2.2.1 d

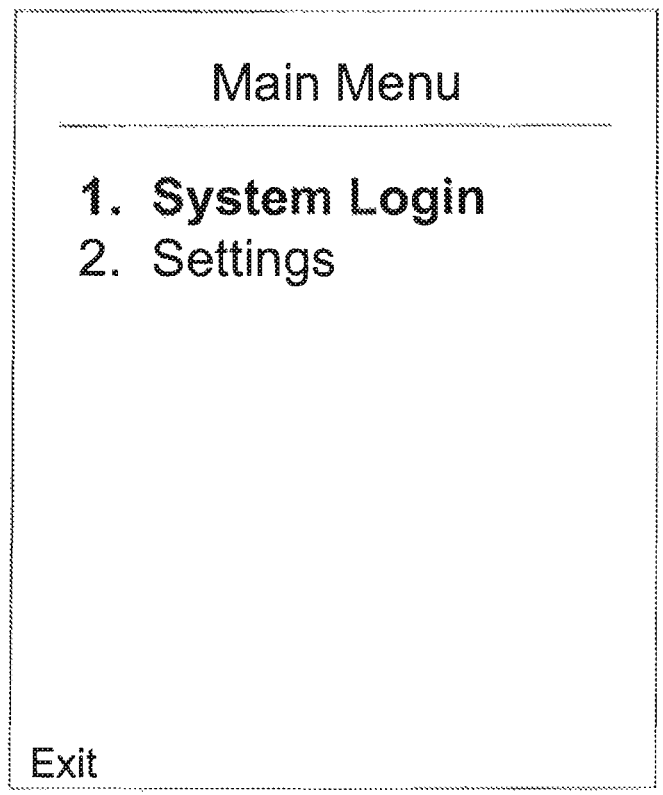
Main Menu
FIG. 7.2.3.1a

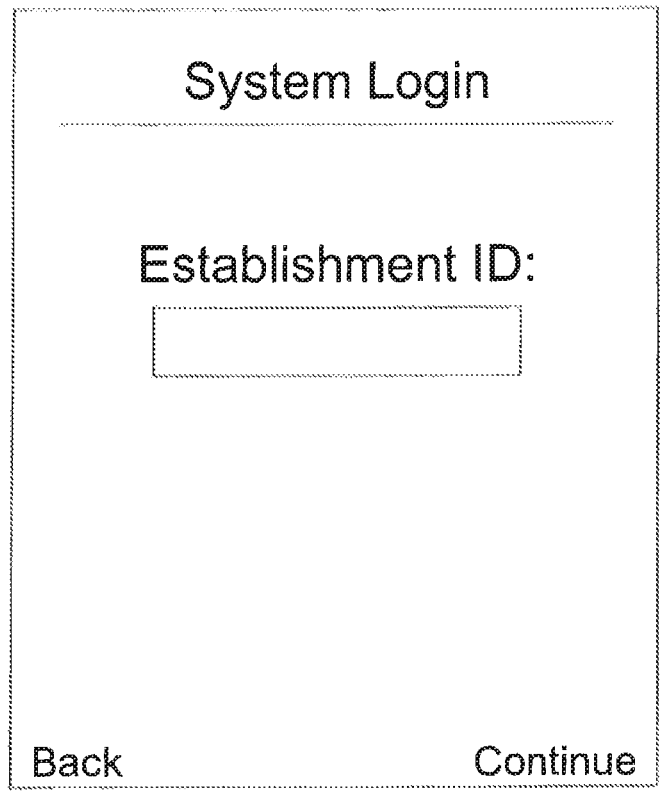
FIG. 7.2.3.1 b

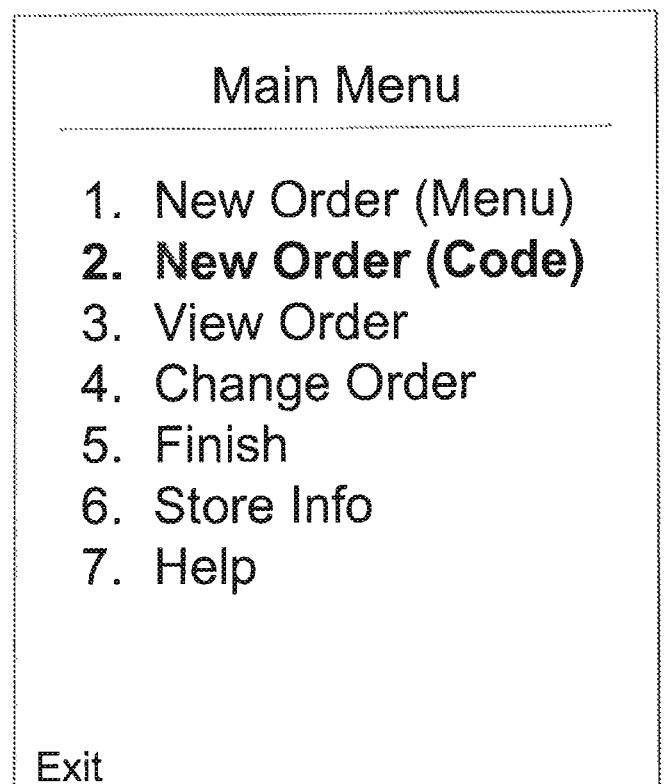
FIG. 7.2.3.1c

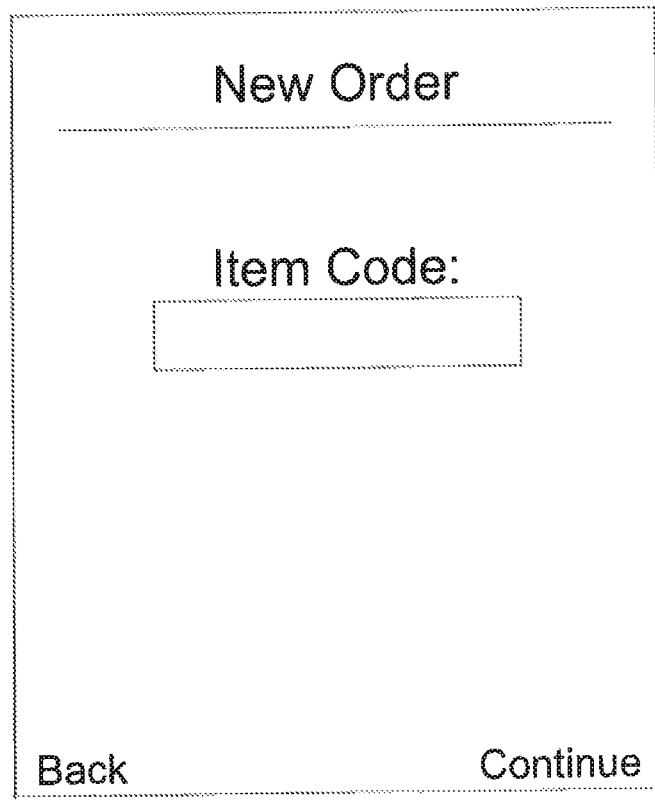
New Order Screen (By Code)
FIG. 7.2.3.1 d

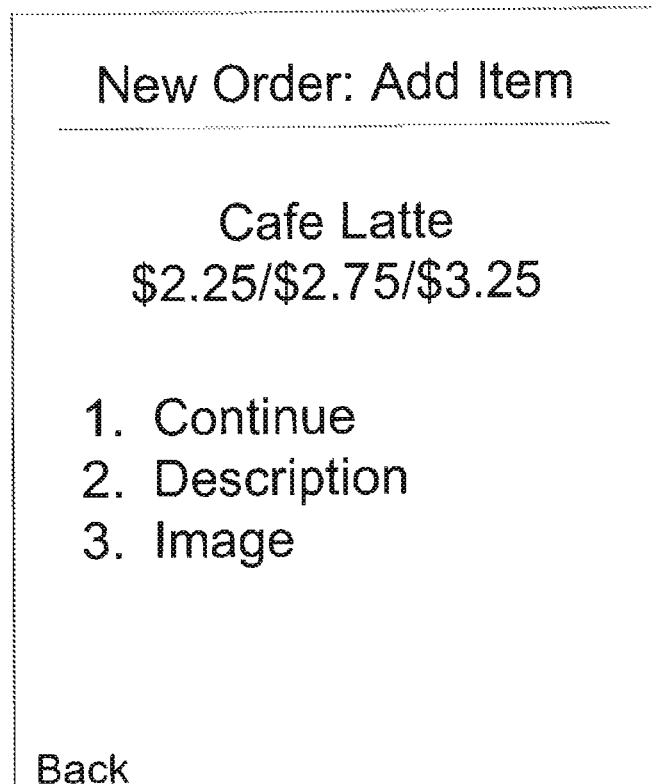
FIG. 7.2.3.1e

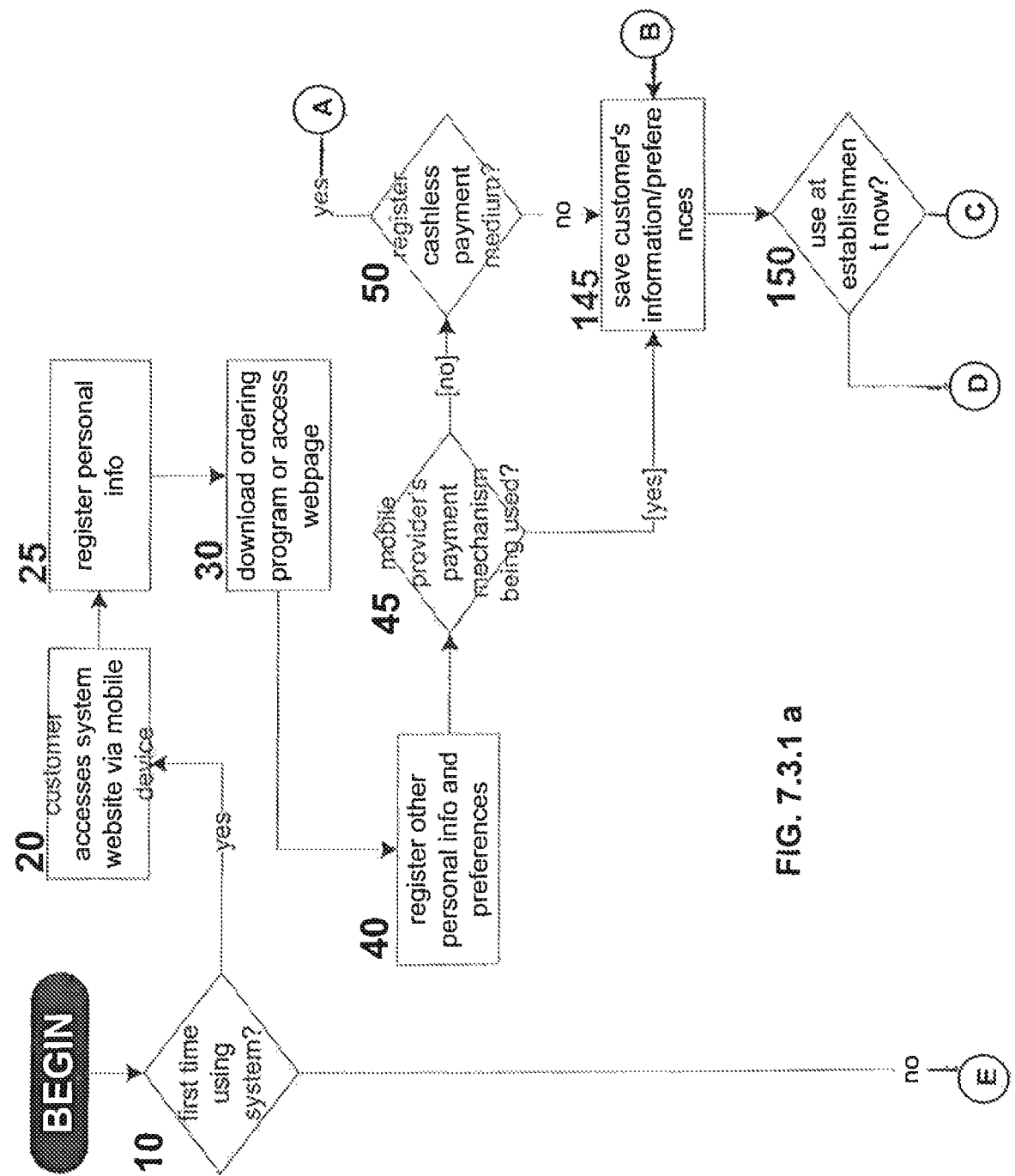
FIG. 7.3.1 a

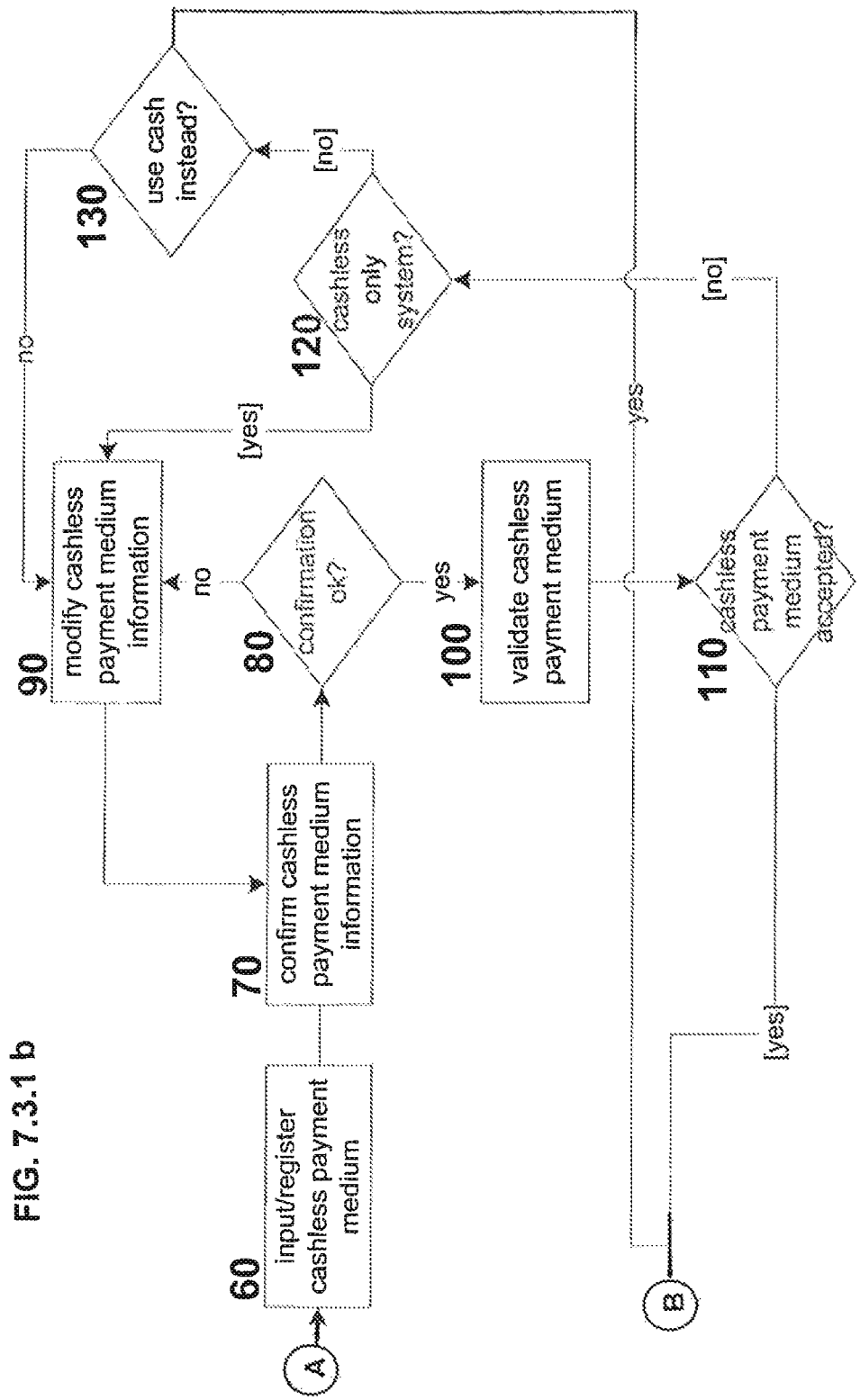
FIG. 7.3.1 b

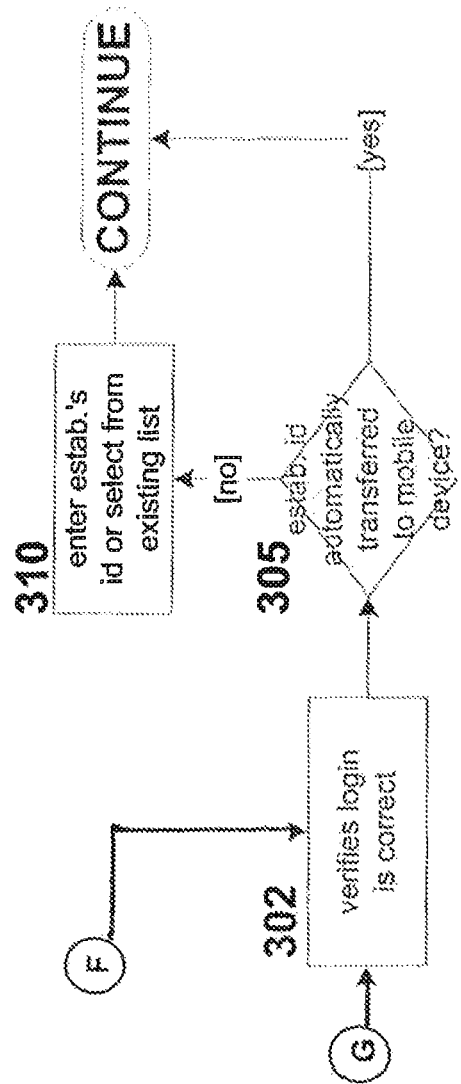
FIG. 7.3.1 c

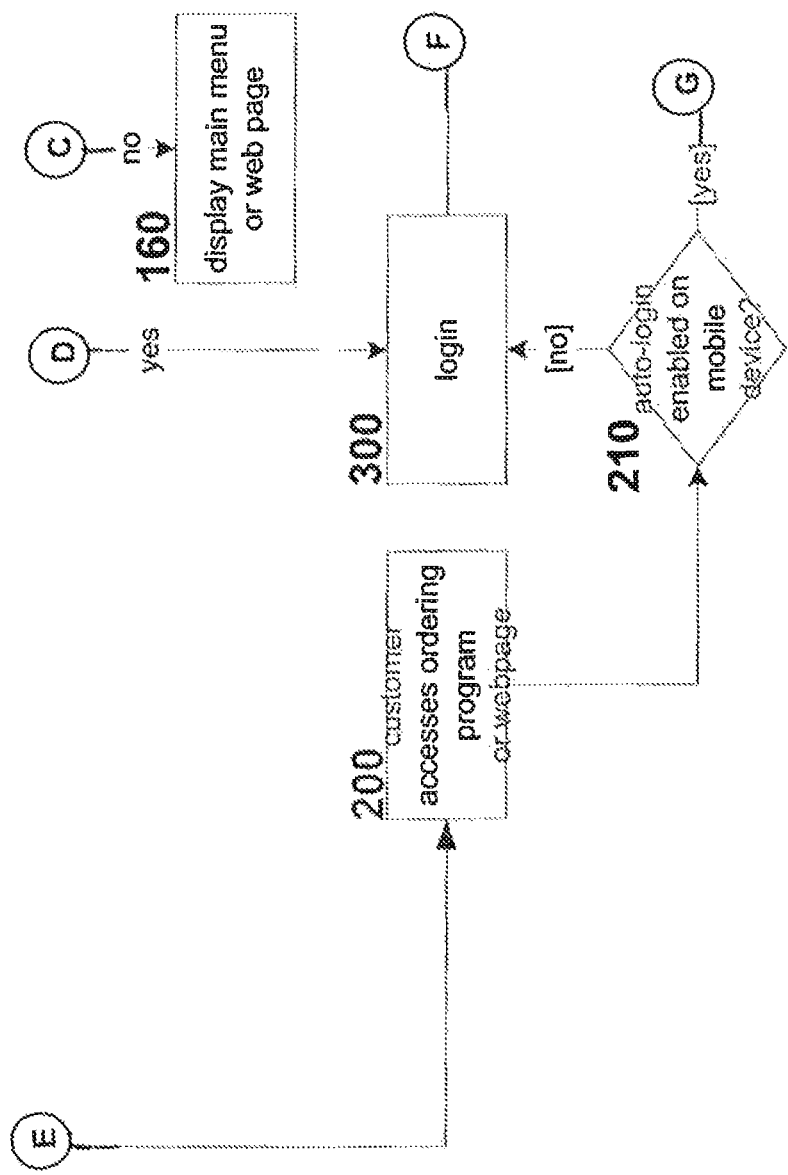
FIG. 7.3.1 d

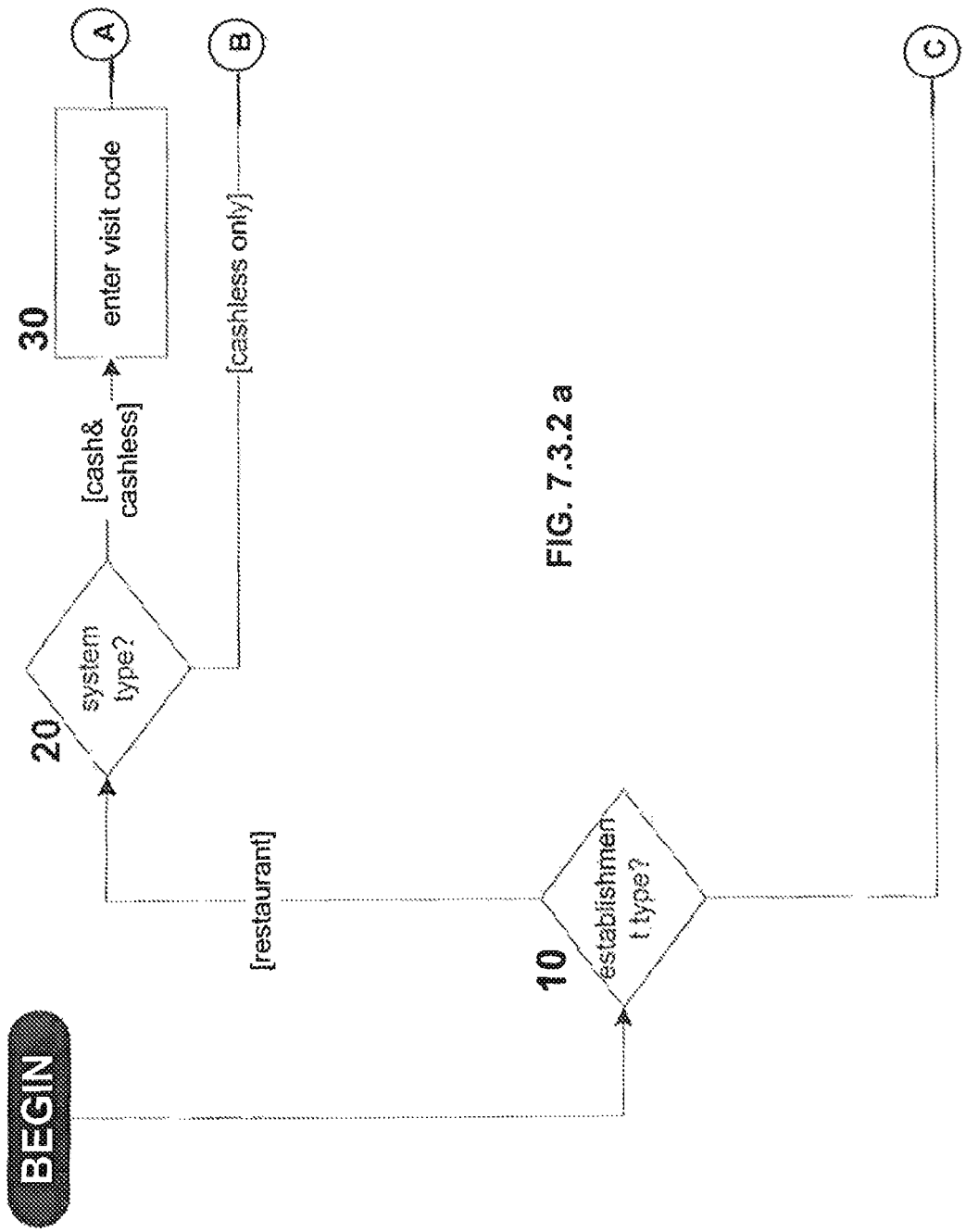
FIG. 7.3.2 a

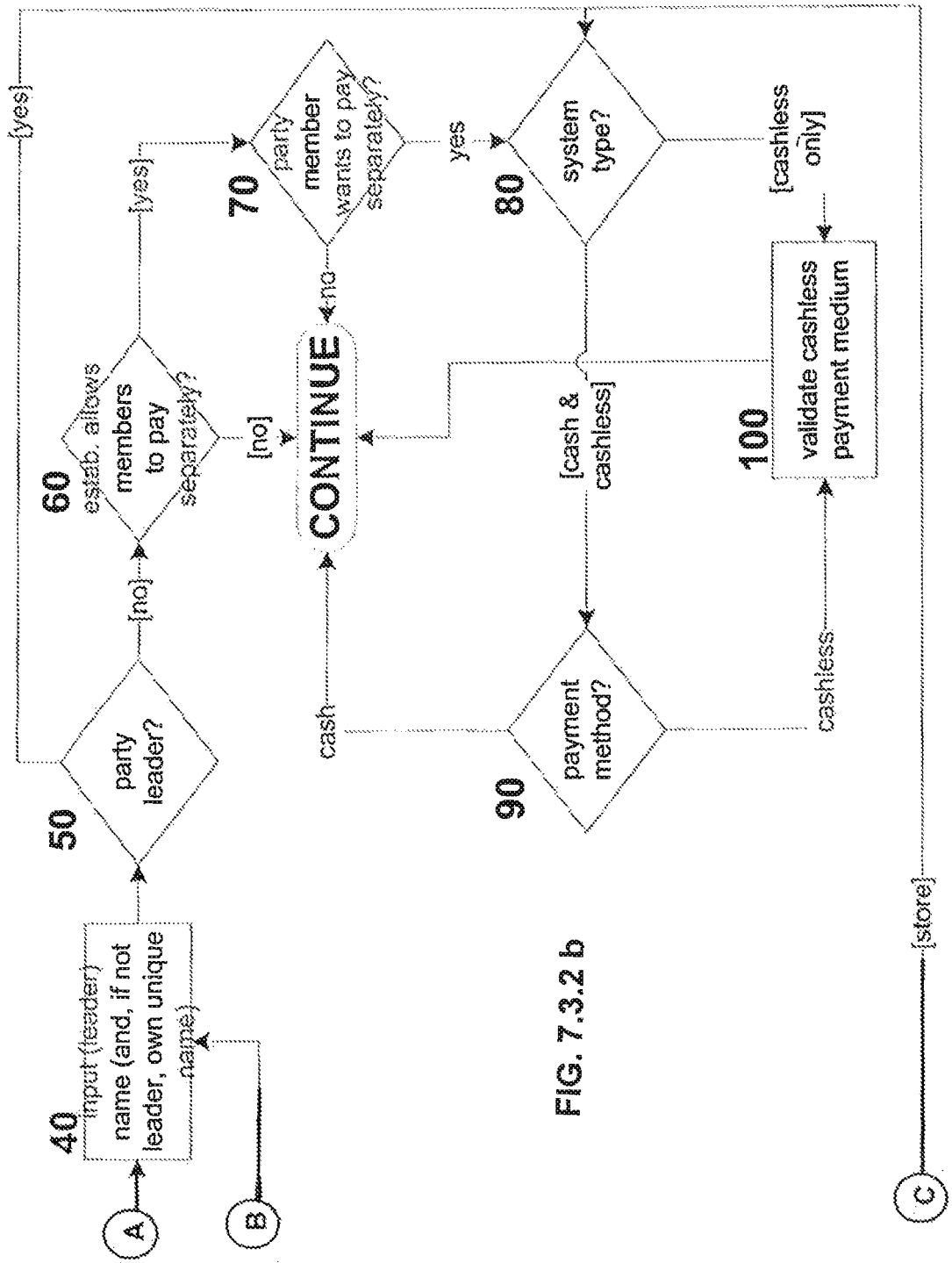
FIG. 7.3.2 b

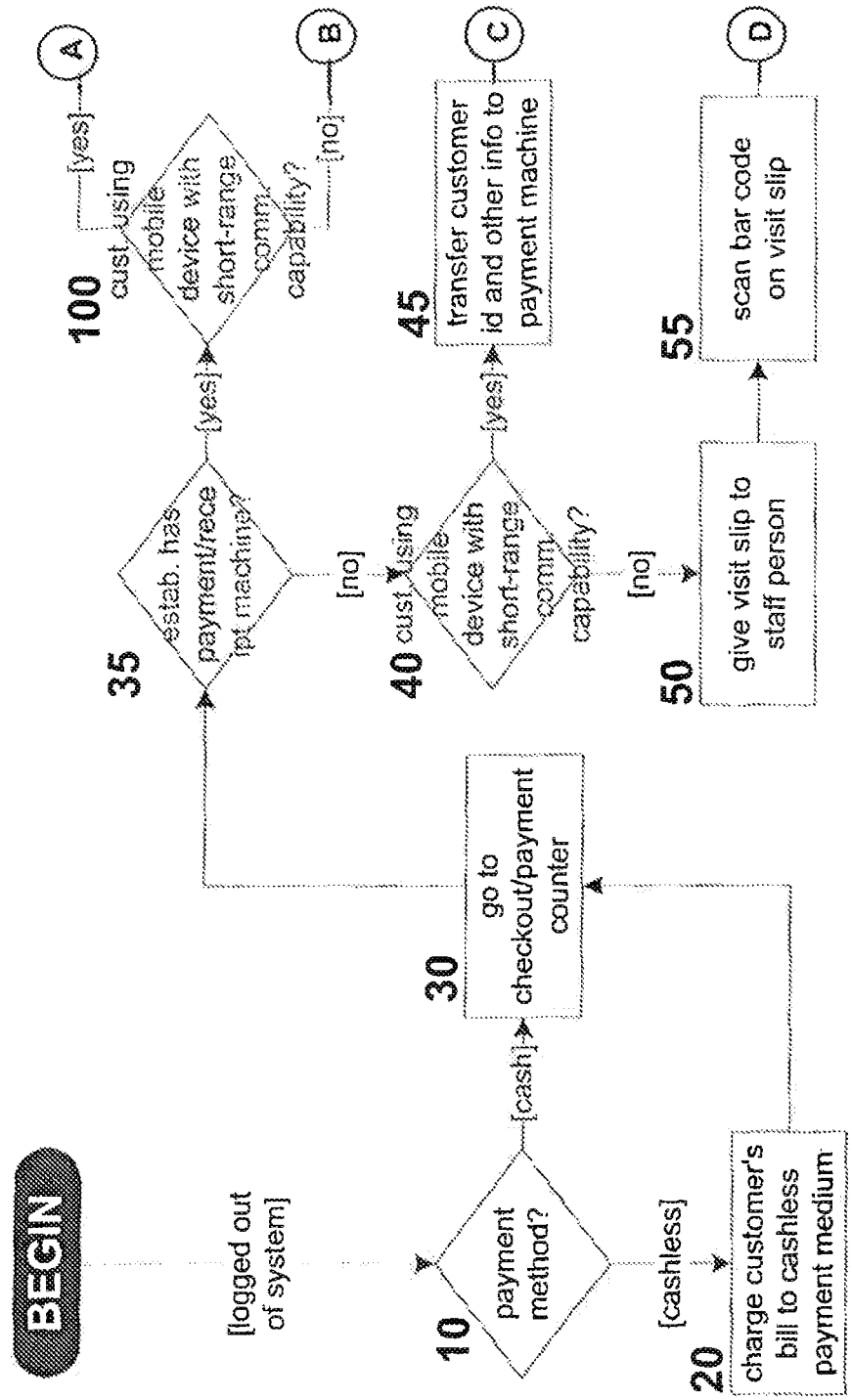
FIG. 8.1.1.1 a

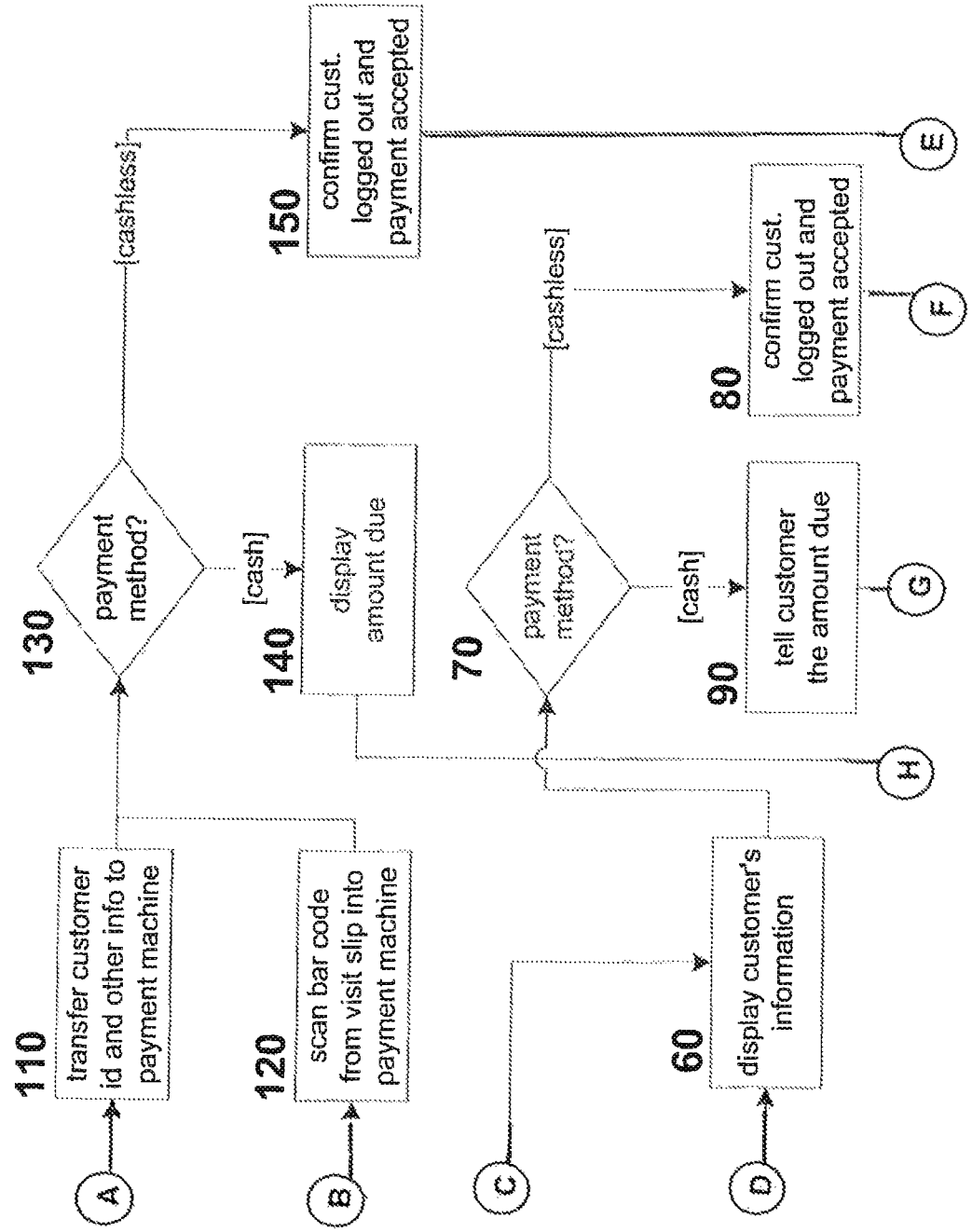
FIG. 8.1.1.1 b

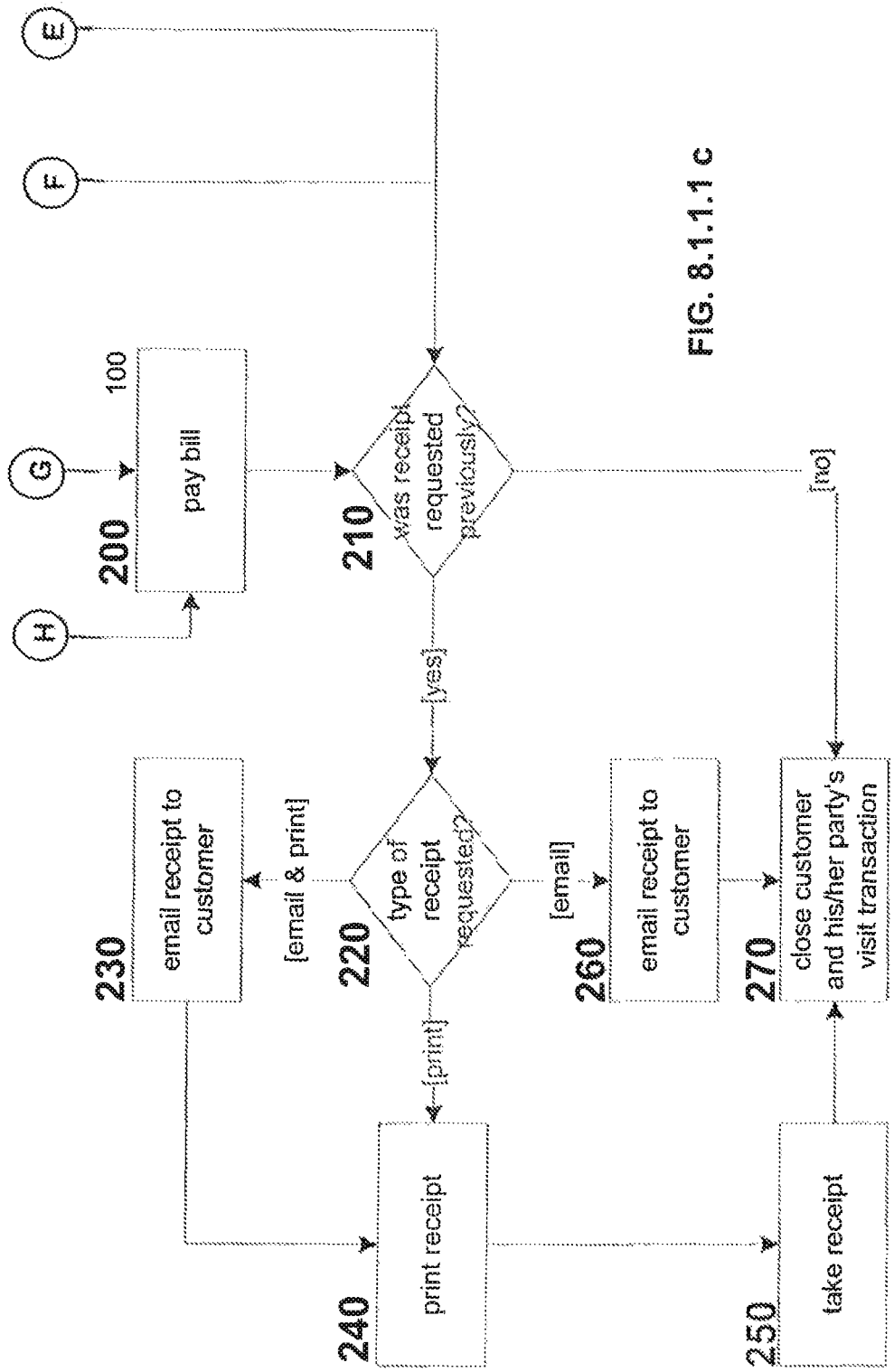
FIG. 8.1.1.1c

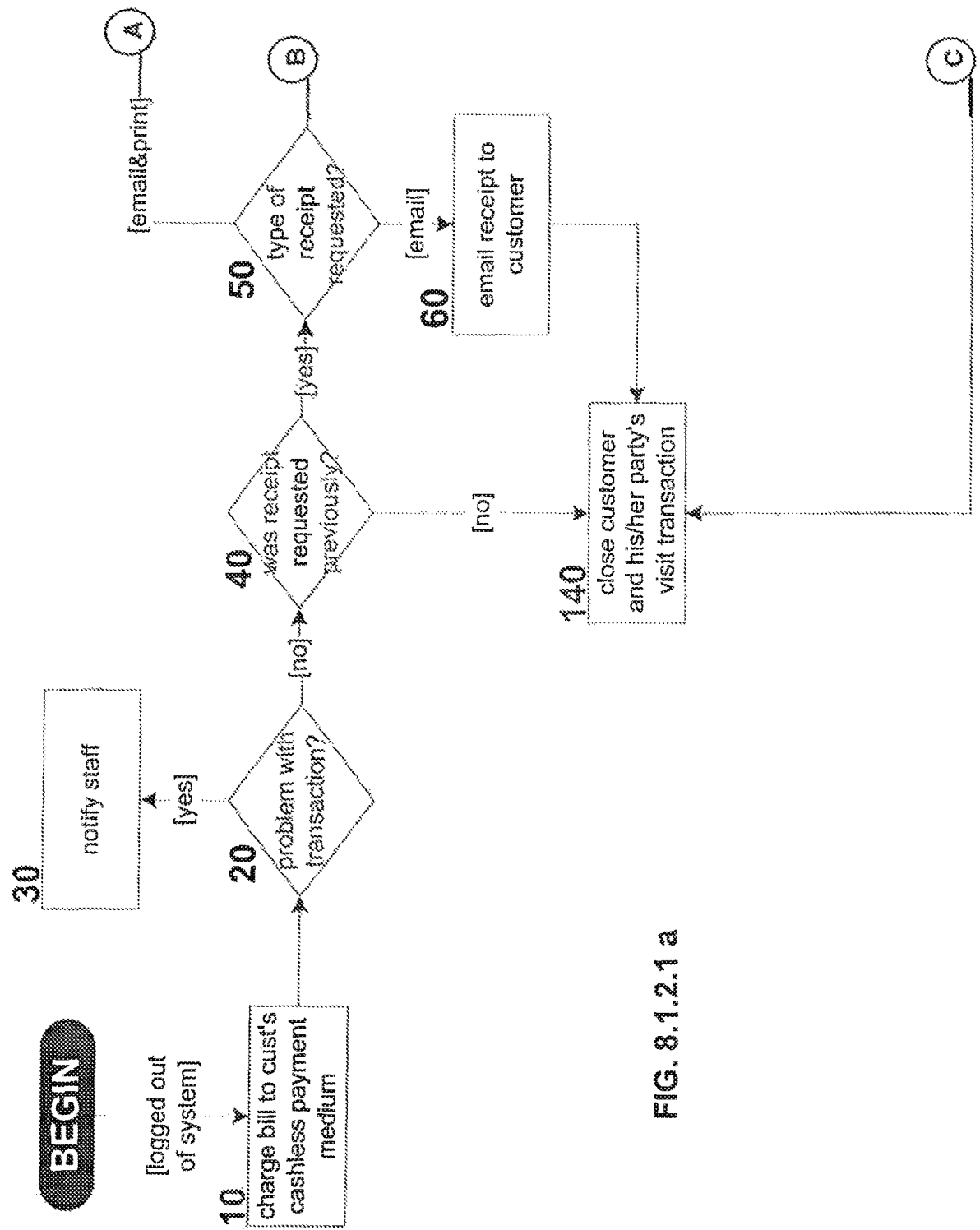
FIG. 8.1.2.1 a

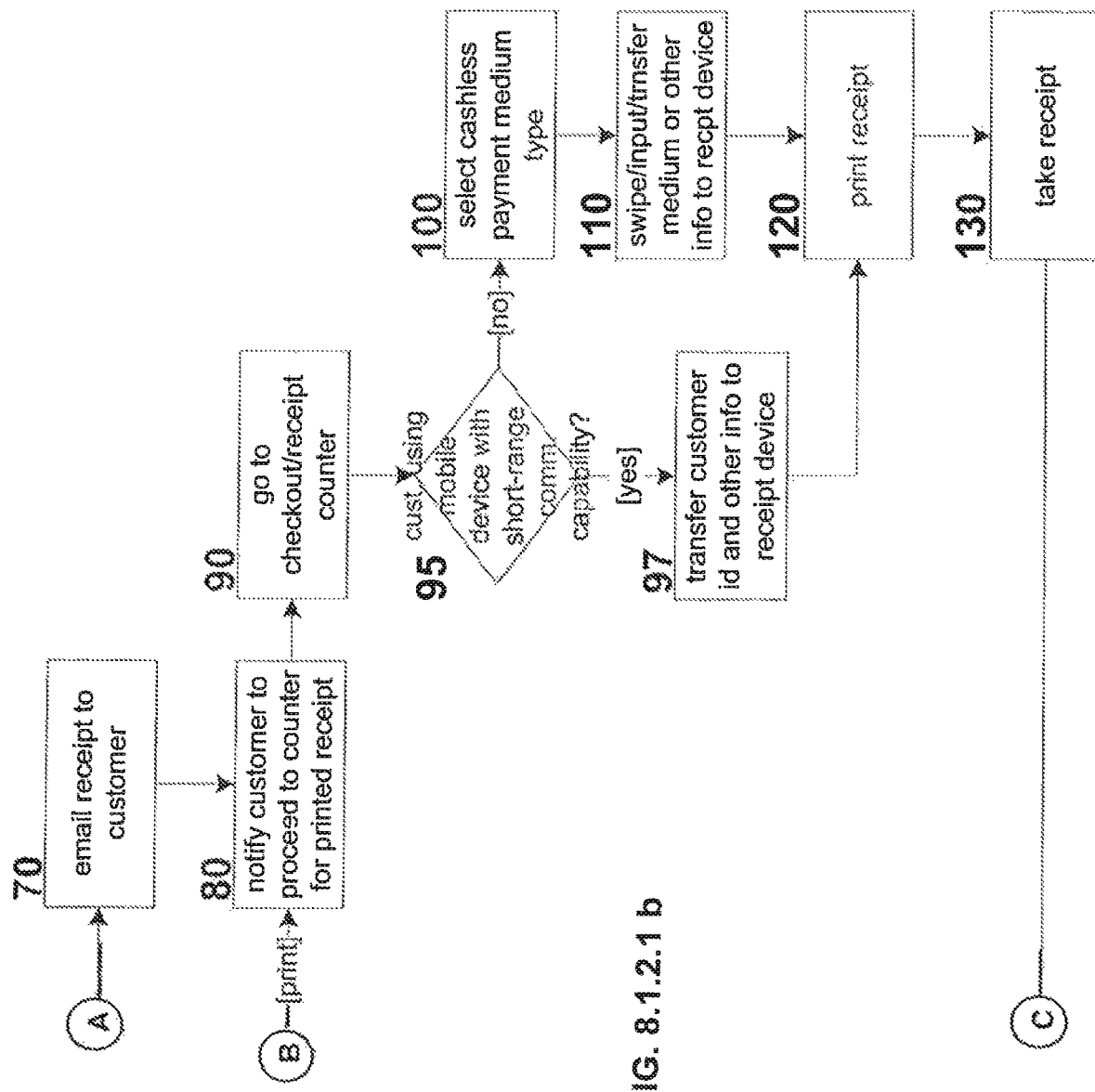
FIG. 8.1.2.1 b

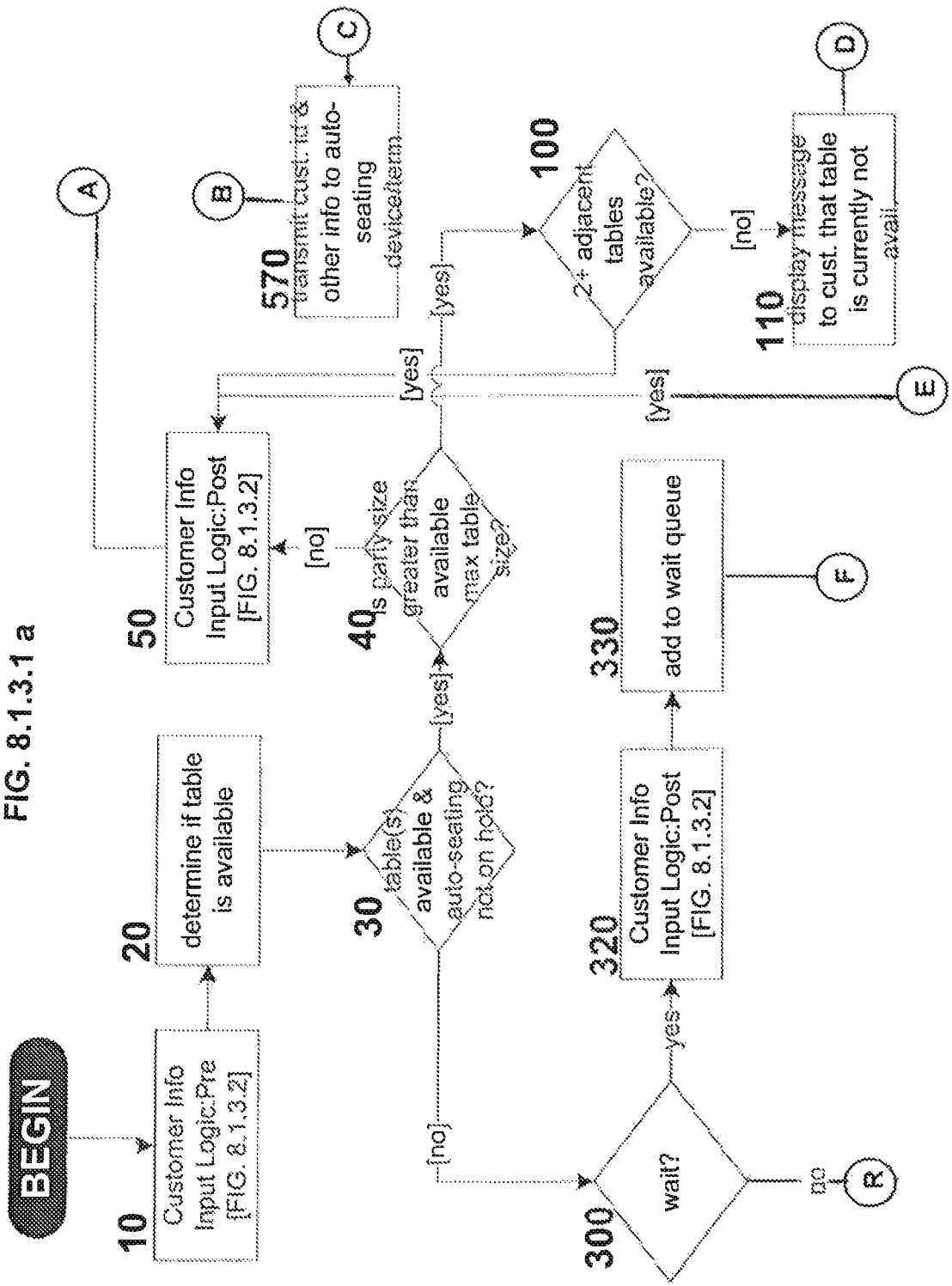
FIG. 8.1.3.1 a

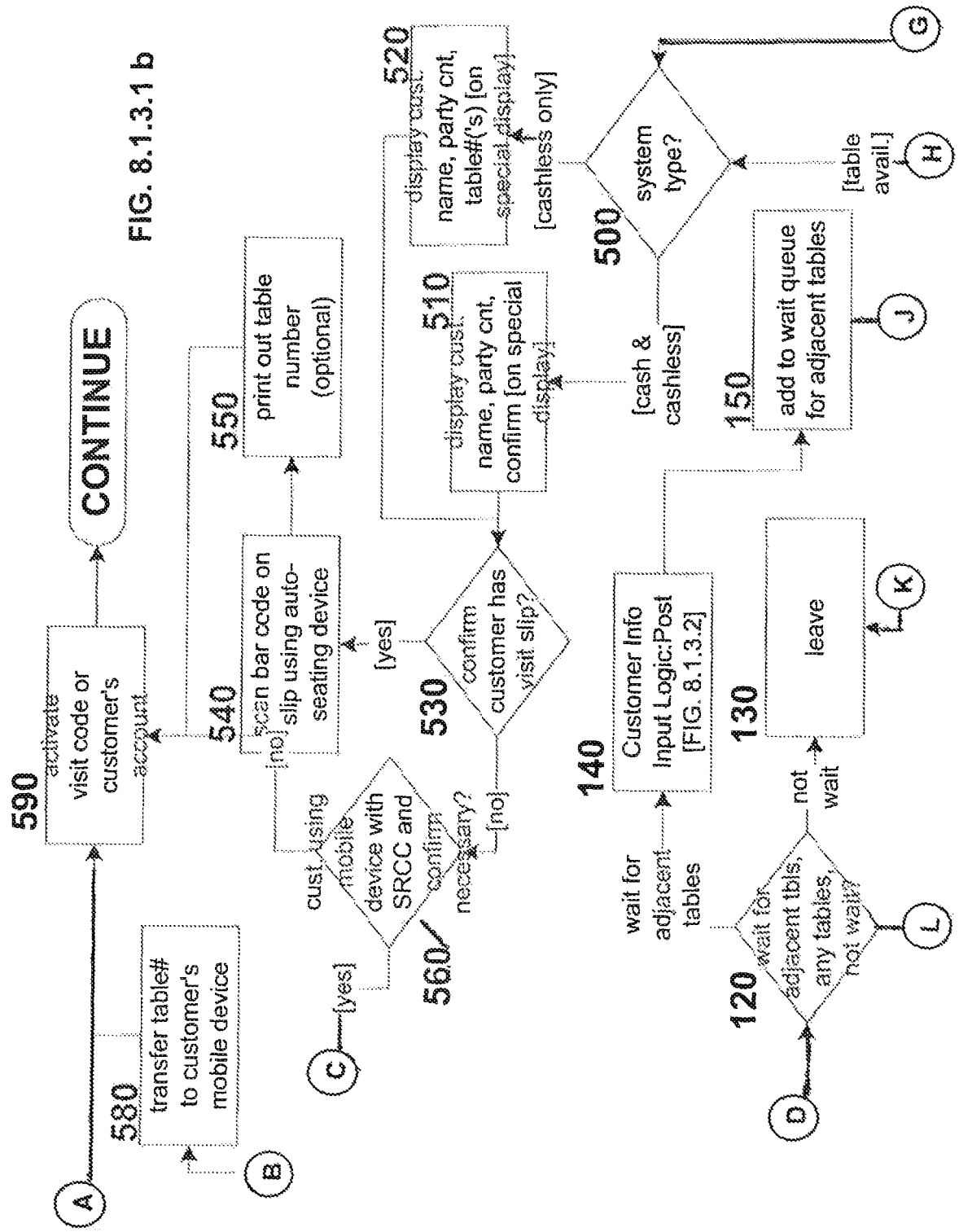
FIG. 8.1.3.1 b

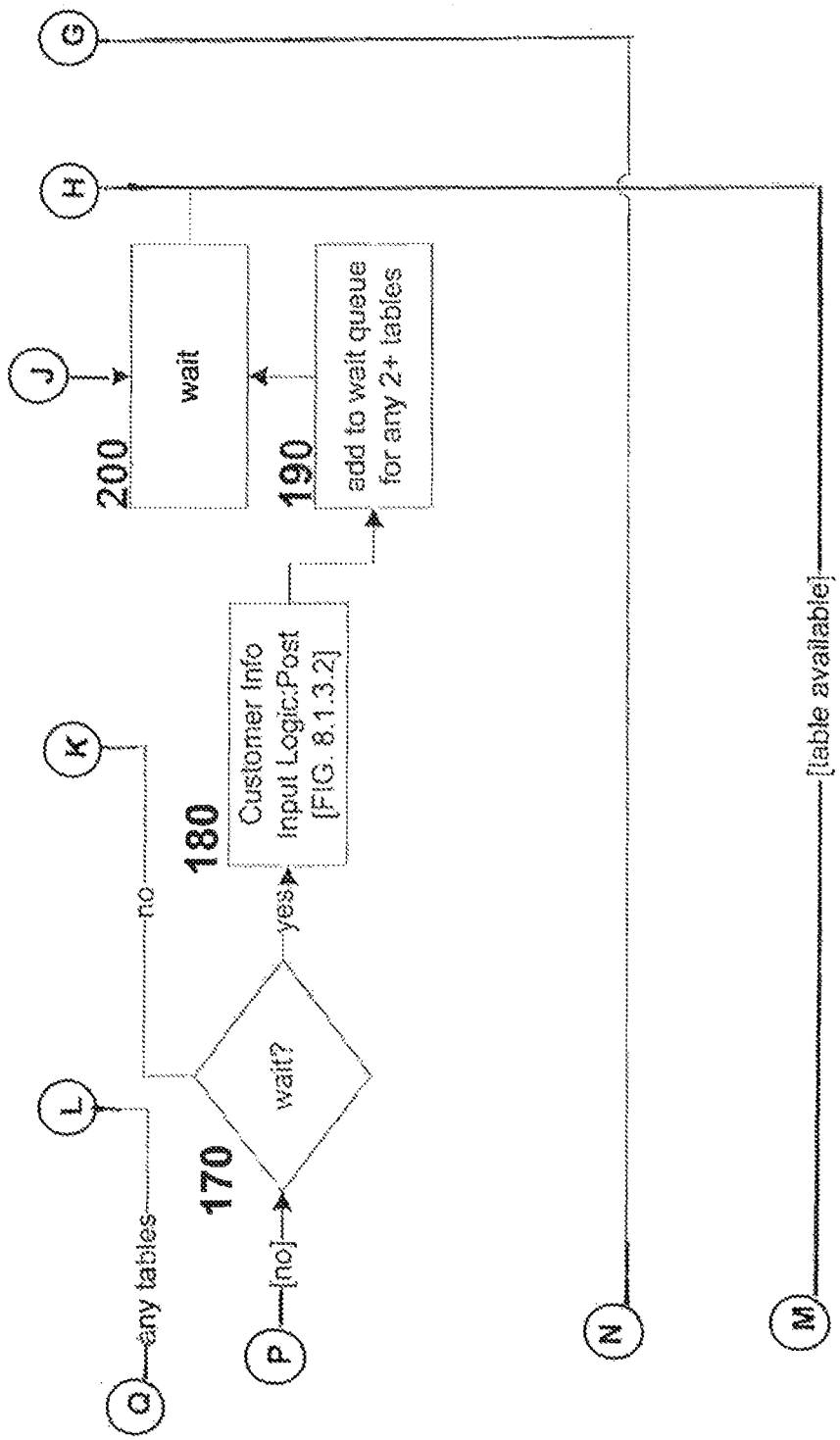
FIG. 8.1.3.1c

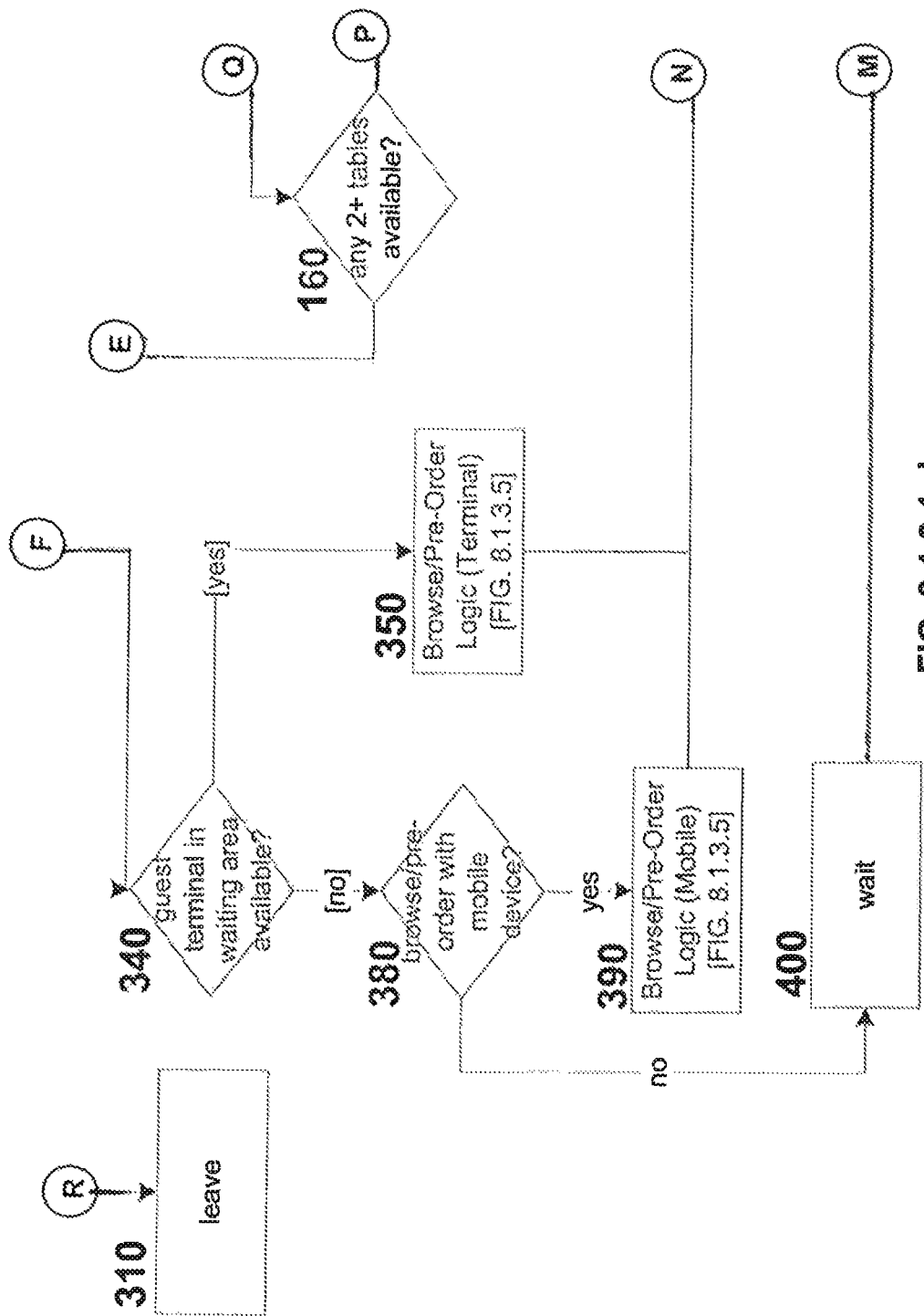
FIG. 8.1.3.1 d

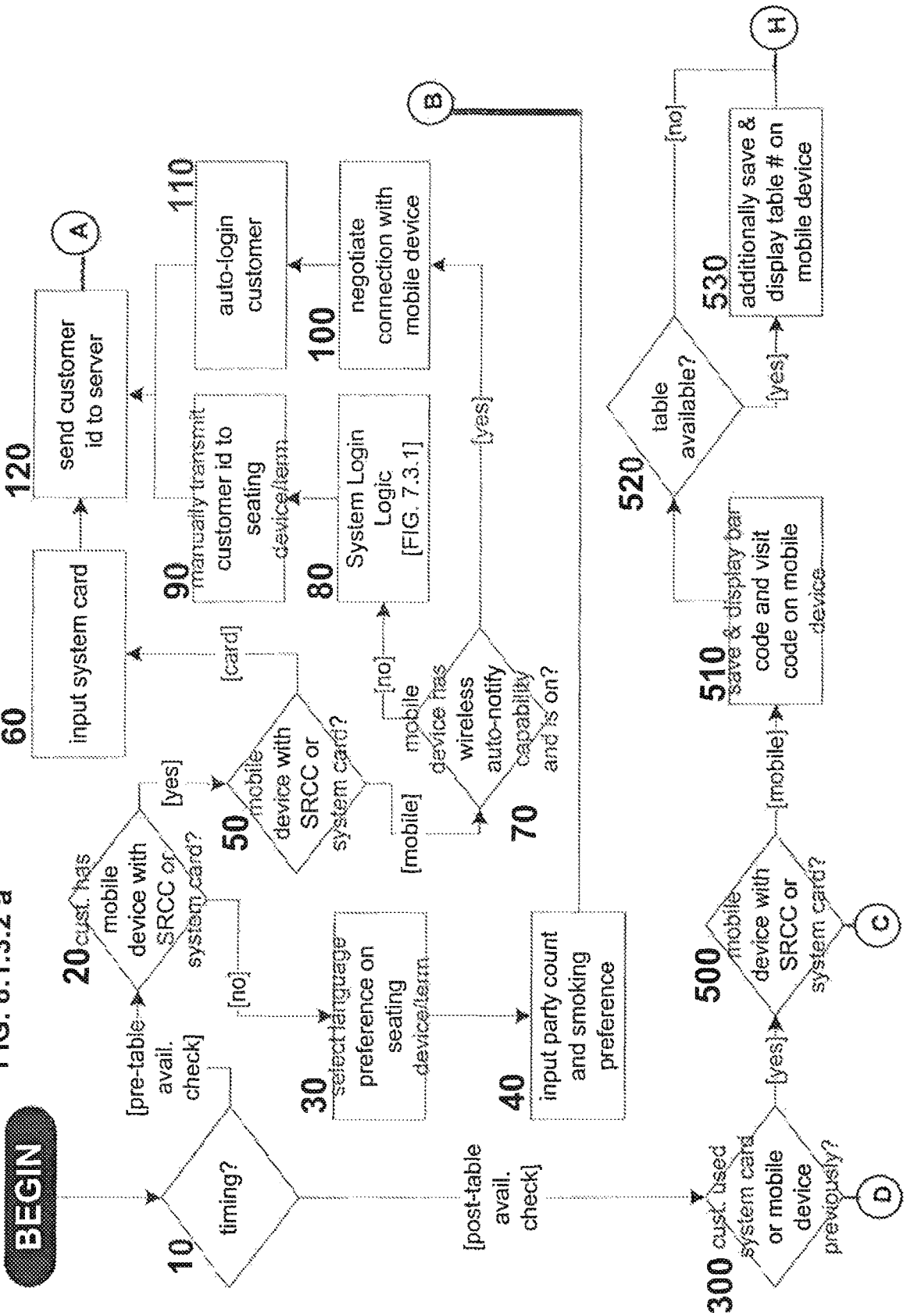

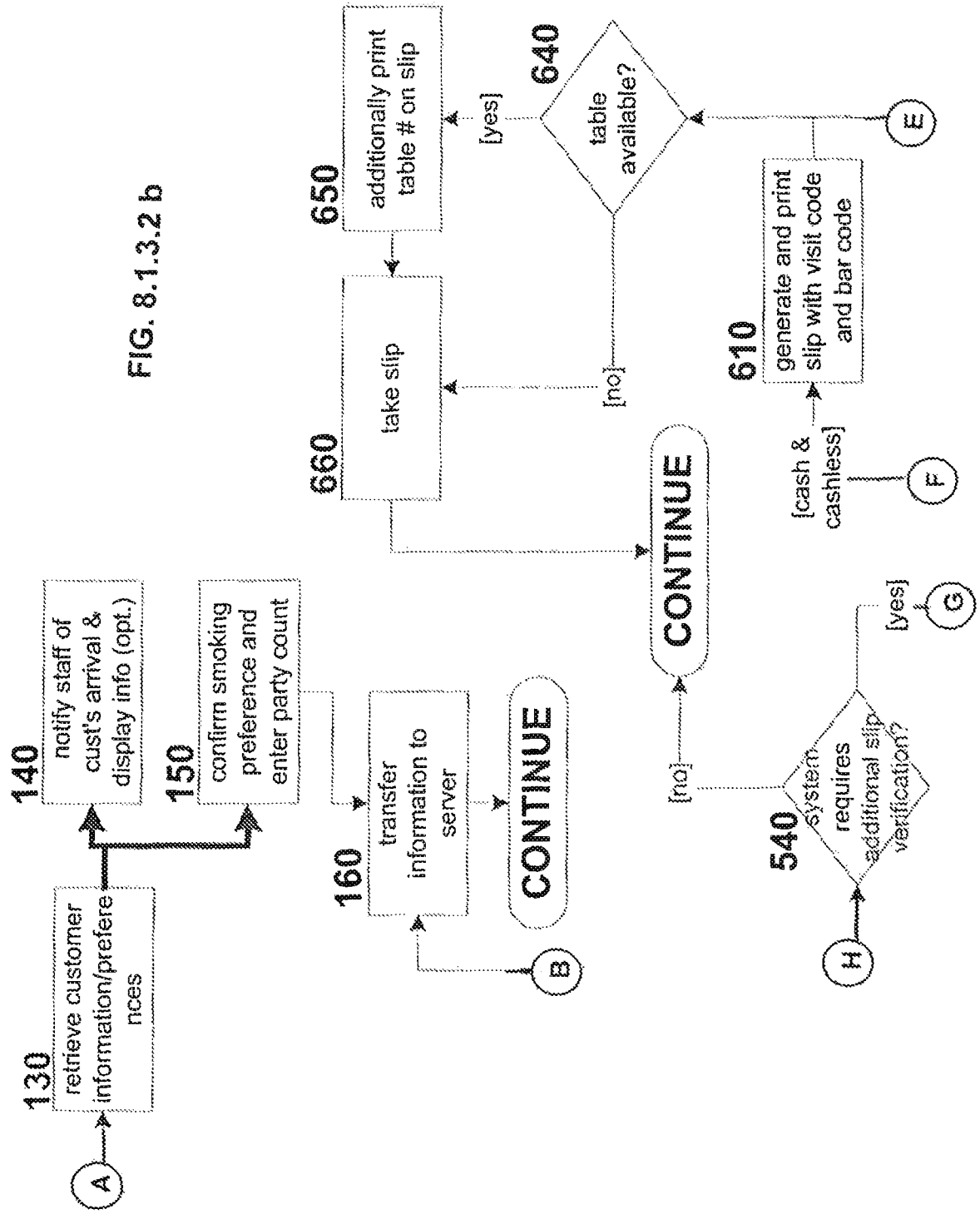
FIG. 8.1.3.2 b

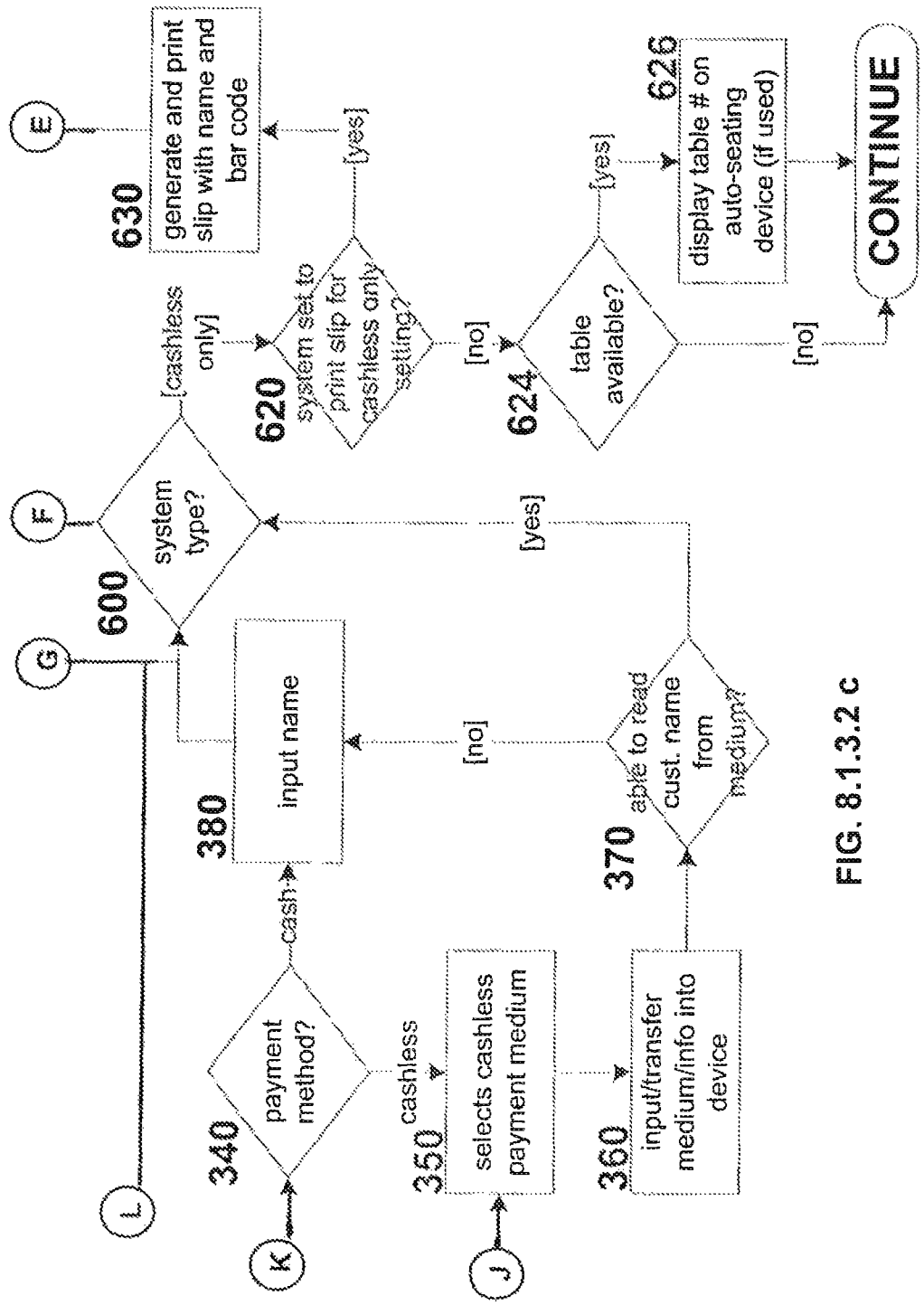
FIG. 8.1.3.2 c

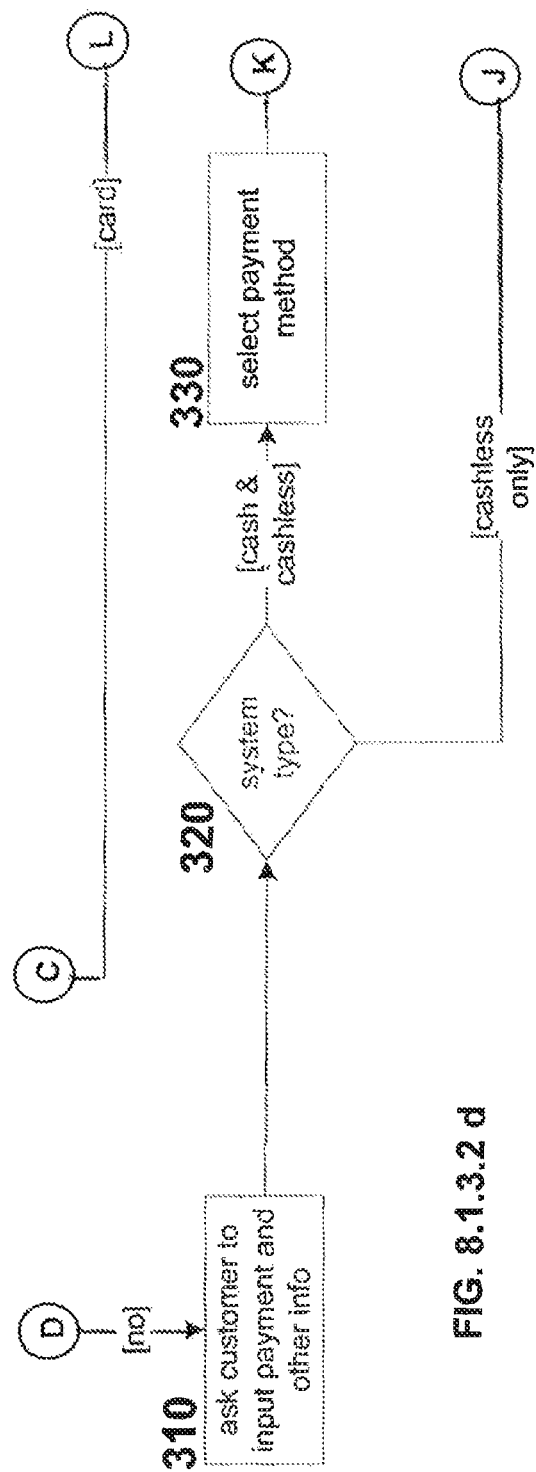
FIG. 8.1.3.2 d

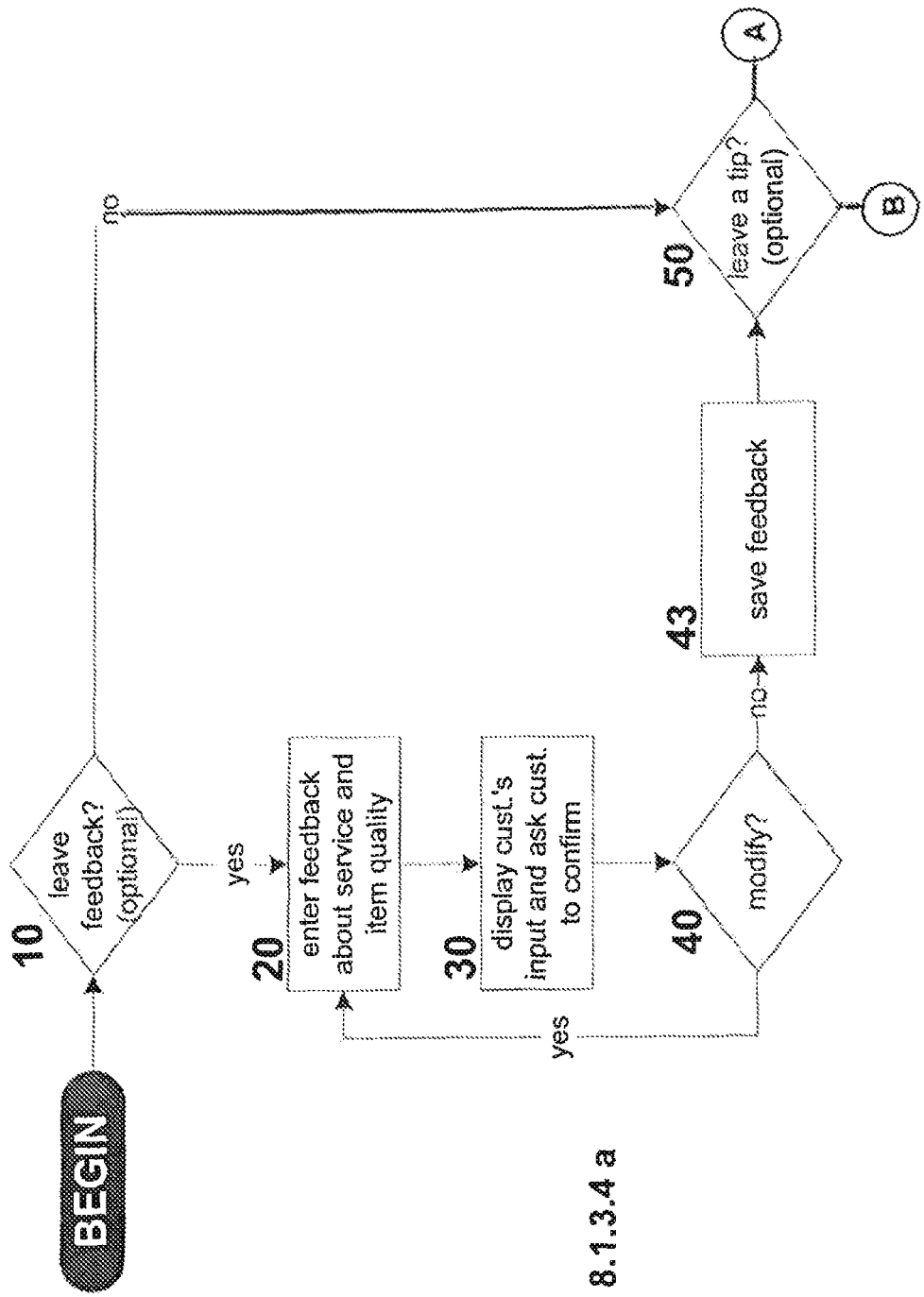
FIG. 8.1.3.4 a

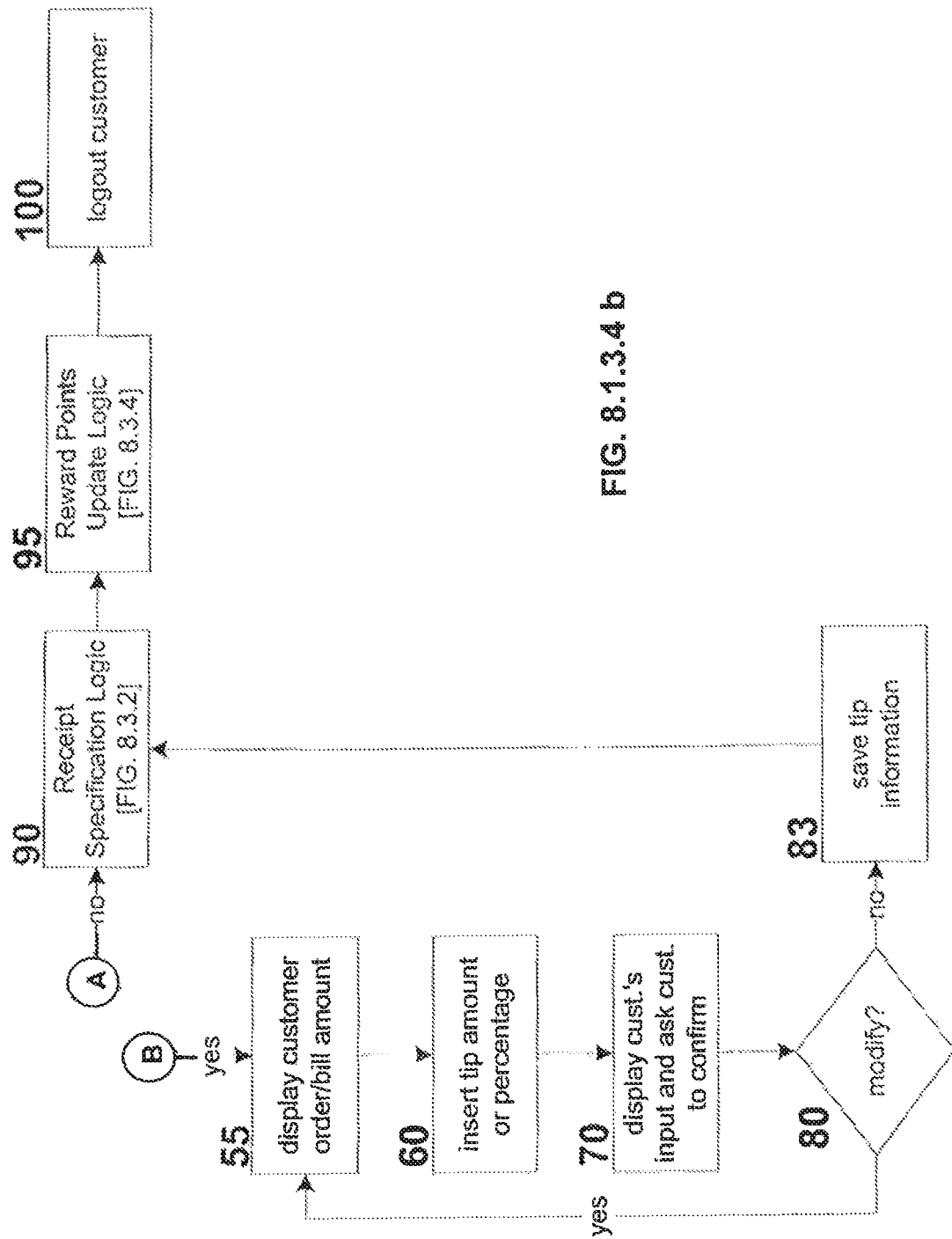
FIG. 8.1.3.4 b

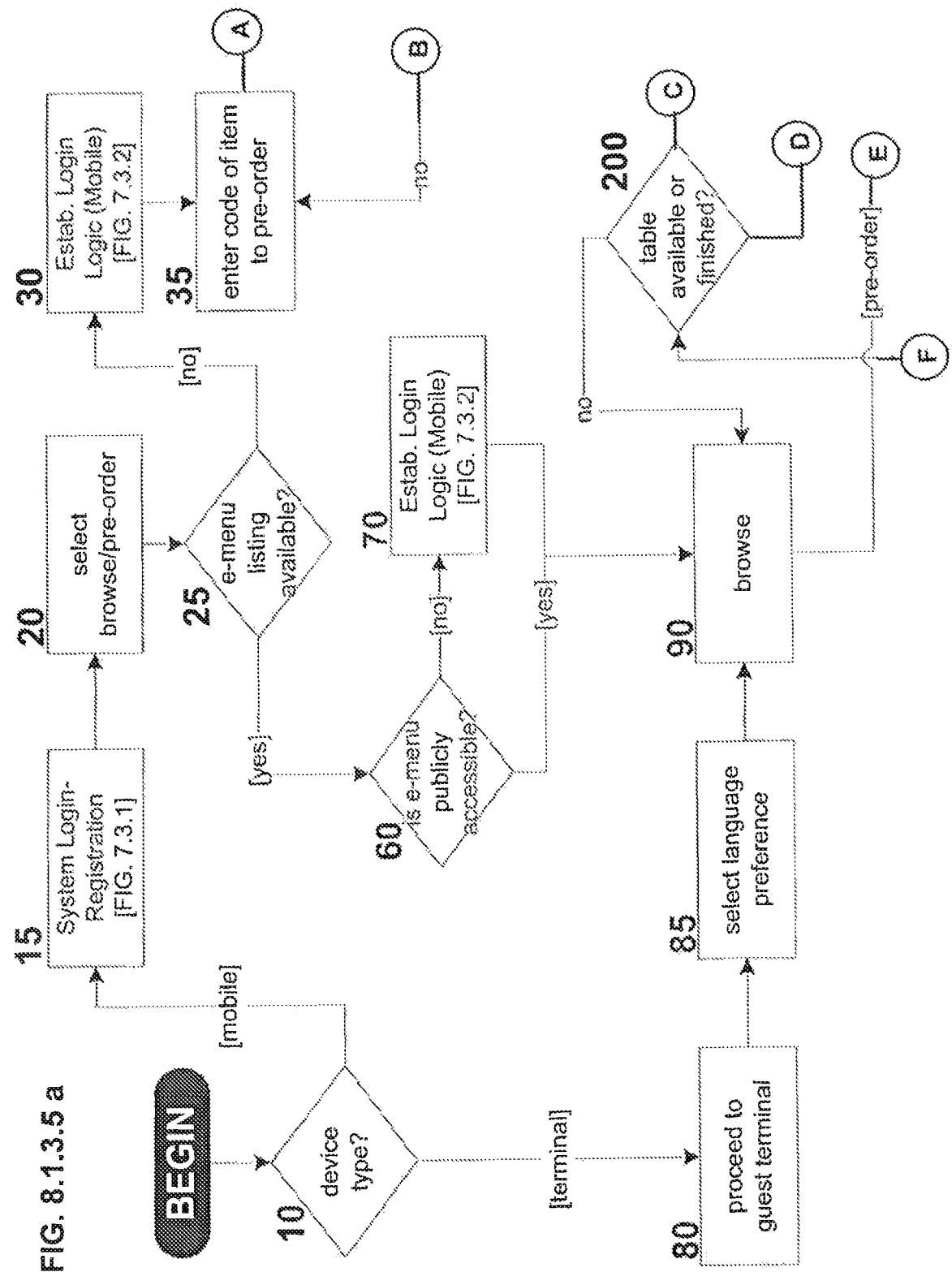

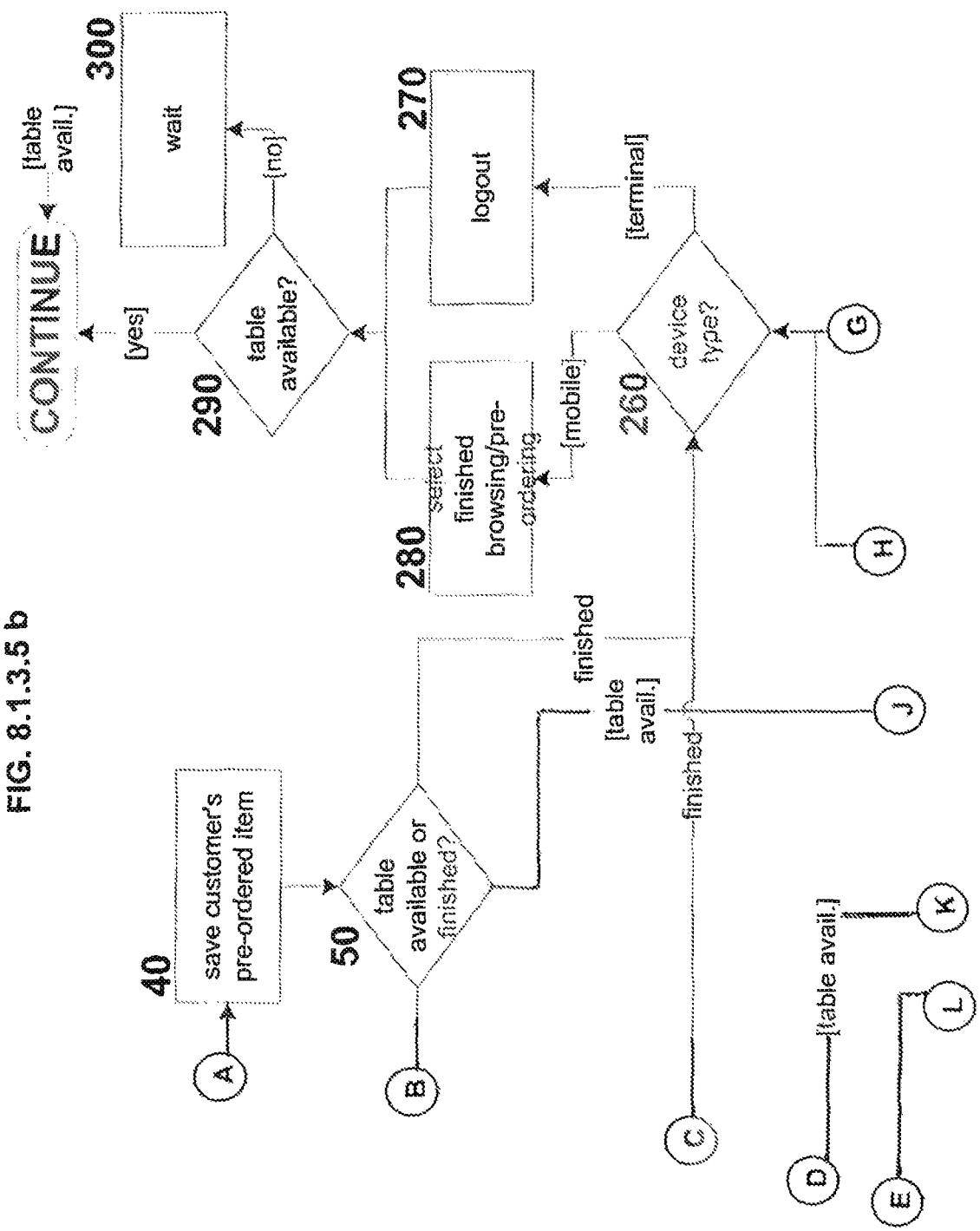
FIG. 8.1.3.5 b

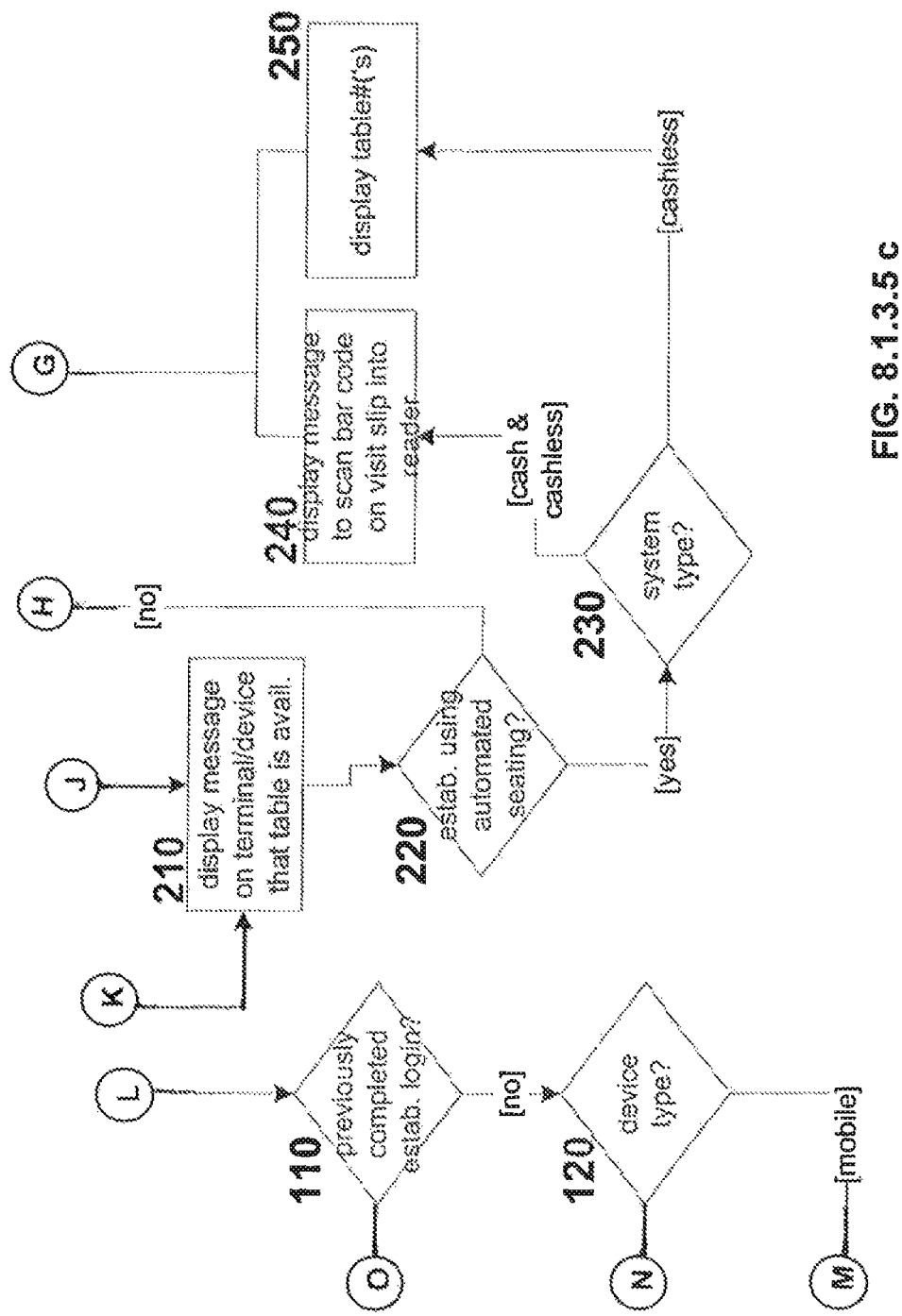
FIG. 8.1.3.5 c

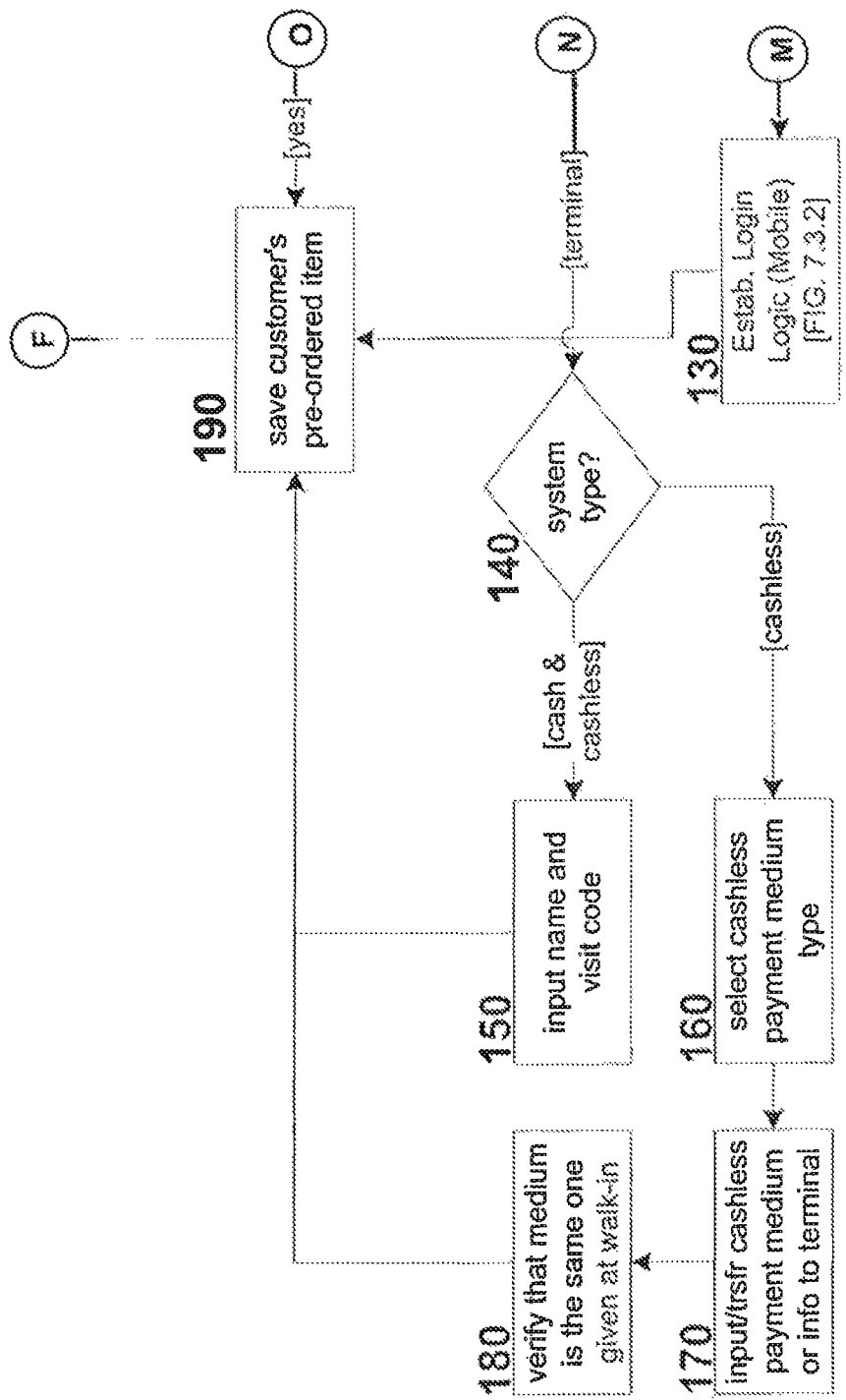
FIG. 8.1.3.5 d

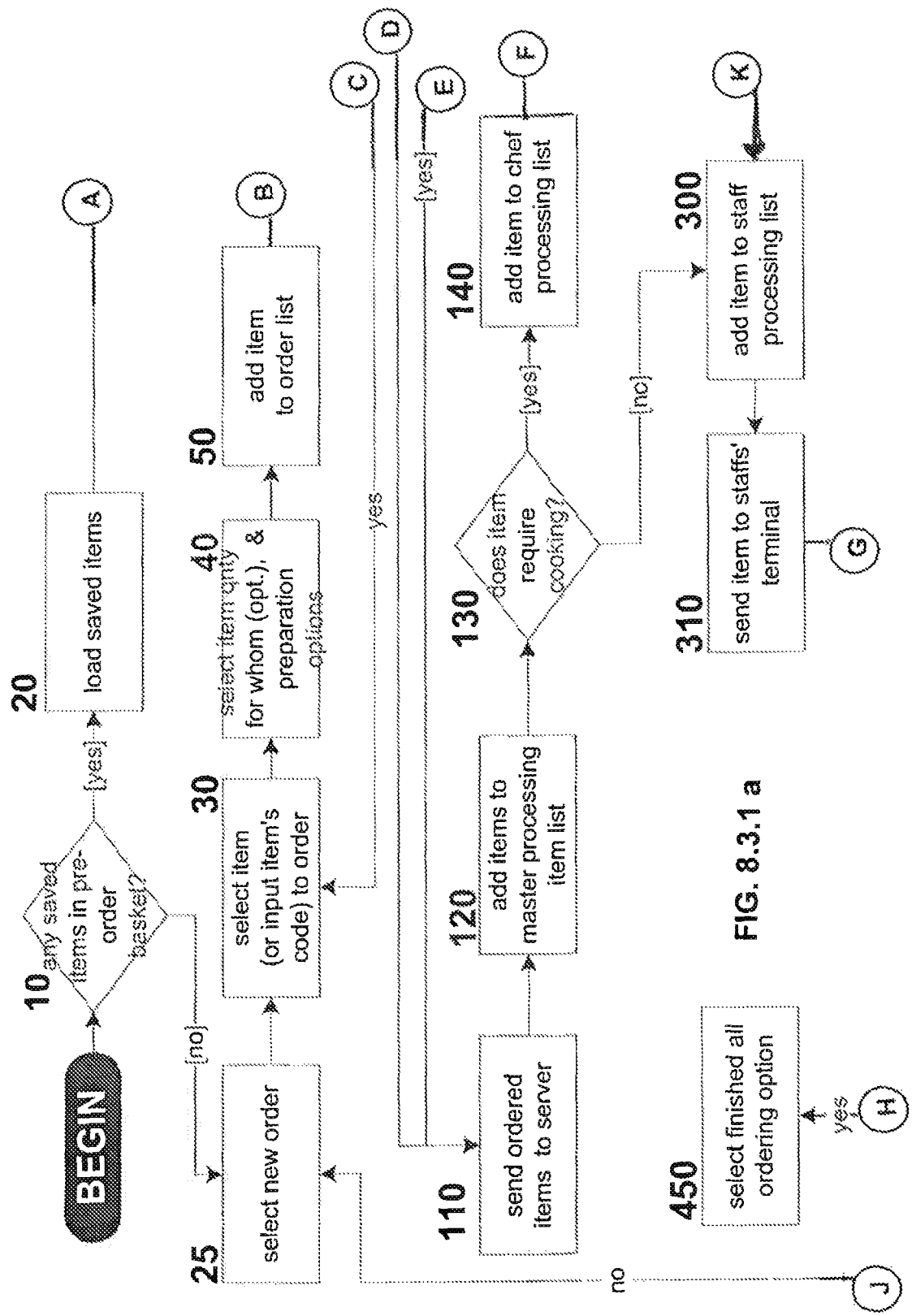
FIG. 8.3.1 a

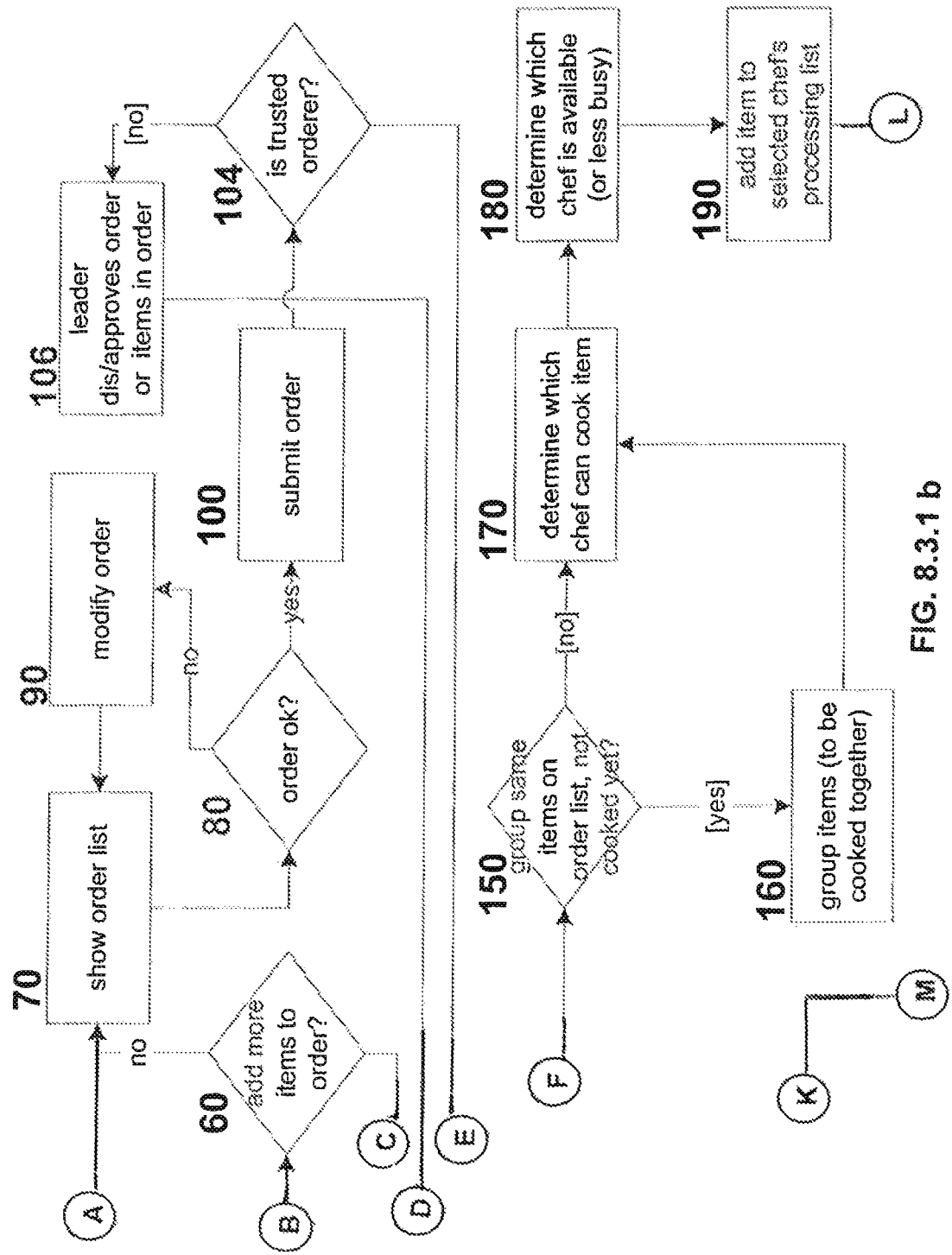
FIG. 8.3.1 b

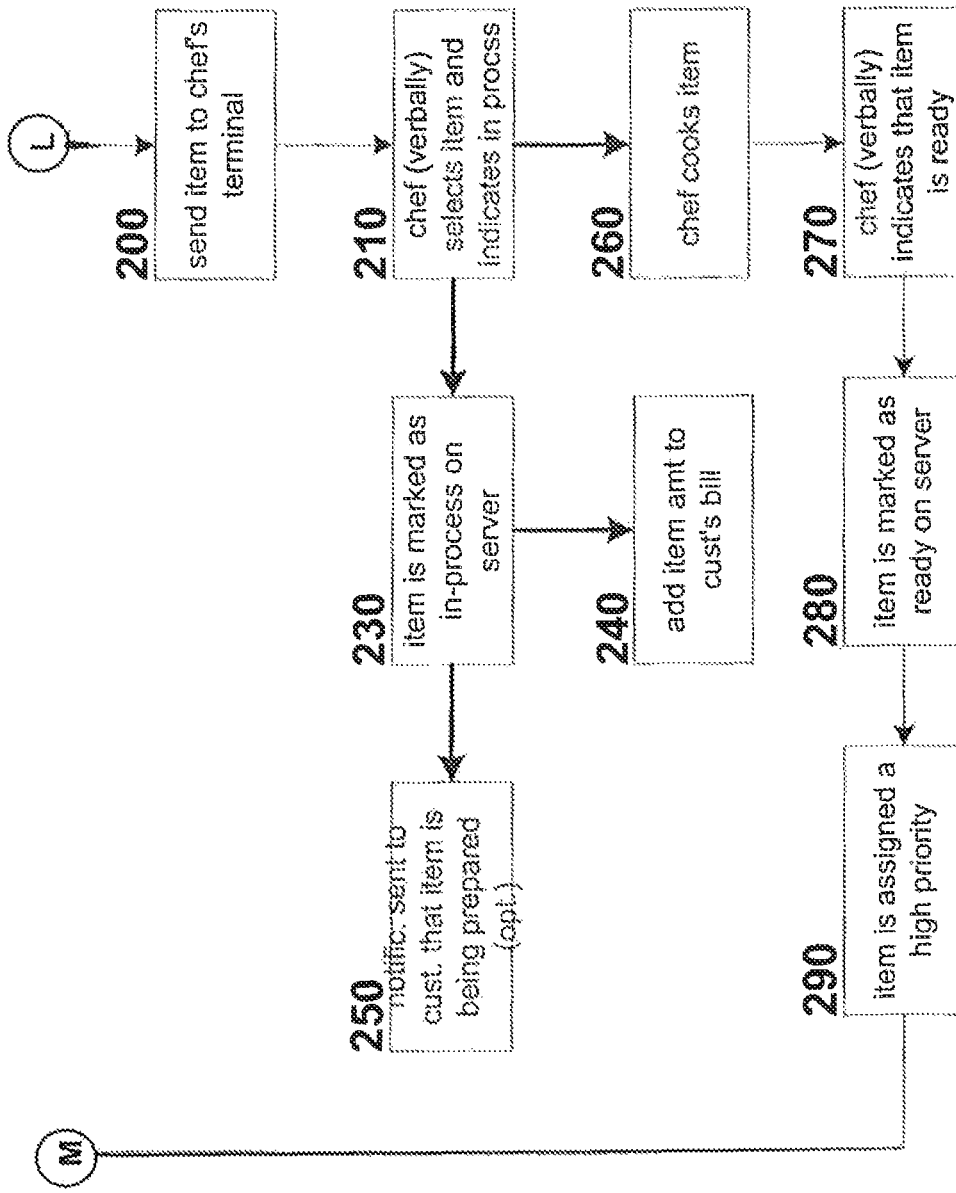
FIG. 8.3.1 c

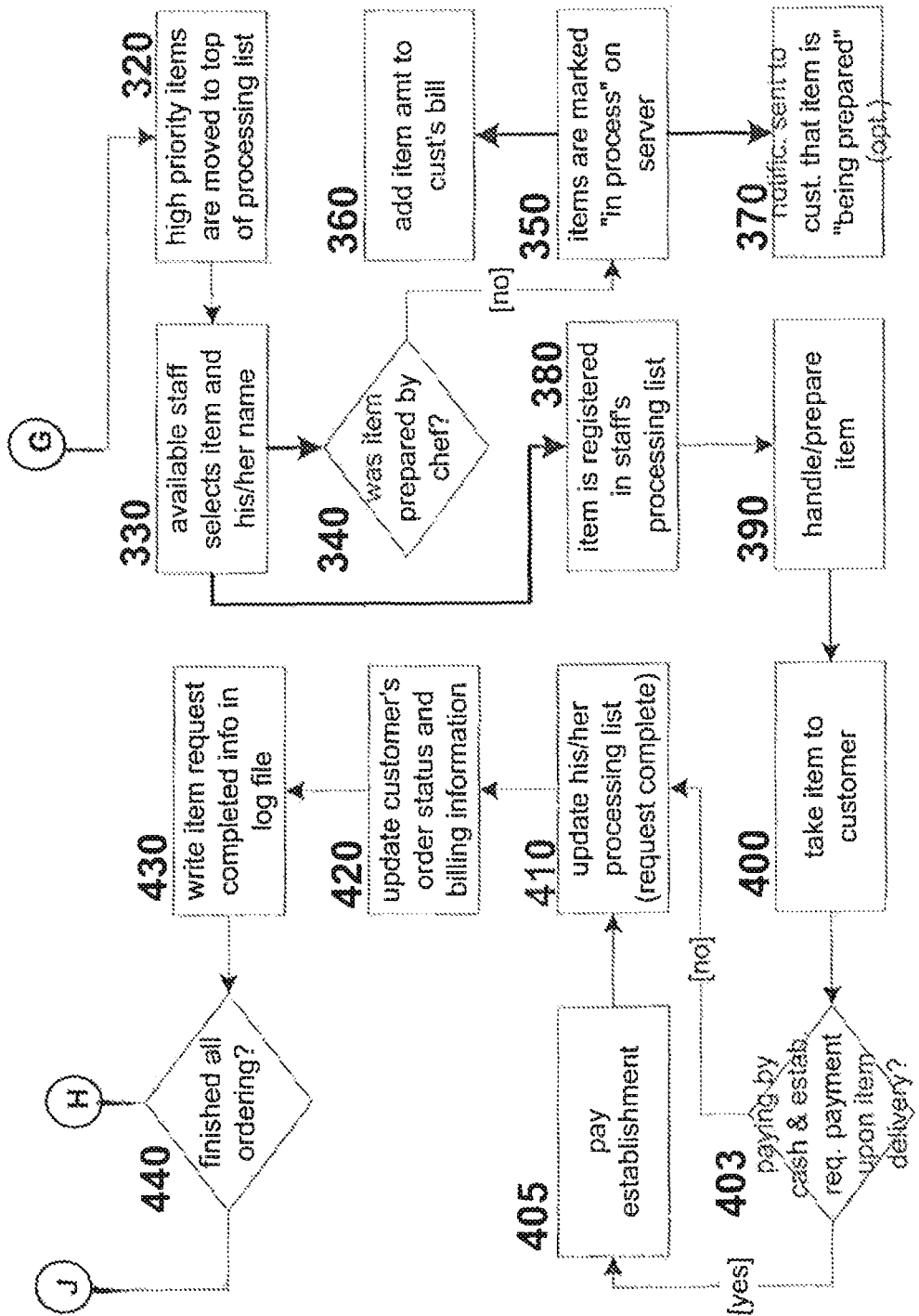
FIG. 8.3.1 d

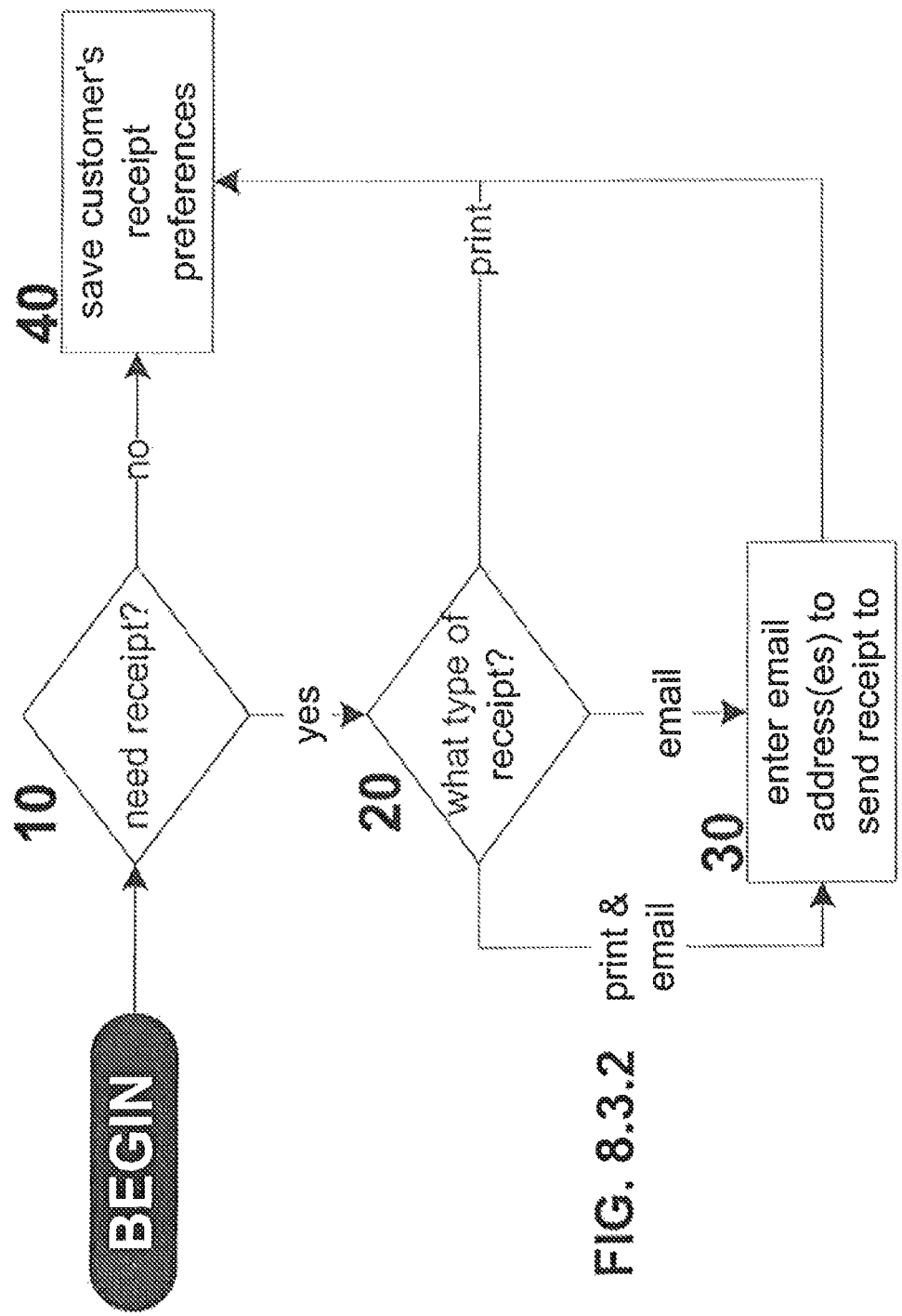
FIG. 8.3.2

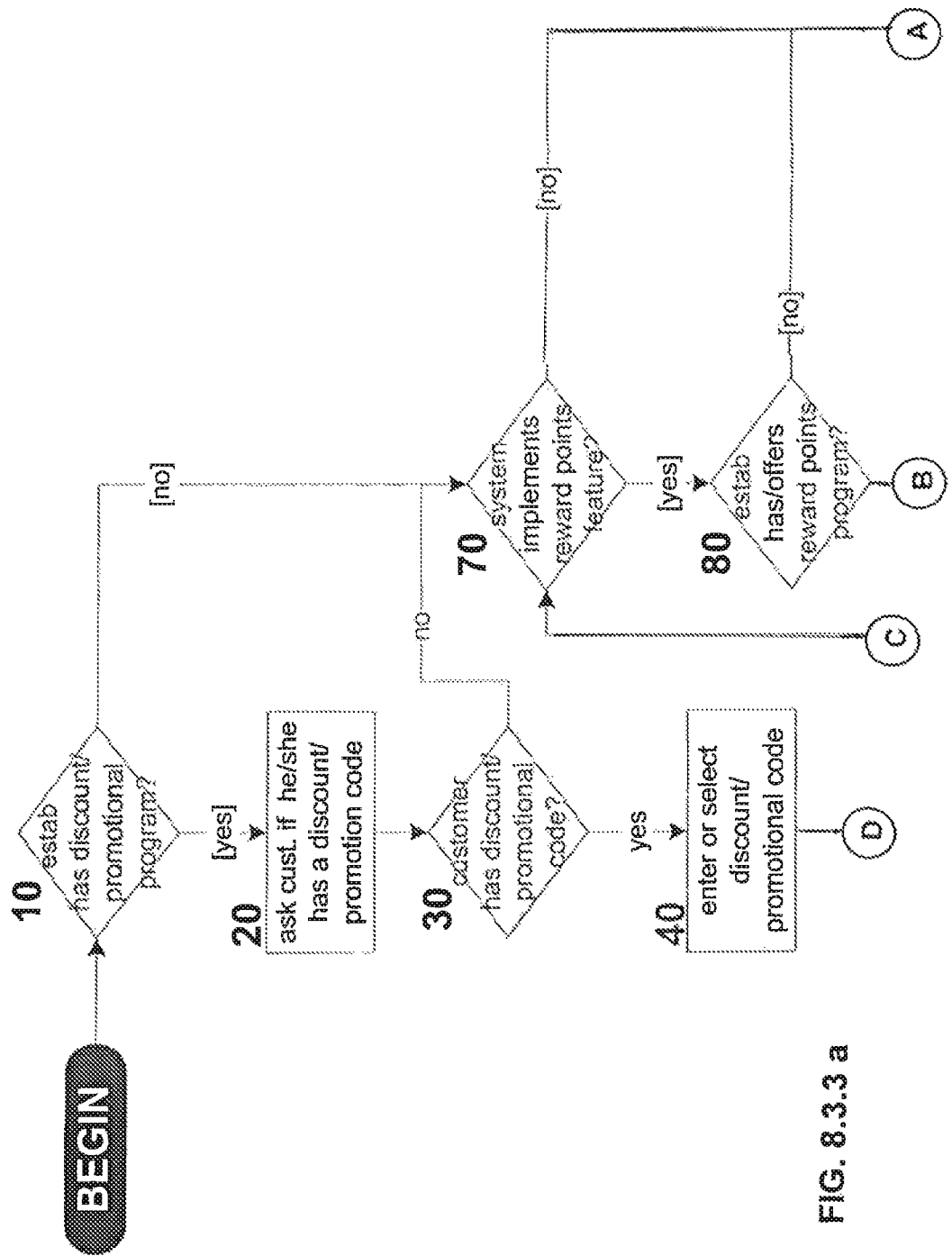
FIG. 8.3.3 a

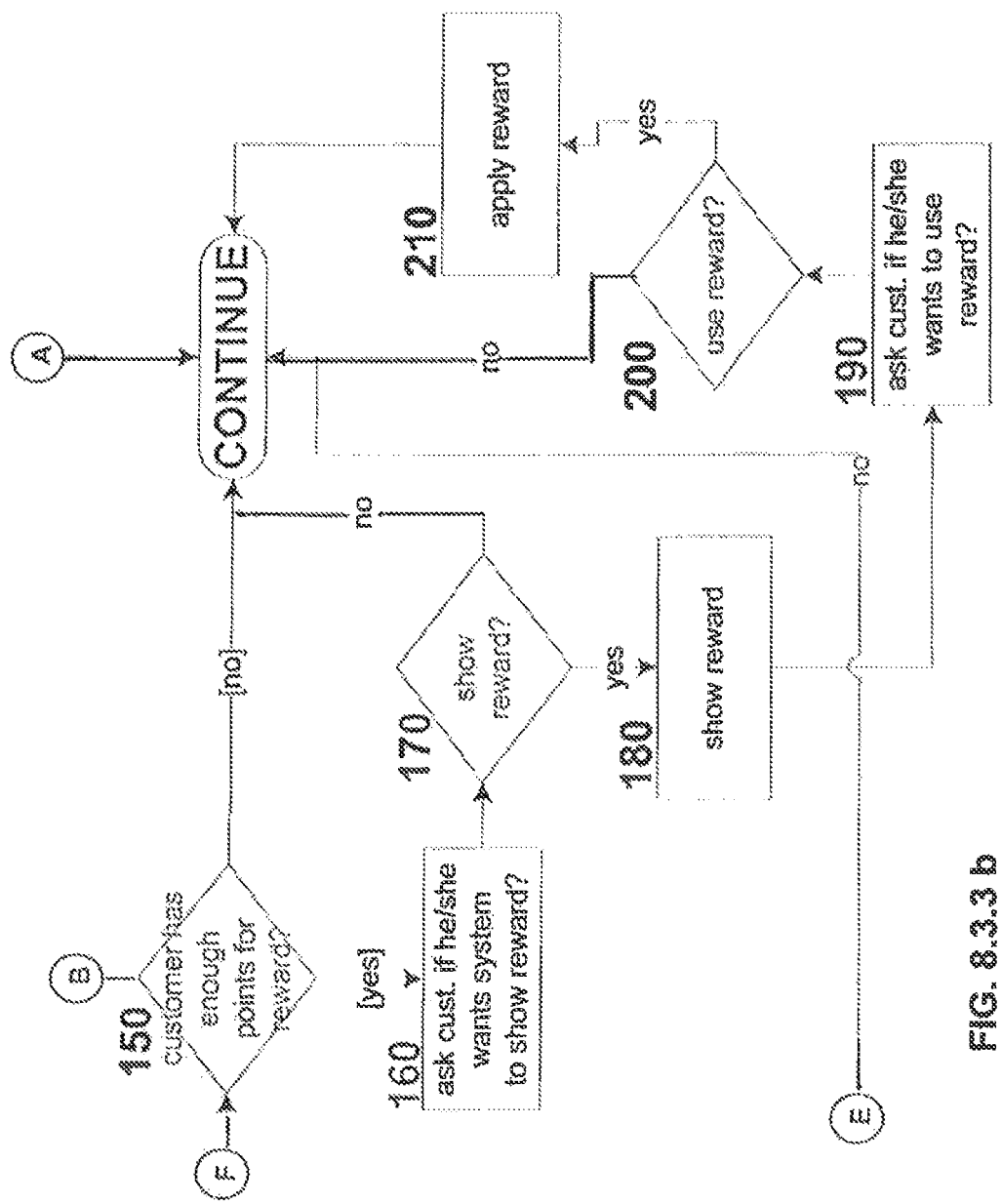
FIG. 8.3.3 b

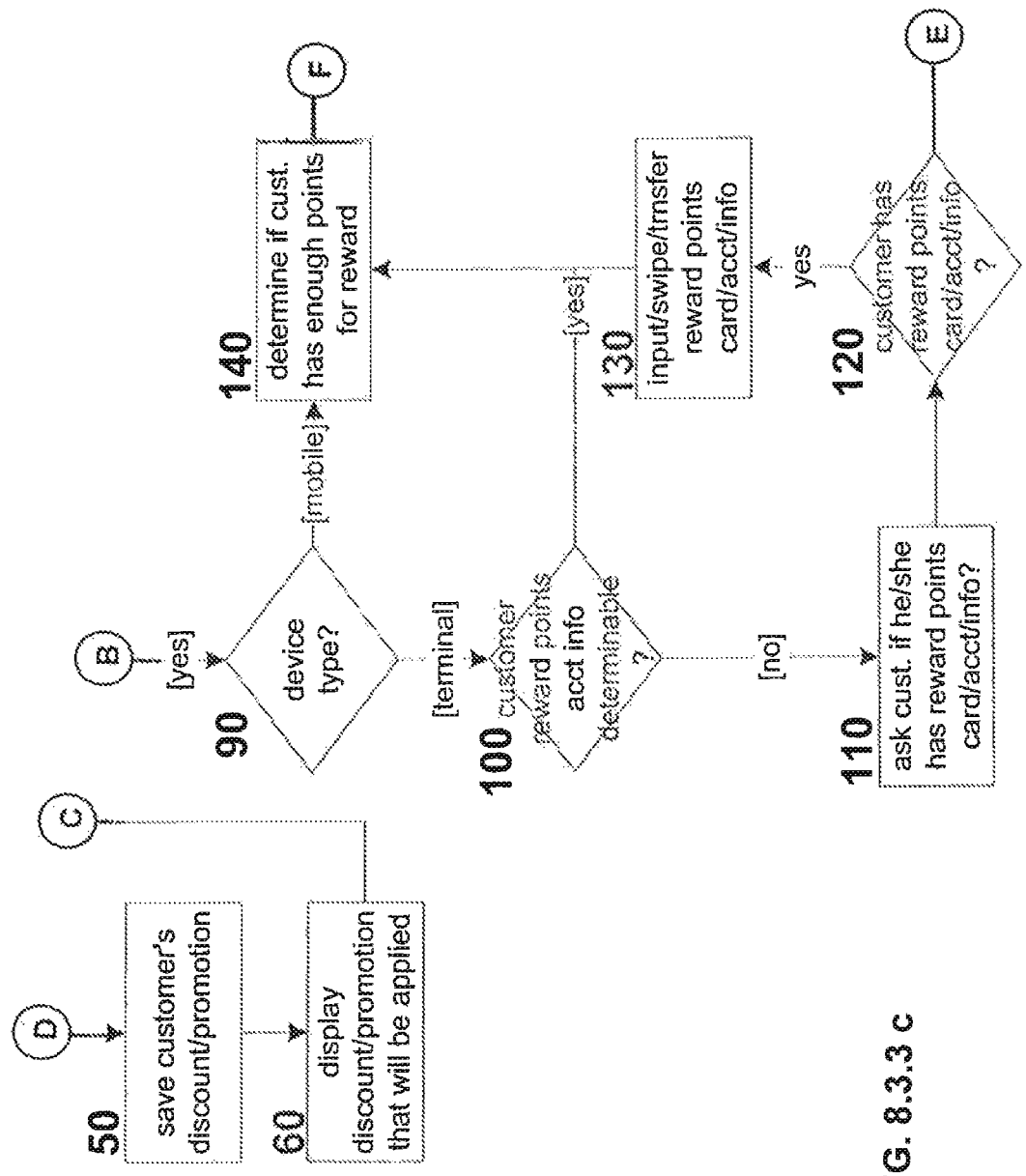
FIG. 8.3.3 c

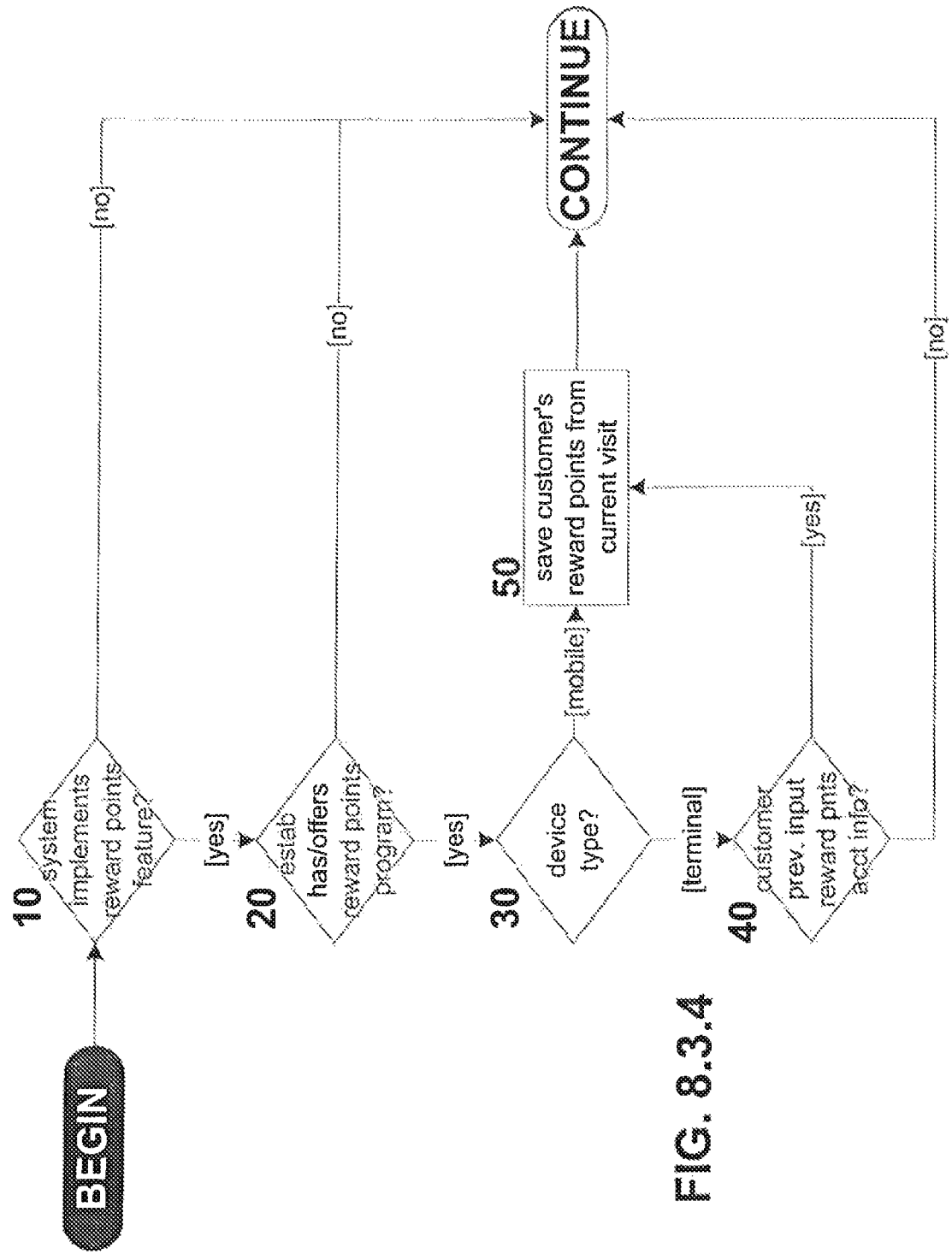
FIG. 8.3.4

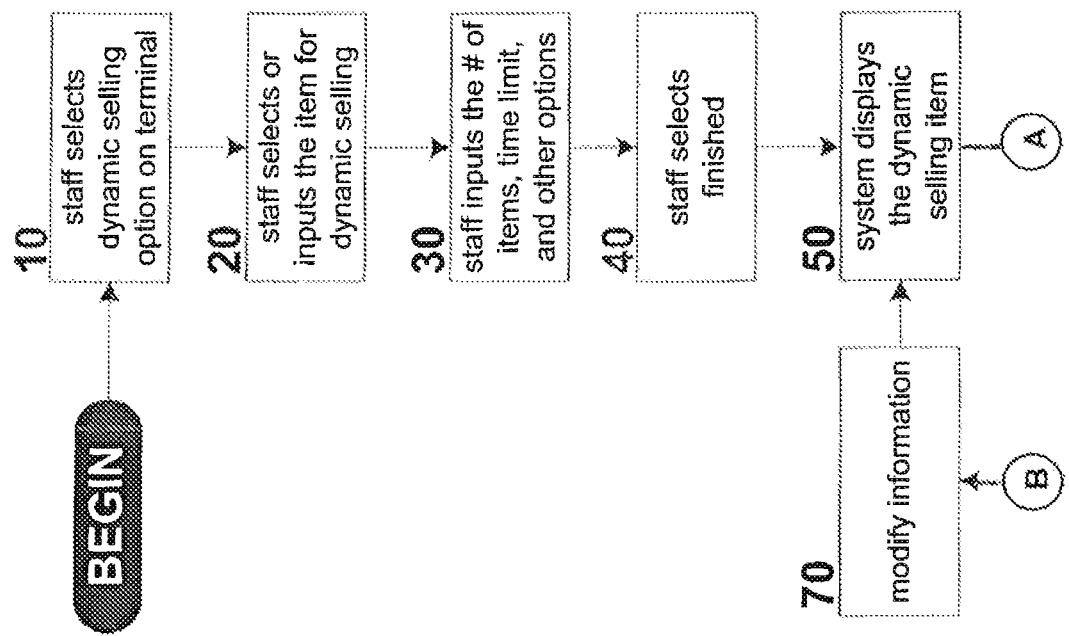
FIG. 8.3.5 a

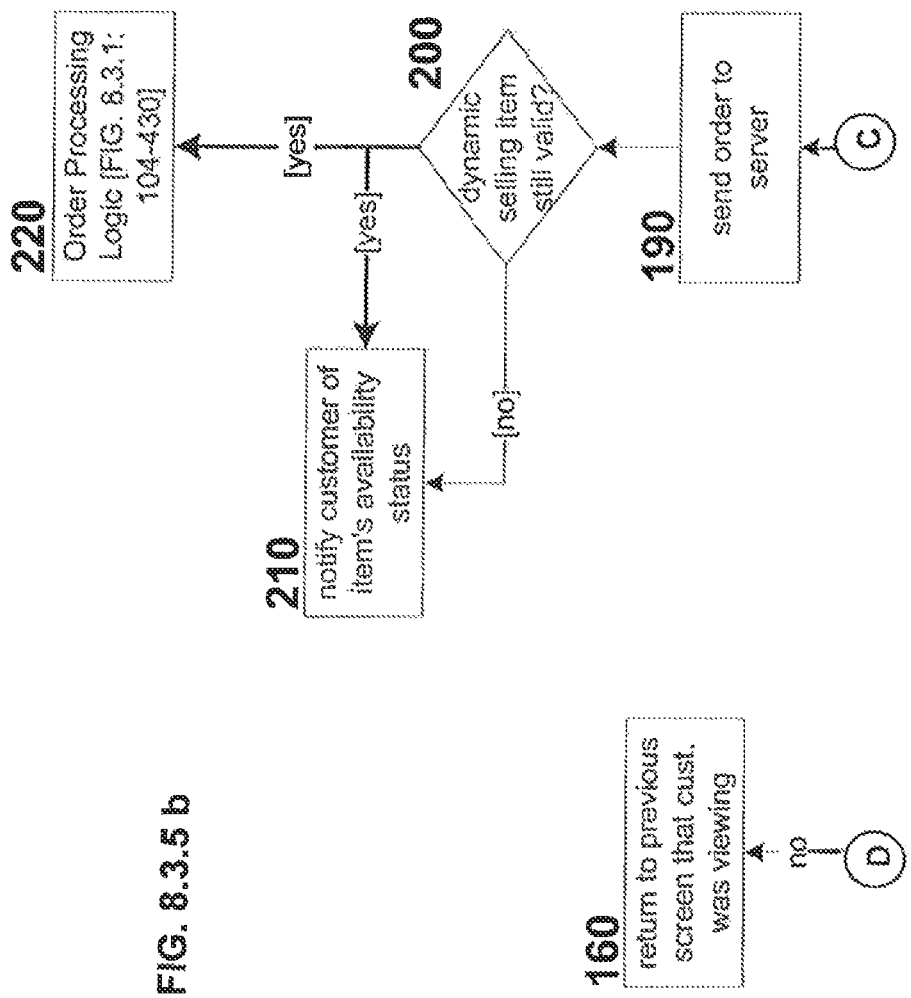
FIG. 8.3.5 b

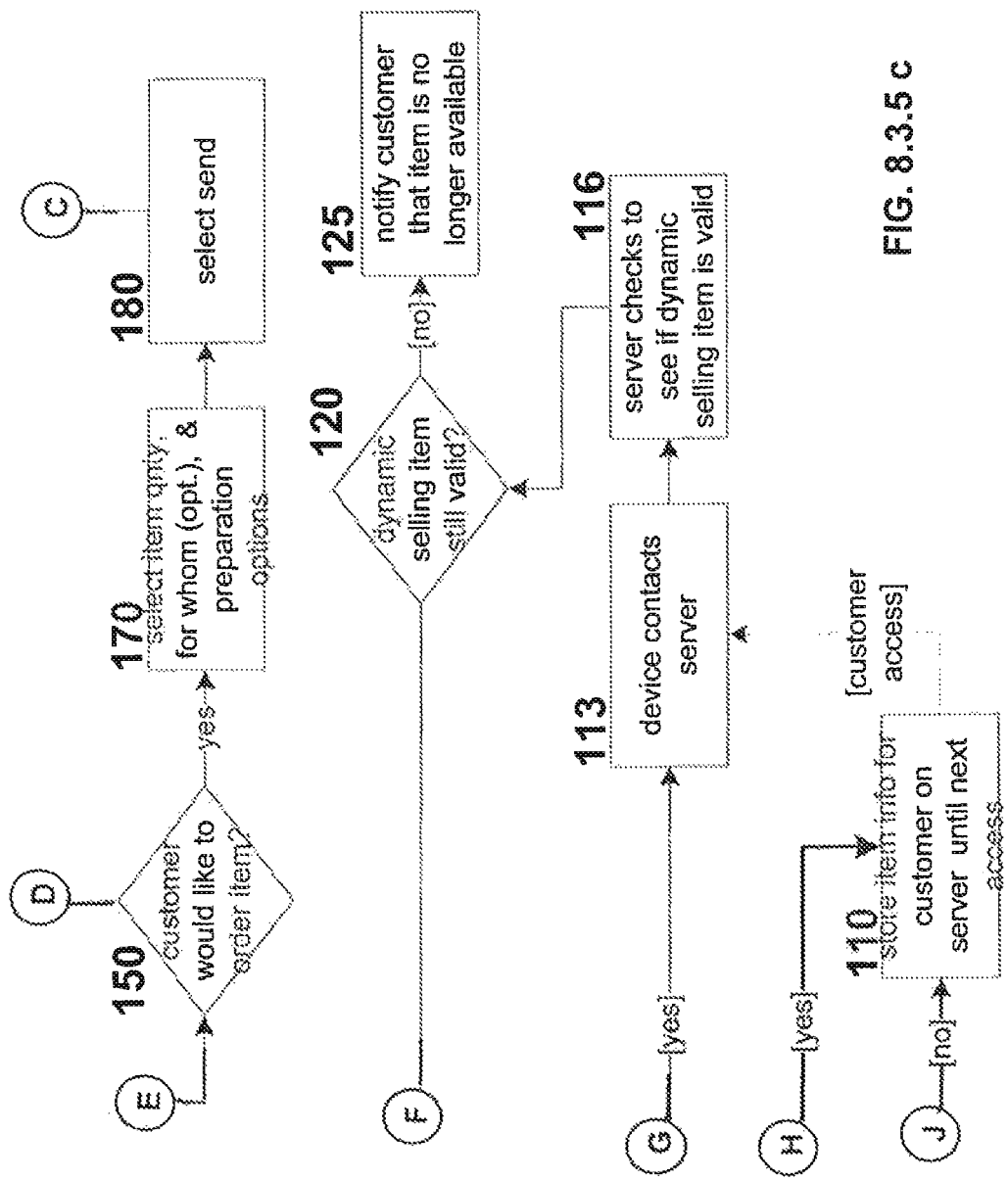
FIG. 8.3.5 c

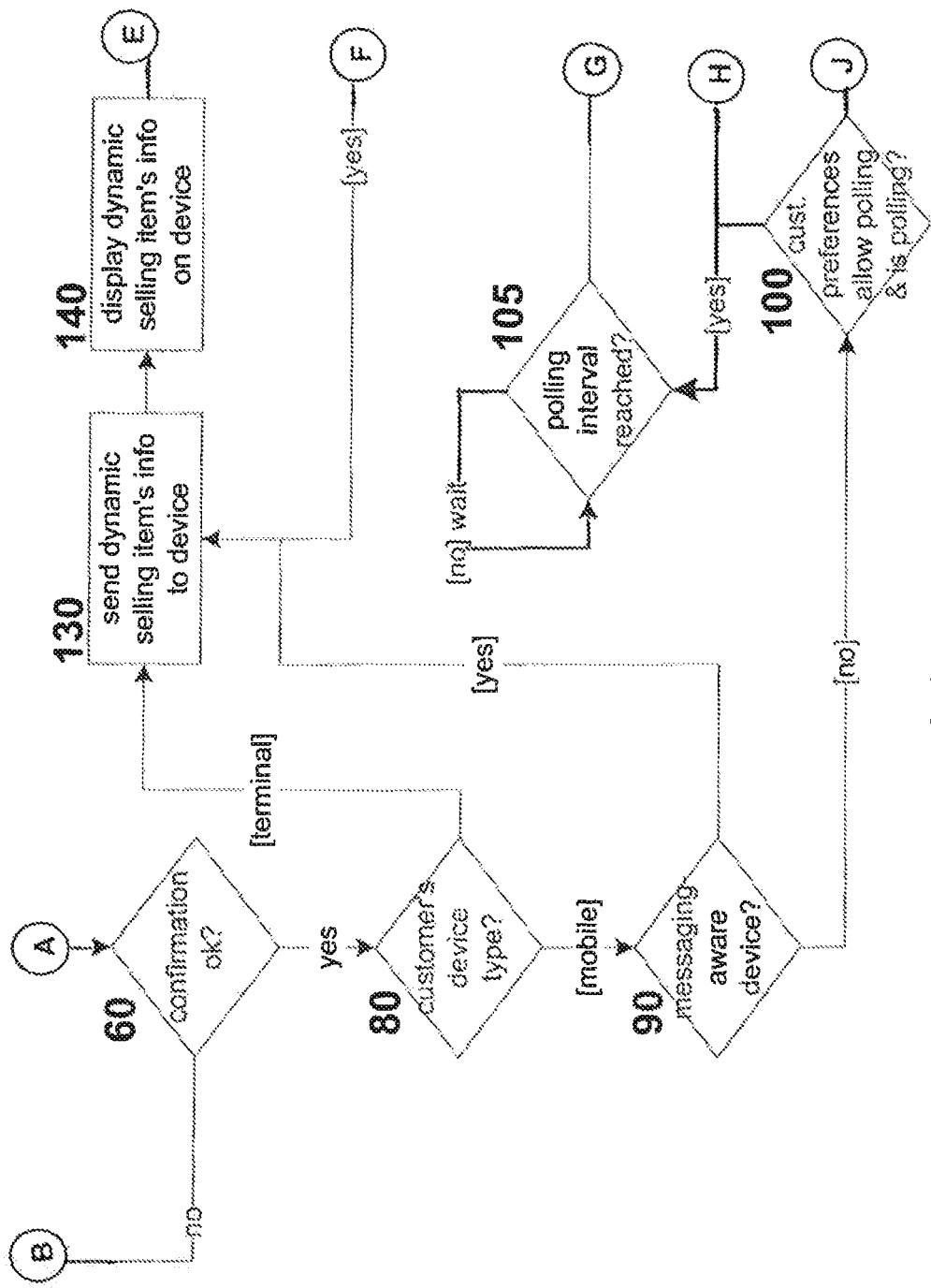
FIG. 8.3.5 d

CUSTOMER-BASED WIRELESS FOOD ORDERING AND PAYMENT SYSTEM AND METHOD

CROSS-REFERENCE TO RELATED APPLICATION

This continuation in part application claims priority to the pending U.S. non-provisional application Ser. No. 14/201,614 filed on Mar. 7, 2014, which claims priority to the abandoned U.S. non-provisional application Ser. No. 10/244,092 filed on Sep. 13, 2002, which claims priority to the expired U.S. provisional patent application having Ser. No. 60/354,884, which was filed on Feb. 6, 2002, and claims priority to the expired PCT international patent application having Serial No. PCT/US03/02064, which was filed on Jan. 23, 2003, and these applications are all owned by the same inventor.

FIELD OF THE INVENTION

This present invention relates to the field of enhancing food order placement, processing, and payment, and improving the overall customer experience at restaurants and other food service establishments. In particular, this invention relates to a system including thin, touch-screen terminals and mobile devices that connect wirelessly to one or more computer servers, and allow customers to independently place and pay for food-related orders quickly and efficiently, without wait-staff intervention.

BACKGROUND OF THE INVENTION

Among the objectives of the present invention are to implement or make use of hardware devices that are optimized for food service establishments and that customers can use to place orders wirelessly without staff intervention.

It is a further object of the present invention to provide a complete order processing solution, which addresses order placement, fulfillment, and payment settlement.

It is yet a further object of the present invention to provide a cost effective, reliable, and secure system which will make an establishment's operations more efficient.

It is still a further object of the present invention to provide a system which significantly reduces customer wait times and which improves customer service and the customer's overall experience at the food service establishments.

It is still a further object of the present invention to provide a system which alleviates labor shortage and increased labor costs.

It is an additional object of the present invention to provide a system which allows orders to be placed and paid for using either a fixed terminal or mobile device and in which the mobile devices can include, but are not limited to, mobile telephones, PDA's or any other wireless device.

It is a further object of the present invention in a restaurant or similar setting to provide a system which identifies a particular person to be designated as an order or party leader which provides said person with control and authorization over the party and the use of the system.

It is an additional object of the present invention to provide a system which provides tracking and security purposes for restaurants and the like.

It is still a further object of the present invention to provide the ability to handle both cash and cashless payment.

It is still a further object of the present invention to provide a system which facilitates the handling of discounts, coupons and promotions.

It is still a further object of the present invention to provide for the payment of food and drink orders via cashless payment medium (at a table) using a terminal or mobile device.

It is still a further object of the present invention in a restaurant or similar setting to provide for pre-ordering of food and browsing of menus for using a guest terminal or mobile device.

It is still a further object of the present invention in a restaurant or similar setting to facilitate automated seating including for optional seating at adjacent tables.

It is yet a further object of the present invention to provide a system that facilitates the order processing of food by splitting orders apart and redirecting items within each order to the appropriate staff, and by grouping together similar items which are waiting to be processed.

It is still a further object of the present invention to provide a system that facilitates receipt processing via paper, email, or both.

It is still a further object of the present invention to provide the use of so-called e-tickets from mobile devices to maintain order information and payment status.

It is still a further object of the present invention to provide a version of the system that encompasses thin, touch-screen, wireless terminals, which can accept cashless payment mediums and operate on batteries alone, and an alternative version of the system that encompasses internet-capable mobile devices.

It is still a further object of the present invention to provide a thin, wireless terminal that allows customers to browse the Internet and to obtain other information while they are dining or waiting for their orders.

It is still a further object of the present invention to facilitate dynamic selling whereby promotions and discounts on certain food items can be presented in real-time to customers.

It is still a further object of the present invention to provide a multi-lingual ordering interface in order to accommodate a more global customer base and to facilitate the ordering process when customers visit other countries.

These and other objects of the present invention will become apparent from the following summary and detailed description.

SUMMARY OF THE INVENTION

The present invention is directed to improve customer-based food ordering systems at food service establishments. The present invention makes use of specially designed terminals and existing, Internet-capable, handheld mobile devices that allow customers to wirelessly place and pay for food/drink orders at food service establishments without requiring the intervention of a staff person. The present invention therefore not only handles order placement and payment settlement, but also order fulfillment, and includes additional features, such as a multi-lingual interface, automated seating, pre-ordering, customer reward points, and dynamic selling or promotion of unwanted inventory.

In addition to being a cost-effective, reliable, secure system, it greatly speeds up the entire ordering process, reduces customer wait times, increases the efficiency of establishments' operations, and improves customer service and the overall customer experience at food service establishments. Furthermore, the adoption of this technology will alleviate establishment owners' concerns over labor shortage and cost.

Customers will use either a terminal (described below) especially designed for use with the system, or their own Internet-capable, mobile device (e.g. a mobile phone or Personal Digital Assistant [PDA]). The customers' orders will be sent to the food service establishment's order-processing server directly (via a wireless local area network) or indirectly (through the internet via the mobile device's provider and the central processing center, such as center may also be known as a system support center). The establishment's server is connected to the central processing center by a high-speed connection to an Internet provider, which provides a virtual private network (VPN) between the establishment and the central processing center. The central processing center maintains a secure connection with a payment service provider to handle cashless payment transactions. All wireless transmissions containing sensitive data, such as payment information and special codes, will be encrypted. Furthermore, any sensitive data stored in the database or other storage medium will also be encrypted to ensure optimal security. Depending on the food service establishment type (store or restaurant) and the payment methods it accepts (cash or cashless), payment settlement for the order may take place before or after the order is accepted by the server for processing. After the order is prepared by the appropriate staff person at the establishment, it is presented to the customer who placed the order. This is the basic order processing logic, but as will be described in the section, entitled "Detailed Description of the Preferred Embodiments", the order and steps vary depending on the implementation. The implementations vary depending on the ordering device (terminal or handheld, mobile device), establishment type (restaurant or store), and the payment mediums accepted (cash-and-cashless or cashless-only).

Terminals

The terminals are designed to be space saving, measuring less than two inches in thickness, and are able to function without the need for an electrical cord by using not one, but two rechargeable batteries. The terminals will provide touch-screen input and also include one or more communication components that will allow them to wirelessly connect via a wireless access point to a central server and other terminals located in the restaurant. A type of card-scanning component will be built into the terminals to allow processing of cashless payment mediums, including (but not limited to) debit cards, credit cards, smart cards, and pre-paid cards. One or more of the built-in communication components will include support for (but not limited to) infrared and Bluetooth technologies to allow the terminals to wirelessly accept payment information from another device (e.g. an electronic wallet or chip built into the customer's mobile device). This type of ultra-thin, dual battery-powered terminals, not present in previous inventions, will take up less (table) space, less of the customer's space, eliminate problems brought about by power cords, and allow customers to pay for their orders using a variety of cashless payment mediums.

As an additional feature (described in more detail below), depending on the system implementation (e.g. restaurant) and preferences of the establishment, customers may be able to access the Internet via the terminal during or after dining. The terminals will operate on (but not limited to) the open-source operating system Linux or its derivatives. This will eliminate the need to pay expensive licensing costs and thus significantly reduce the total cost of ownership of the entire system for establishment owners.

The establishment's server will be composed of two interconnected, ultra-thin computers or an appliance device that provides similar functionality. The reason for two computers (or similar device) is to provide fail-safe, fault tolerant redundancy, such that if one computer fails, the other will take over and ensure the uninterrupted functioning of the system. The computers (one being "primary" and the other one being "secondary") will be connected such that the primary server continuously replicates its data to the secondary server. If the primary server goes down (e.g. because of a disk or power supply failure), the secondary server will take over, resume processing, and become the new primary server. In the interim, the establishment and the central processing center will be immediately notified of the failure, and allow corrective action to be taken. This type of redundancy, lacking in previous inventions, will ensure the smooth and continuous operations of the food service establishment.

Furthermore, because the server will be continuously connected to the central processing center, backups of the food service establishment's server can be made on a daily basis or at any varying time interval. This feature, not present in other types of ordering systems, ensures that the restaurant's critical data is backed up in event of an emergency (e.g. both of the server computers goes down, flood/water damage, earthquake, theft, etc.). Connectivity to the central processing center also allows for remote maintenance and software upgrades for both the server and the terminals. For example, if one of the terminals malfunctions, it is possible for the central processing center to immediately investigate and possibly fix the problem remotely within minutes of the problem occurring. This capability, not present in prior art, is critical for a food service establishment's system to be able to operate smoothly and with minimal downtime, if any at all, and to reassure establishment owners that there is a backup of their data and other critical information in the event of a catastrophe.

The food service establishment may load pictures and video into the system by using a digital camera or video camera. A special program may be used by the system to construct menus by asking the user which pictures/video should be associated with particular menu items. The establishment may also optionally contract the central processing center's services for uploading pictures and video on the establishment's behalf. Once pictures and/or video are loaded into the system, the files, along with any modifications of the menu text or program, which displays information to the customer, may be sent in real-time or at an appropriate time designated by the establishment to terminals needing the updated data. The entire system does not need to be restarted in order for the changes to take effect.

On the customer retention front, the system is capable of maintaining the customers' bonus or "reward points", which many food service establishments use to increase customer retention and to reward loyal, repeat customers with discounts and promotions. The more this system is adopted by a large number of food service establishments, the more customers will enjoy the benefit of having all their reward points consolidated and managed in a single place, and not have to carry a separate point card for each establishment.

Depending on the implementation (e.g. at a restaurant), upon logout, customers will also be given the option to submit their comments about the establishment, the service, and the quality of its menu items, which will provide extremely valuable feedback to the owner of the establishment on how to improve products and services for his/her customers. Also at logout, customers will be able to leave a tip, if the system or establishment has its preferences set to ask the customer if he/she would like to leave a tip. The system can request the percentage or amount of tip to leave, as well as make a recommendation. This is important is because there is often confusion when to leave a tip and if so, how much, especially when traveling to other areas of the world, where tipping may vary. In some cultures, tipping is not necessary, in which case the system's preferences can be set such that a tip will not be asked for. This type of tipping functionality built into the system will certainly relieve any anxieties or confusion over tipping and make it easy for customers to automatically calculate the tip.

As mentioned above, if the terminal solution is being used at a restaurant or other seated establishment, then the customer may be able to access the Internet during or after the meal, depending on controls and options specified by the establishment's owner. For example, during high-traffic or busy times, Internet access time can be limited or restricted. However, in general, during slow times, the Internet access feature will allow friends, who are meeting at the restaurant for a meal or coffee, to enjoy "surfing" the Internet together (e.g. perhaps planning a trip, looking for apartments, movie, etc.). The customer may or may not be charged a slight fee for Internet access, in accordance with controls/options set forth by the restaurant and/or the central processing center. However, it is possible that advertising by companies on the terminal or additional food/drink orders by the customer will negate the need to charge him/her for Internet access. Allowing customers to use the Internet while waiting for their orders to be fulfilled or after the meal while enjoying coffee and dessert will certainly enhance the customer's overall dining experience.

Once a customer places his/her order using the touch-screen terminal or his/her own mobile device and the order is sent to the server, depending on the items in the order and the establishment's system preferences, the server decides which items should be forwarded to the wait staffs' terminal(s) and which items should be forwarded to the chefs' terminal(s). For example, orders for drinks and salads can be forwarded to the wait staff terminals for processing, while only cooking-required orders are forwarded to the chefs' terminals. This introduces greater efficiencies and faster ordering processing by promoting division of labor.

Another process enhancement is to optionally group similar order items, which have yet to be processed, together in a form of batch processing. For example, in a restaurant, if orders for five (5) steaks are placed in the system, by five (5) different people at slightly different times, the system can group these five (5) steak items order together to be processed (cooked) simultaneously. This allows the chef to prepare and cook all of the steaks together, as opposed to a purely sequential order processing system that processes items in the order in which they were received. The advantage of this grouping logic over the sequential approach is that the chef does not have to bring out all of the cooking ingredients, supplies, and equipment to cook one steak, then put all of the ingredients, supplies, and equipment away after finishing, and then have to bring out all of the same items again minutes later for another steak order (given that a different order item, i.e. pasta, was in the order queue between the two steaks).

To further facilitate order processing in establishments in which there are numerous chefs, each having a different specialty, each chef can optionally specify which items he/she can prepare. In that way, when the system receives particular order items, they will be forwarded to the chef who is able to prepare that particular order item. In the case, where the chef may be overburdened with order items, he/she has the option of redirecting or forwarding particular items to other chefs who are available. In addition, in the case where all chefs are capable of preparing the same items, the system can distribute the order items evenly among all the chefs, so that no one chef is overloaded with orders.

Furthermore, the system also makes use of messaging technology, as opposed to only using the traditional "request-reply" technology (most likely used by previous inventions), to send data (e.g. orders and other information) between the terminals (as well as mobile devices, if they are messaging-aware) and the server. The advantages of "messaging" over "request-reply" are numerous, but the most significant are 1) the terminals can send data to the server without having to wait for an immediate reply, which drastically improves the responsiveness of the customer's terminals, and 2) allows the server to send data to the terminals without the data being requested first. The significance of the latter is that message-based systems allow information to be "pushed" to terminals and messaging-aware mobile devices. This opens up a whole new opportunity, not possible before, for food service establishments to dynamically sell and promote items to its customers. For example, a messaging system would allow the establishment to notify all customers in the establishment (via the terminal or mobile device) that for the next ten (10) minutes, all drinks are half price, or the next three customers who order a steak dinner will receive a ten percent (10%) discount off their bill or a free dessert. This type of feature would allow establishments to offer promotions and discounts dynamically as a way to increase sales and reduce unwanted inventory. Also announcements that need to be made to all customers (e.g. last order, store closing in fifteen minutes, etc.) can be made via the messaging system, thus eliminating the need of busy wait-staff to walk around to and notify each customer.

In accordance with the present invention, herein is described an interactive system for controlling food ordering, processing, and payment at a food service establishment comprising: at least one wireless terminal or mobile device comprising data input means and screen for displaying text and/or multimedia files, which are wirelessly accessed from a central server and which correspond to menu items; at least one server for processing order transactions and data received from and sent to terminals or mobile devices; means for wirelessly transmitting order transactions and data between server and terminals or mobile devices; means for tracking order information and payment status; and means for accepting payments for orders.

The interactive system additionally comprises a means for splitting orders apart and forwarding individual items within orders to the most appropriate staff person for handling the particular item; a means for grouping together items that have yet to be processed, allowing for batch preparation.

The interactive system additionally comprises a means for allowing customers to directly pay for orders via terminal or mobile device using cashless payment mediums, such as credit cards, debit cards, prepaid cards, smart cards, and mobile provider payment mechanisms; a means for processing discounts, coupons, and tips; a means for maintaining a customer's reward points; and a means for generating either a paper or electronic receipt that may be emailed to the customer.

The interactive system additionally comprises a means for allowing the menu items, displayed on the terminal or mobile device, to be updated in real-time.

The interactive system additionally comprises a means for adding menu items to an order via a mobile device by entering a code corresponding to a menu item.

The interactive system additionally comprises a means for dynamically selling menu items by which promotions for certain menu items are sent in real-time to the terminal or mobile device.

The interactive system additionally comprises a means for identifying the individual leader of a dining party who will pay for the meal and control ordering.

The interactive system additionally comprises a means by which a customer can peruse or pre-order menu items via a terminal or mobile device.

The interactive system additionally comprises a means for automatically providing seating information to customers via the terminal or a special seating device and allowing customers to seat themselves.

The interactive system additionally comprises a means by which the terminal may further include access to a global computer network (i.e. the Internet) such that the end user can access such items as Internet web pages, news, entertainment, and other information; a means by which the terminal may display information in different languages.

The interactive system additionally comprises a means by which customers may leave feedback for the establishment concerning quality of the menu items, service, etc. In still a further embodiment, the invention is an interactive system for controlling food ordering, processing, and payment at a restaurant or similar food service establishment comprising: at least one terminal (affixed to a table), comprising a data input device including a touch-activated screen, or a mobile device, both capable of displaying text and multimedia data, which is accessible from a central server and which corresponds to menu items; means for wirelessly transmitting a menu order to a central server which forwards items in an order to the terminal of an appropriate staff person of a food service establishment; means for identifying an individual leader of the dining party who is responsible for paying for the meal and controlling the ordering of menu items; means affixed to the terminal for accepting payment wherein said means accommodates credit cards, debit cards or other cashless payment systems; and means by which coupons and premiums can be offered and accepted by the system and tabulated into the final bill.

These significant improvements will introduce greater efficiencies and time saving measures in the ordering process, which will ultimately result in faster service for the customer. In recognizing greater efficiencies, the restaurant may be able to re-assign one wait staff person's responsibility to that of maître d', to walk around the establishment, particularly restaurants and other seated establishments, and check on customers who may have questions, thus further improving customer service.

BRIEF DESCRIPTION OF THE DRAWINGS

FIG. 1.1 is a diagram of a sample restaurant implementation of the system.

FIG. 1.2 is a diagram of a sample store implementation of the system.

FIG. 6.1.1.1 A is the upper left quadrant of a diagram depicting the process logic of the terminal solution for restaurants accepting both cash and cashless payment mediums.

FIG. 6.1.1.1 B is the upper right quadrant of the diagram depicting the process logic of the terminal solution for restaurants accepting both cash and cashless payment mediums.

FIG. 6.1.1.1 C is the lower right quadrant of the diagram depicting the process logic of the terminal solution for restaurants accepting both cash and cashless payment mediums.

FIG. 6.1.1.1 D is the lower left quadrant of the diagram depicting the process logic of the terminal solution for restaurants accepting both cash and cashless payment mediums.

FIG. 6.1.2.1 A is the upper left portion of a diagram depicting the process logic for the terminal solution for restaurants accepting cashless payment mediums only.

FIG. 6.1.2.1 B is the upper right portion of the diagram depicting the process logic for the terminal solution for restaurants accepting cashless payment mediums only.

FIG. 6.1.2.1 C is the lower right portion of the diagram depicting the process logic for the terminal solution for restaurants accepting cashless payment mediums only.

FIG. 6.1.3.1 A is the left portion of a diagram depicting sample screen shots of the terminal solution at a restaurant.

FIG. 6.1.3.1 B is right portion of the diagram depicting sample screen shots of the terminal solution at a restaurant.

FIG. 6.2.1.1 A is the upper left portion of a diagram depicting the process logic of the terminal solution for stores accepting cash and cashless payment mediums.

FIG. 6.2.1.1 B is the upper right portion of the diagram depicting the process logic of the terminal solution for stores accepting cash and cashless payment mediums.

FIG. 6.2.1.1 C is the lower right portion of the diagram depicting the process logic of the terminal solution for stores accepting cash and cashless payment mediums.

FIG. 6.2.2.1 A is the upper left portion of a diagram depicting the process logic of the terminal solution for stores using cashless payment mediums only.

FIG. 6.2.2.1 B is the upper right portion of the diagram depicting the process logic of the terminal solution for stores using cashless payment mediums only.

FIG. 6.2.2.1 C is the lower right left portion of the diagram depicting the process logic of the terminal solution for stores using cashless payment mediums only.

FIG. 6.2.3.1 A is the left portion of a diagram depicting sample screen shots of the terminal solution at a store.

FIG. 6.2.3.1 B is the right portion of the diagram depicting sample screen shots of the terminal solution at a store.

FIG. 7.1.1.1 is a diagram depicting the process logic of the mobile device solution for restaurants accepting both cash and cashless payment mediums.

FIG. 7.1.2.1 is a diagram depicting the process logic of the mobile device solution for restaurants accepting cashless payment mediums only.

FIG. 7.1.3.1 is a diagram depicting sample screen shots of the mobile device solution at a restaurant.

FIG. 7.2.1.1 A is the upper left quadrant of a diagram depicting the process logic of the mobile device solution for stores accepting cash and cashless payment mediums.

FIG. 7.2.1.1 B is the upper right quadrant of the diagram depicting the process logic of the mobile device solution for stores accepting cash and cashless payment mediums.

FIG. 7.2.1.1 C is the lower right quadrant of the diagram depicting the process logic of the mobile device solution for stores accepting cash and cashless payment mediums.

FIG. 7.2.1.1 D is the lower left quadrant of the diagram depicting the process logic of the mobile device solution for stores accepting cash and cashless payment mediums.

FIG. 7.2.2.1 A is the upper left quadrant of a diagram depicting the process logic of the mobile device solution for stores that accept cashless payment mediums only.

FIG. 7.2.2.1 B is the upper right quadrant of the diagram depicting the process logic of the mobile device solution for stores that accept cashless payment mediums only.

FIG. 7.2.2.1 C is the lower right quadrant of the diagram depicting the process logic of the mobile device solution for stores that accept cashless payment mediums only.

FIG. 7.2.2.1 D is the lower left quadrant of the diagram depicting the process logic of the mobile device solution for stores that accept cashless payment mediums only.

FIG. 7.2.3.1 A is the first diagram depicting sample screen shots of the mobile device solution at a store.

FIG. 7.2.3.1 B is the second diagram depicting the sample screen shots of the mobile device solution at a store.

FIG. 7.2.3.1 C is the third diagram depicting the sample screen shots of the mobile device solution at a store.

FIG. 7.2.3.1 D is the fourth diagram depicting the sample screen shots of the mobile device solution at a store.

FIG. 7.2.3.1 E is the fifth diagram depicting the sample screen shots of the mobile device solution at a store.

FIG. 7.3.1 A is the upper left quadrant of a diagram depicting the system login and registration process logic for mobile devices.

FIG. 7.3.1 B is the upper right quadrant of the diagram depicting the system login and registration process logic for mobile devices.

FIG. 7.3.1 C is the lower right quadrant of the diagram depicting the system login and registration process logic for mobile devices.

FIG. 7.3.1 D is the lower left quadrant of the diagram depicting the system login and registration process logic for mobile devices.

FIG. 7.3.2 A is the left portion of a diagram depicting the establishment login process logic for mobile devices.

FIG. 7.3.2 B is the right portion of the diagram depicting the establishment login process logic for mobile devices.

FIG. 8.1.1.1 A is the upper left quadrant of a diagram depicting the payment settlement logic for restaurants accepting cash and cashless payment mediums.

FIG. 8.1.1.1 B is the upper right quadrant of the diagram depicting the payment settlement logic for restaurants accepting cash and cashless payment mediums.

FIG. 8.1.1.1 C is the lower right quadrant of the diagram depicting the payment settlement logic for restaurants accepting cash and cashless payment mediums.

FIG. 8.1.2.1 A is the left portion of a diagram depicting the payment settlement logic for restaurants accepting cashless payment mediums only.

FIG. 8.1.2.1 B is the right portion of a diagram depicting the payment settlement logic for restaurants accepting cashless payment mediums only.

FIG. 8.1.3.1 A is the upper left quadrant of a diagram depicting the automated seating logic for restaurants.

FIG. 8.1.3.1 B is the upper right quadrant of the diagram depicting the automated seating logic for restaurants.

FIG. 8.1.3.1 C is the lower right quadrant of the diagram depicting the automated seating logic for restaurants.

FIG. 8.1.3.1 D is the lower left quadrant of the diagram depicting the automated seating logic for restaurants.

FIG. 8.1.3.2 A is the upper left quadrant of a diagram depicting the customer information input process logic, which is used primarily by FIG. 8.1.3.1 in the automated seating process logic, for restaurants.

FIG. 8.1.3.2 B is the upper right quadrant of the diagram depicting the customer information input process logic, which is used primarily by FIG. 8.1.3.1 in the automated seating process logic, for restaurants.

FIG. 8.1.3.2 C is the lower right quadrant of the diagram depicting the customer information input process logic, which is used primarily by FIG. 8.1.3.1 in the automated seating process logic, for restaurants.

FIG. 8.1.3.2 D is the lower left quadrant of the diagram depicting the customer information input process logic, which is used primarily by FIG. 8.1.3.1 in the automated seating process logic, for restaurants.

FIG. 8.1.3.4 A is the left portion of a diagram depicting the logout logic for restaurants.

FIG. 8.1.3.4 B is the right portion of the diagram depicting the logout logic for restaurants.

FIG. 8.1.3.5 A is the upper left quadrant of a diagram depicting the browsing/pre-ordering process logic for restaurants.

FIG. 8.1.3.5 B is the upper right quadrant of the diagram depicting the browsing/pre-ordering process logic for restaurants.

FIG. 8.1.3.5 C is the lower right quadrant of the diagram depicting the browsing/pre-ordering process logic for restaurants.

FIG. 8.1.3.5 D is the lower left quadrant of the diagram depicting the browsing/pre-ordering process logic for restaurants.

FIG. 8.3.1 A is the upper left quadrant of a diagram depicting the core order processing logic that all implementations share, regardless of establishment (restaurant or store), device type (terminal or mobile device), and payment method (cash-and-cashless or cashless only).

FIG. 8.3.1 B is the upper right quadrant of the diagram depicting the core order processing logic that all implementations share, regardless of establishment (restaurant or store), device type (terminal or mobile device), and payment method (cash-and-cashless or cashless only).

FIG. 8.3.1 C is the lower right quadrant of the diagram depicting the core order processing logic that all implementations share, regardless of establishment (restaurant or store), device type (terminal or mobile device), and payment method (cash-and-cashless or cashless only).

FIG. 8.3.1 D is the lower left quadrant of the diagram depicting the core order processing logic that all implementations share, regardless of establishment (restaurant or store), device type (terminal or mobile device), and payment method (cash-and-cashless or cashless only).

FIG. 8.3.2 is a diagram depicting the receipt specification process logic.

FIG. 8.3.3 A is the upper left portion of a diagram depicting the discount (or promotion) and rewards points process logic.

FIG. 8.3.3 B is the upper right portion of the diagram depicting the discount (or promotion) and rewards points process logic.

FIG. 8.3.3 C is the lower right portion of the diagram depicting the discount (or promotion) and rewards points process logic.

FIG. 8.3.4 is a diagram depicting the process logic for updating a customer's reward points.

FIG. 8.3.5 A is the upper left quadrant of a diagram depicting the process logic of the dynamic selling feature of the system.

FIG. 8.3.5 B is the upper right quadrant of the diagram depicting the process logic of the dynamic selling feature of the system.

FIG. 8.3.5 C is the lower right quadrant of the diagram depicting the process logic of the dynamic selling feature of the system.

FIG. 8.3.5 D is the lower left quadrant of the diagram depicting the process logic of the dynamic selling feature of the system.

DETAILED DESCRIPTION OF THE PREFERRED EMBODIMENT

The present invention is described with reference to the enclosed Figures wherein the same numbers are utilized where applicable.

FIG. 1.1 is a diagram of a sample restaurant implementation of the system using the terminals. As shown, Terminals [100] are located throughout the restaurant, at the entrance, on customers' tables, on the counter in the waitstaff work area, next to the cash register at the checkout counter, and in the kitchen where the chefs prepare the food. The Terminal Battery Recharging Rack [300] is located in the staff work area. The Establishment Server [400] is located in the dining establishment's office area.

Referring to FIG. 1.2, a diagram of a sample store implementation of the system using the terminals is depicted. Customers place their orders using the terminals [100] at the order placement and payment counter [150]. If the customers are paying using a cashless payment medium (e.g. credit card), then they also pay for their order at the terminal and the dispenser [110] prints out a receipt for the customer, and the customer may then wait for his/her number to be called. Otherwise, if the customer is paying in cash, then the dispenser [110] prints out an order slip for the customer. Cash-paying customers proceed to the cash payment and receipt counter [160], where they insert their slip into the slip reader [424] in the Cash Deposit and Receipt Machine (CDRM) [420]. The CDRM display panel [422] shows the customer the amount due and asks him/her to insert the amount, which the customer may input into the CDRM bill deposit slot [426] and/or the CDRM coin deposit slot [428]. The CDRM [420] will then disburse any change in the CDRM change slot [430] and output a receipt from the CDRM receipt disbursement slot [432]. The customers' orders are processed by the establishment's server [400] and forwarded wirelessly to the staff's terminal [100]. The order number of the orders that are ready can optionally be displayed on the order number display panel [190], if the establishment has such a device. The customer may then present his/her receipt, when his/her order is ready, which the staff person will then scan using the bar code scanner [120]. Once the order is verified, the staff will present the customer with his/her order.

Figure 2:
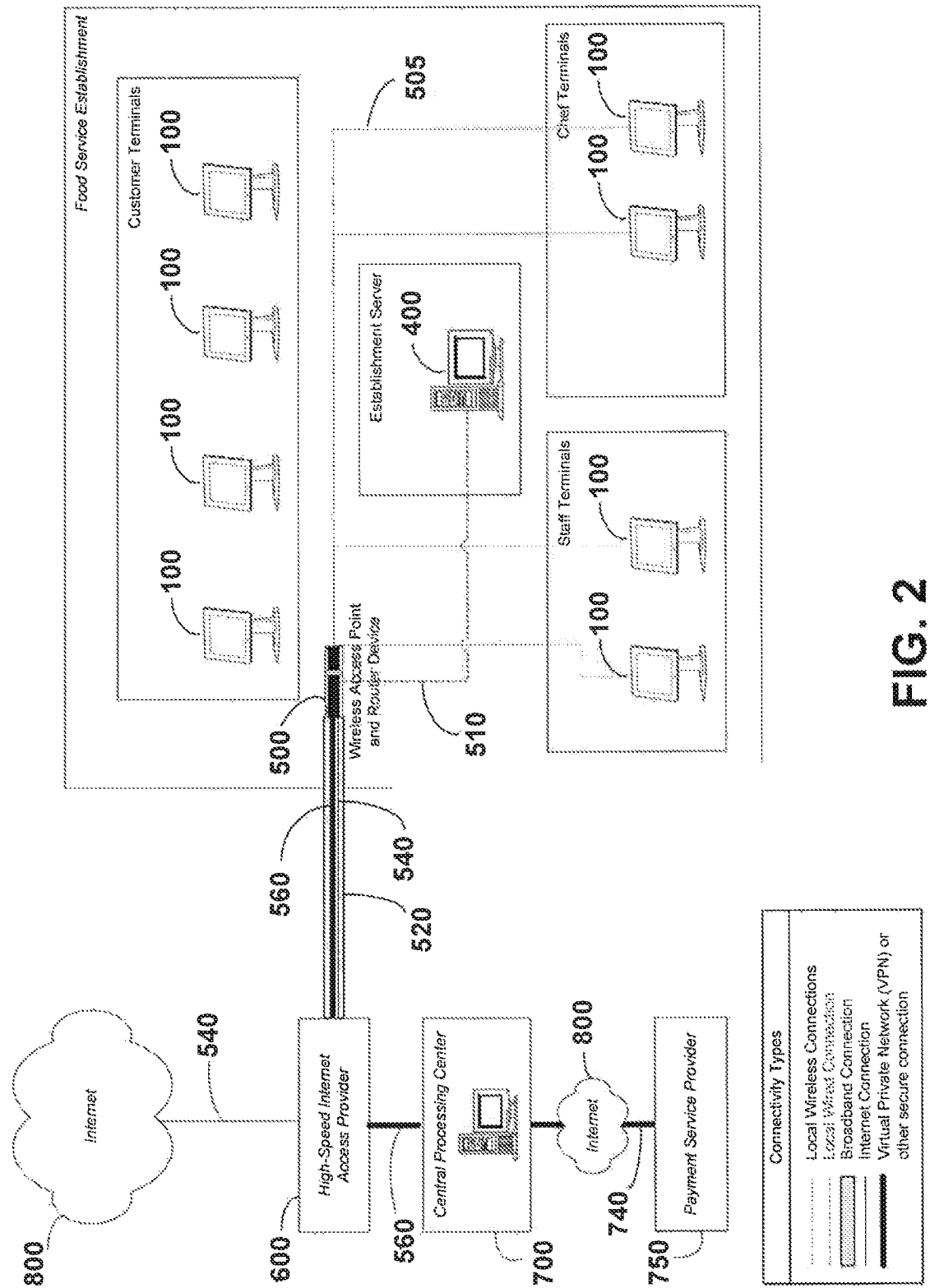
FIG. 2 is a network connectivity overview of the system where customers use terminals to place orders.

FIG. 2 is a network connectivity overview of the system where customers use terminals to place orders. The Terminals [100], the Establishment Server [400], and the Wireless Access Point and Router Device [500] are located within the food service establishment. The Terminals [100] are currently connected to the Wireless Access Point and Router Device [500] by, but not limited to, an 802.11 wireless connection [505]. The Establishment Server [400] is currently connected to the Wireless Access Point and Router Device [500] by, but not limited to, an Ethernet connection [510]. The Wireless Access Point and Router Device [500] is currently connected to a High-Speed Internet Access Provider (ISP) [600] via, but not limited to, a wired, broadband connection [520]. The broadband connection [520] provides both an Internet connection [540] to the Internet [800], and a Virtual Private Network (VPN) connection [560] to the Central Processing Center [700]. Note that the diagram depicts the scenario in which the Establishment Server [400] and the Central Processing Center [700] are connected to the same ISP [600]. However, it is highly possible that the establishment's and the Central Processing Center's ISP will be different. In this case, the Establishment Server [400] and the Central Processing Center [700] can still be connected via a secure VPN connection since the VPN settings are configured in both parties' router. In order to process payment transactions, the Central Processing Center [700] is connected via a VPN or other secure connection [740] to the Payment Service Center [750].

Figure 3:
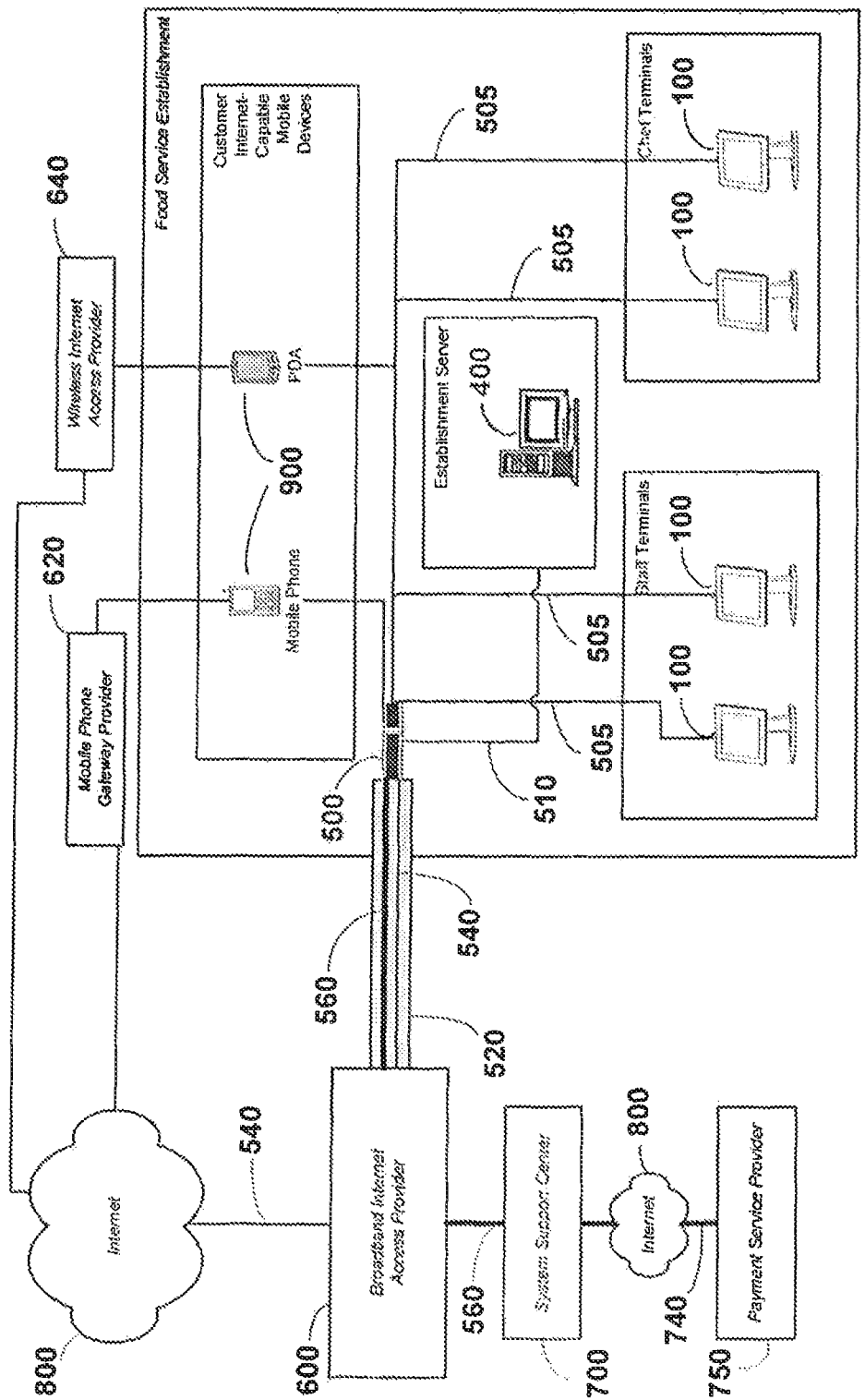
FIG. 3 is a network connectivity overview of the system where customers use mobile devices to place orders.

FIG. 3 is a network connectivity overview of the system where customers use wireless mobile devices to place orders. As shown, the Mobile Devices [900] (e.g. mobile phones and PDA's), the Establishment Server [400], and the Wireless Access Point and Router Device [500] are located within the dining establishment. The Mobile Devices [900] currently interact with the Establishment Server by, but not limited to, either a Mobile Phone Gateway Provider [620] or a Wireless Internet Access Provider [640], which connect via the Internet [800] to the Central Processing Center [700], which, in turn, securely connects to the Establishment Server [400]. For security reasons, this is the preferred method for wireless, Mobile Devices [900] to connect to the Establishment Server [400]. However, it may also be possible for Mobile Devices [900] to directly connect to the Establishment Server [400] over a local wireless connection via the Wireless Access Point and Router Device [500]. The Establishment Server [400] is currently connected to the Wireless Access Point and Router Device [500] by, but not limited to, an Ethernet connection [510]. The Wireless Access Point and Router Device [500] is currently connected to a High-Speed Internet Access Provider [600] via, but not limited to, a wired, broadband connection [520]. The broadband connection [520] provides both an Internet connection [540] to the Internet [800], and a Virtual Private Network (VPN) connection [560] to the Central Processing Center [700]. Note that the diagram depicts the scenario in which the Establishment Server [400] and the Central Processing Center [700] are connected to the same ISP [600]. However, it is highly possible that the establishment's and the Central Processing Center's ISP will be different. In this case, the Establishment Server [400] and the Central Processing Center [700] can still be connected via a secure VPN connection since the VPN settings are configured in both parties' router. In order to process payment transactions, the Central Processing Center [700] is connected via a VPN or other secure connection [740] to the Payment Service Center [750].

Figure 4:
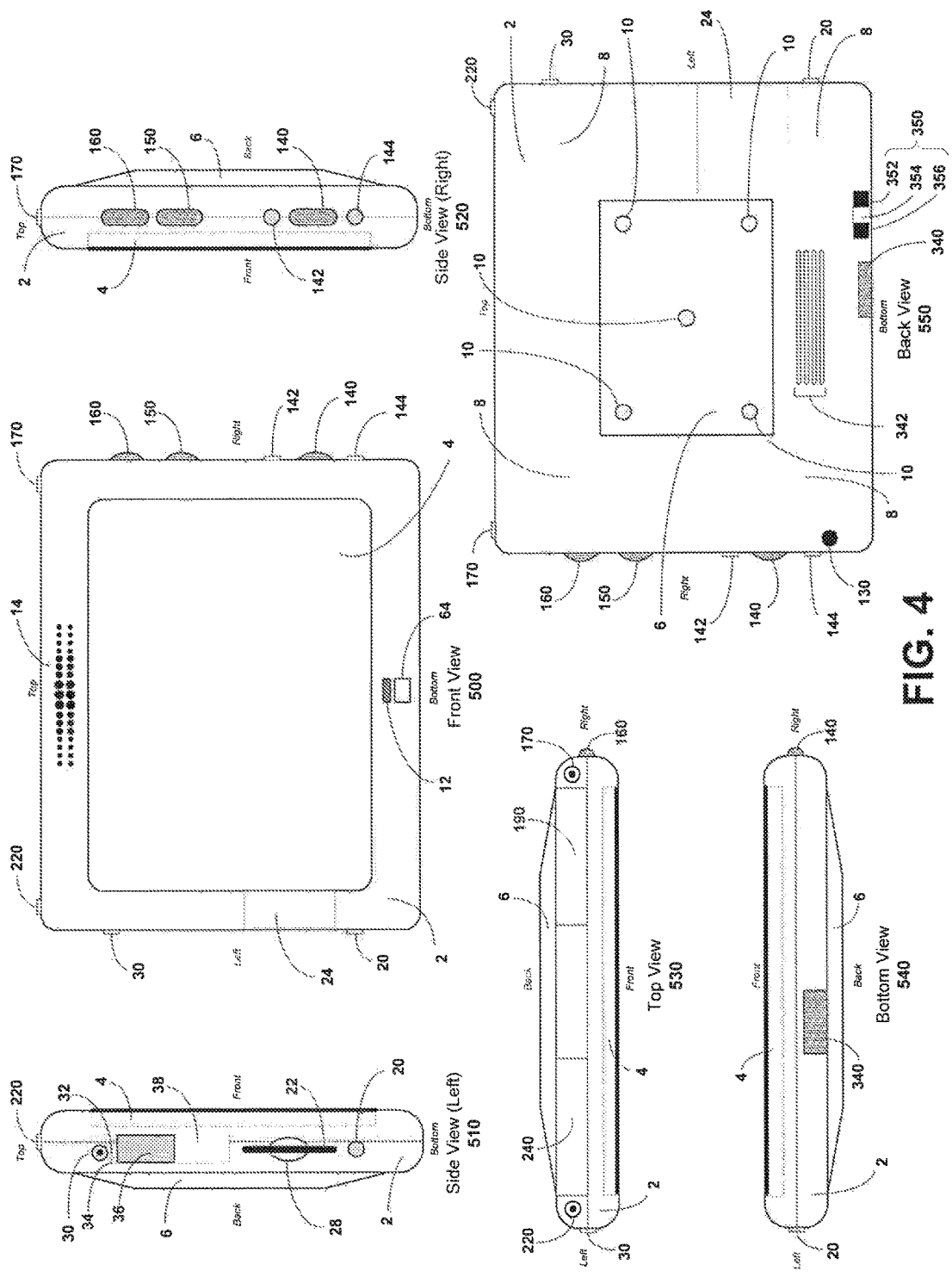
FIG. 4 is a diagram depicting the external views of the terminal.

FIG. 4 illustrates the external views of the terminal. Looking at the front view [500] of the terminal [2], there is an ultra-thin, touch-screen display panel [4]; speakers [14] for audio output; a miniature microphone [12] for audio input; and an IrDA [64] or similar technology for short-range wireless infrared communications with other devices that support IrDA or similar technology. There are several user controls on the right side of the panel, such as a knob for controlling the screen's brightness [160], a knob for adjusting the volume [150], a knob for scrolling (i.e. for web pages) [140], a button for returning to the previously viewed screen/web page [142], and a button for jumping ahead to a screen or web page that is next to be viewed in the sequence [144]. At the top of the terminal is battery 1's un/locking mechanism [170] and battery 2's un/locking mechanism [220], which allow the device to be used securely without concern for a customer removing one or both of the batteries powering the terminal. On the left side, although not actually visible from the front view, the approximate location of the payment card bay [24], where the customer's payment card will be placed, is faintly displayed.

The left side view [510] of the terminal [2] shows part of the ultra-thin, touch-screen display panel (since it is really embedded inside of the terminal, as depicted by the perforated lines) [4] and battery 2's un/locking mechanism [220], in addition to the terminal's back mounting plate [6]. The mounting plate [6] allows the terminal to be affixed to almost any type of apparatus for securely holding the terminal. In addition, the payment card slot [22], where the customer inserts his/her payment card, and a payment card slot finger groove [28], which aids the customer in retrieving his/her card from the slot is displayed. There is also a control panel cover [36], which securely hides the buttons for performing certain functions with the terminal. The control panel un/locking mechanism [30], when unlocked, the control panel cover un/locking mechanism blocking piece [32] is moved to the right such that it no longer interlocks with the control panel cover block piece [34]. The control panel cover [36] is then capable of being slid down into the control panel sliding area [38], thus revealing the control panel. This type of security mechanism is necessary in a food service establishment environment, so that the terminals controls and settings are not capable of being accessed nor changed.

The right side view [520] of the terminal [2] displays part of the ultra-thin, touch-screen display panel [4], battery 1's un/locking mechanism [170], and the terminal's back mounting plate [6]. In addition, the screen brightness control [160], the volume control [150], the screen scrolling control [140], the screen back navigation control [142], and the screen forward navigation control [144] are also visible.

From the top view [530], battery 1's un/locking mechanism [170], battery 2's un/locking mechanism [220], battery 1's sliding cover [190] and battery 2's sliding cover [240] are clearly visible. As before, part of the ultra-thin, touch-screen [4], the control panel un/locking mechanism [30], the screen brightness control [160], and the terminal's back mounting plate [6] can be seen.

From the bottom view [540], as before, part of the ultra-thin, touch-screen [4], the payment card eject button [20], the screen scrolling control [140], and the terminal's back mounting plate [6] are shown. This time, the fan vent [340], which is provided to allow hot air to be blown out of the terminal by its internal fan, is also visible.

Many components described above can again be seen in the back view [500], but they have been omitted here for brevity. The power cord socket [130], which allows the terminal to be connected to a traditional power outlet, is shown. Note that this will most likely not be used in the customer setting, as the cord can be easily removed. As such, the power cord socket will most likely be used for the terminals belonging to the establishment's staff. There are also heating vents [342], which allow another route for heat, generated inside of the terminal, to escape. The terminal's back mounting plate [6], which is supported by back mounting plate support pieces [8], have fastening holes [10], in which screws or other similar objects can be inserted, to securely mount the terminal to an apparatus for holding the terminal. As an added security measure, a security lock [350] is also built into the terminal, to securely connect the terminal to an object in the establishment that is static and not (easily capable of being) moved (i.e. a table). The security lock works very similar to those made available on many of today's computing devices. The security cable goes into the security lock opening 1 [352], goes underneath the security lock metal holding piece [354], and comes out of the security lock opening 2 [356]. Then a standard lock can be placed on the end of the security cable (not displayed) to prevent the cable from being removed from the terminal's security lock [350].

As can be interpreted from the explanations of the various external views of the terminal, it is securely designed to be used in a food service establishment environment without concern for theft or changing certain terminal settings.

Figure 5:
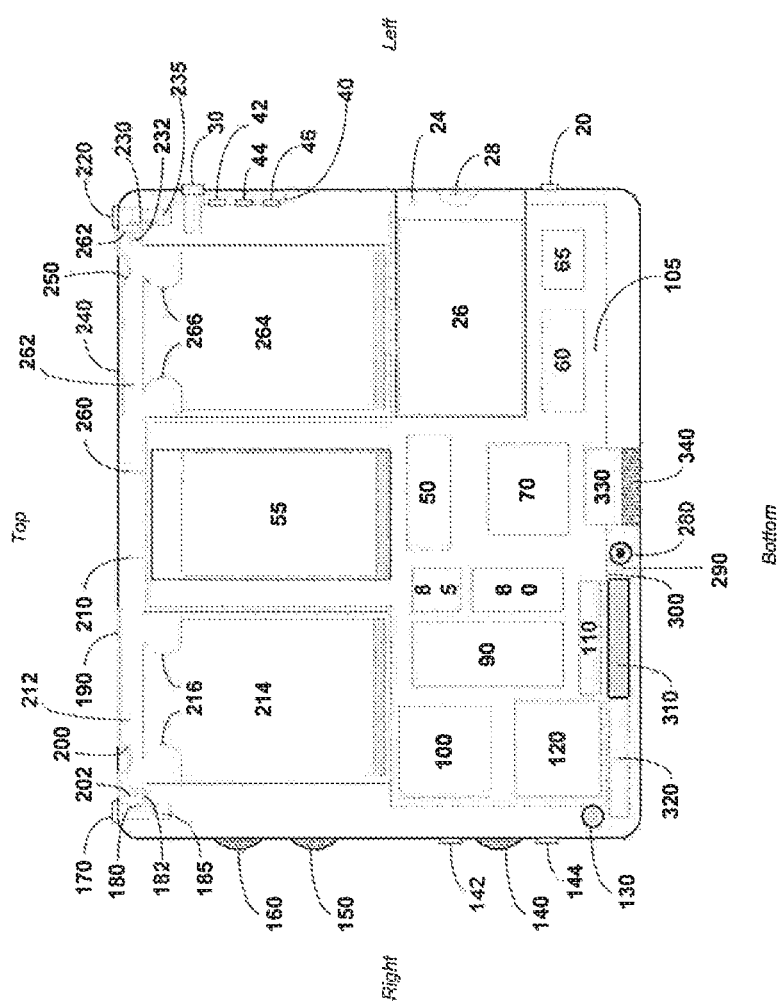
FIG. 5 is a diagram depicting the internal (components) view of the terminal.

FIG. 5 is a diagram depicting the internal view of the terminal. A motherboard [105], which maintains connections to all its complimenting components, is contained in the terminal. Attached to the motherboard, is a central processing unit (CPU) [100], a small power supply [120], memory slot(s) [90], Universal Serial Bus (USB) slot(s) [110], a graphics chip [80], an audio chip [85], a micro hard drive or similar storage medium (for storing data) [70], a fan (for removing heat from the terminal) [330], a wireless communications chip (most likely, but not limited to, Bluetooth) [60], and an IrDA (Infrared) or comparable chip [65].

Unique to the terminal of the present invention is a payment card reader [26], which is capable of reading both magnetic stripe cards and smart cards with an embedded microchip. As a result, the terminal is capable of reading payment cards that are in heavy use today, such as debit, credit, and pre-paid cards, but also payment cards, namely smart cards, which are anticipated to be in wide use in the future. Information is read from the payment cards with the assistance of a payment card processing chip [50]. Once a customer inserts his/her card into the payment card slot (FIG. 4: Side View [510]: Part 22) and into the payment card loading bay [24], the payment card will automatically be loaded into the payment card reader [26]. The customer may eject his/her card by pressing the payment card eject button [20]. Also, the terminal may automatically eject the customer's card based on certain conditions (i.e. logging out).

The terminal also contains an optional PCMCIA card slot [55], which may be replaced by a simple 802.11 wireless communications chip or similar, if it is determined that the PCMCIA card slot weighs too much, is costly, etc. However, the preferred embodiment is to have a PCMCIA card slot, which will allow future expandability when PCMCIA cards are released for wireless technologies not yet known.

The other feature unique to this terminal is that, in its preferred embodiment, it supports not one (1), but two (2), rechargeable batteries. The reason for this is that in a food service establishment setting, it is not feasible to use power cords connected to an electrical socket. Power cords are intrusive to the customer and have a high probably of being accidentally dislodged or even stolen. Also, most food service establishments, especially restaurants, do not have many electrical sockets where the customers are sitting. Given this, power cords are not a viable deployment option. And although the life of rechargeable batteries is increasing, they still do not last very long when the wireless communications feature/component is used frequently. In addition, viewing images and video, listening to audio, looking at menu items, and "surfing" the Internet, will all drastically wear away battery life. As such, to enable continuous operation of the terminal, without having to shut down the terminal while the customer is using it, the terminal employs a dual-battery approach. With this feature, it is possible for the establishment's staff to change one battery while the other one powers the terminal. In this way, the customer is not inconvenience and may continue using the terminal uninterrupted.

A typical computing device does not offer security for the rechargeable battery because the device is usually only handled by its owner. However, in a public setting, it is critical to implement a locking mechanism so that the battery cannot be stolen nor accidentally removed. As a result, the terminal implements a security feature that only allows the establishment's staff access to the batteries. In the diagram, the security mechanism for the battery functions exactly the same for battery 1 [214] and battery 2 [264]. Although unique identification numbers have been provided for the same parts on both batteries, for brevity purposes, only the security mechanism for battery 1 will be described. For reference purposes though, a table has been provided below to indicate which identification numbers of battery 1's components correspond to those on battery 2.

TABLE 1

| Battery 1 | Battery 2 | Component |
|---|---|---|
| 170 | 220 | Battery Un/Locking Mechanism |
| 180 | 230 | Battery Un/Locking Mechanism Hook |
| 182 | 232 | Battery Un/Locking Mechanism Hook Blocking Piece |
| 185 | 235 | Battery Un/Locking Mechanism Cavity |
| 190 | 240 | Battery Sliding Cover |
| 200 | 250 | Battery Sliding Cover Finger Groove |
| 202 | 262 | Battery Sliding Cover Blocking Piece |
| 210 | 260 | Battery Sliding Cover Stopper |
| 212 | 262 | Battery Cavity |
| 214 | 264 | Battery |
| 216 | 266 | Battery Handle Grooves |

When a wait staff member inserts his/her key into the battery un/locking mechanism [170] and turns, it forces the battery un/locking mechanism hook [180] downward into the battery un/locking mechanism cavity [185]. The persons on a wait staff generally include waiters, waitresses, maître d, clerks and the like, and server in this description generally refers to a piece of computer equipment. As this occurs, the battery un/locking mechanism hook blocking piece [182] also moves down and no longer is meshed with the battery sliding cover blocking piece [202]. Since this later component is free to move, the staff person may open the battery cavity [212] by placing his/her finger into the battery sliding cover finger groove [200] and sliding the battery sliding cover [190] until it reaches the battery sliding cover stopper [210]. The staff person may then lift the battery [214] by its battery handle grooves [216] out of the battery cavity [212]. As mentioned earlier, the terminal will continue to function without interruption so long as the other battery, which is still plugged into the terminal, has power. The staff person may then recharge the removed, power-depleted battery in its battery recharging rack [FIG. 1.1:300] and return it to the terminal after the battery has been recharged. In order to close the battery cavity [212], the staff person simply needs to return the battery sliding cover [190] to its original position and turn the special key, still inserted into the battery un/locking mechanism [170], the opposite way. This will return the battery un/locking mechanism hook [180] and the battery un/locking mechanism hook blocking piece [182] to its original position, meshing with the battery sliding cover blocking piece [202] and preventing the battery sliding cover [190] from moving.

Another security feature is the USB slot(s) un/locking mechanism [280] for protecting the USB ports from unauthorized use. In order to gain access to the USB slot(s), the staff person uses the same key and inserts it into the USB slot(s) un/locking mechanism [280]. Upon turning the key in a counter-clockwise direction, the USB slot(s) un/locking mechanism blocking piece [290] rotates downward and no longer keeps the USB slot(s) blocking piece [300] in place. As such, the staff person may then slide the USB slot(s) cover [310] to the left into the USB slot(s) cover sliding area [320] and gain access to the USB slot(s).

There is also a control panel un/locking mechanism [30], which functions identical to the USB slot(s) un/locking mechanism [280]. Inserting the same key use previously, the staff person is able to open the control panel cover [FIG. 4: Side View 510: Part 36]. The control panel [40] inside has 3 buttons. One is the on/off button [42] for the terminal; the second is the terminal display settings button [44], and the third is a generic button [46] for future-use.

As can be interpreted from the preceding description, the terminal has been designed with unique security and dual-battery features that make it optimal for use in a food service establishment setting.

FIG. 6.1.1.1 depicts the process logic of the terminal solution for restaurants accepting both cash and cashless payment mediums. As shown, the process begins by the party entering the establishment [10]. The term "party" is used for consistency purposes, whether there are several customers in the party or only one. Depending on the preferences of the owners of the establishment, they may choose to use or not use the automated seating system [15], which would allow customers to seat themselves, expedite the entire ordering process, and save on labor costs for the establishment. If the establishment is using the automated seating system [15:yes], then the logic would proceed as described in FIG. 8.1.3.1 [25] and later resume with the party proceeding to their table(s) [220]. However, if the establishment is not using the automated seating system [15:no], then a staff person would need to ask the party leader for his/her name, the number of people in his/her party, and the party's smoking preference [30].

The party leader's name and the visit code (described below) are used together as a secure way of logging into the ordering system. In addition, the party leader's name serves as a type of "party/group name", to tie members of the same party together, particularly when the party is spread across different tables or using different terminals to order. It is to be noted that the party leader may also present his/her name to the staff person by using his/her cashless payment medium that contains a readable name, or by using a card which is especially designed for use with this system (if such a card becomes available).

The staff person then inputs the customer's name, party count, and smoking preference into the system [40]. Upon entering the information, the system will then generate a "visit code" for the party [50]. A "visit code" is a randomly generated code, composed of numbers and letters, and is used to uniquely identify the customer's party during their visit to the establishment. The visit code is valid from the time it is generated until the customer's party has logged out and their bill has been paid. As such, the visit code also serves in part as a security mechanism to ensure that the customer is physically in the establishment before placing orders. This is especially important in establishments that accept cash payment from customers at the end of the meal and that allow orders to be placed via a mobile device. The reason being that without some type of randomly generated code, which is only valid while the party are ordering at the restaurant, it would be possible for an individual outside the restaurant to place "prank" orders via his/her mobile device. Furthermore, the visit code is only activated once a table is available for the customer.

The staff person then prints out a slip containing the visit code and a bar code, and gives it to the party leader [60]. The slip can also be automatically printed out and dispensed by the system after the visit code has been generated in step 50. The staff person will then check to see if a table is available [70]. If a table is available [70:yes], then the staff person will activate the party's visit code for a particular table (or tables) [210] and then tell the party their table number or show the party to their table [215]. The party then proceeds to their table [220]. If a table is not available [70:no], then the party can see if a "guest terminal" is available in the waiting area [80]. A "guest terminal" is the same type of ordering terminal that is available at a customer's table. However, it is used primarily for browsing and pre-ordering available menu items. Since the customer and his/her party has not been seated yet, nor their visit code activated, pre-ordered items will not be sent to the kitchen for processing, but rather stored temporarily and allowed to be retrieved later upon being seated.

If the establishment provides a guest terminal in the waiting area [80:yes], then whether the party will be able to use it depends on whether there are other customers in the waiting area using the terminal [90]. When there are no other customers using the terminal in the waiting area [90:no], then the party may proceed to use the terminal to browse or pre-order items [180], as described in FIG. 8.1.3.5. When a table becomes available, the staff person retrieves the party's information from the system [200]. It is possible for the establishment to specify that the system automatically display, on the staffs' terminal, the information of the party for whom a table has become available.

If the party is still present (e.g. has not left the establishment), then the staff person will activate the party's visit code for the particular table(s) [210], which have been assigned to the party. The staff person then directs the party their table [215], and the party proceeds to their table [220].

In the case that there is no guest terminal in the waiting area [80:no] or there is a guest terminal, but it is in use by a different customer [90:yes], then it may be possible for the members of the waiting party to browse or pre-order depending on whether a member has a mobile device (e.g. mobile phone, PDA, etc.) [150].

If none of the party members have a mobile device [150:no], then the party must simply wait [160] until notified by a staff person that a table is available. However, in the event that a party member does have a mobile device [150:yes], then he/she may browse or pre-order [180], in accordance with the logic described in FIG. 8.1.3.5. When a table becomes available for the party, the staff person then retrieves the party's information from the system [200]. As previously mentioned, the system may also automatically display the information of the party for whom a table is available. Then the staff person will activate the party's visit code for the available table(s) [210], and tell/show the party their table(s) [215]. The party then proceeds to the table [220].

Once the party has been seated at the table, the party leader selects his/her language preference [225], if the system and establishment are configured to display the terminal's screens in languages other than the primary language of the country where the establishment is located. The party leader then inputs his/her name and visit code into the terminal to login [230]. Since it is possible for one party to use several terminals, in the situation where the party uses two or more tables, the system needs to check whether or not the person logging in is the party leader or not [240]. In the event a party uses two or more tables and thus terminals (assuming there is one terminal per table), other members of the party can log into a terminal using the party's visit code, but must specify the party leader's name in addition to their own unique name. It is important to note that once the party leader has logged in, it is not possible for anyone else to log in with the same name and visit code. Non-party leader members will be able to add items to the order, as presented in FIG. 8.3.1, but he/she will not be able to place the order. The party leader will need to confirm the member's order [FIG. 8.3.1:104-106], unless the leader specifies that the member is a trusted orderer, in which case the member will also then be able to directly place orders.

If the customer logging in is indeed the party leader [240:yes], then he/she may proceed to select the method of payment for the meal [270]. Otherwise, if the customer logging in is not the party leader, but rather another member of the party [240:no], then the system checks whether or not the establishment allows each customer to pay separately or not [250].

Not all establishments allow customers in a party to pay separately, regardless of whether the payment would be made in cash or by some form of cashless payment medium. This is a heuristic to be decided upon by the establishment. If the establishment does not allow customers of the same party to pay separately [250:no], then the party member logging in does not specify a payment method and continues to complete any other login procedures [320]. On the other hand, if the establishment does allow customers of the same party to pay separately [250:yes], then the party member, as the party leader did above, proceeds to select his/her method of payment [270].

Given that the method of payment is cash [280:cash], then the customer continues to complete the other login procedures [320]. However, if the customer is using a cashless payment medium [280:cashless], then he/she must swipe, input, or transfer his/her cashless payment medium into the terminal [290]. If the establishment is using the specially designed terminal, which includes a slot for swiping or inputting a cashless payment medium, then the customer can simply swipe or input his/her medium (e.g. credit card, debit card, smart card, etc.) into the terminal. Other mediums, such as a type of electronic wallet built into a customer's mobile device (e.g. mobile phone or PDA), can wirelessly transmit the payment information (via the mobile device's preferred transmission method, such as infrared or Bluetooth) to the terminal. However, if a generic terminal is used that does not support the payment mechanism like the specially designed terminal, the customer must type the necessary payment medium information directly into the terminal via the terminal's touch-screen.

It is up to the establishment to ask the customer for the payment information upon login or upon logout (after step 350, which describes the logout logic [FIG. 8.1.3.4]). However, the preferred embodiment is to ask the customer for the method of payment upon login, and encourage or provide incentives to the customer to pay by a cashless payment medium. The cashless payment medium will expedite the entire customer visit by not requiring the establishment to allocate staff time to collecting payment after the meal. Also, collecting the customer's payment information in advance ensures that a customer will not leave the restaurant without paying and that prank orders are not placed. Furthermore, in the not too distant future when the system is only cashless-based, as described in FIG. 6.1.1.2, the customer will be accustomed to entering the payment information in advance.

The system then validates the customer's cashless payment medium to ensure that it is an acceptable payment medium [300]. If the medium is not accepted [310:no], then the customer is prompted to try the medium again or use a different medium, and steps 290-310 are repeated again. Although not explicitly depicted in FIG. 6.1.1.1, it is possible for the customer to opt to pay in cash if their cashless payment medium has not been accepted and they have no other cashless payment medium. If the medium is accepted though [310:yes], then the customer proceeds to complete the other login procedures [320].

Once the customer has completed the other login procedures, he/she enters any discount or promotion code that he/she may have, in addition to seeing if he/she qualifies for loyalty/appreciation rewards [325], as detailed in FIG. 8.3.3. The customer then selects the order menu on the terminal [330], and places orders [340] in accordance with the Order Processing Logic in FIG. 8.3.1. Upon completing all ordering, the customer logs out of the system [350], as described in the Restaurant Logout Logic in FIG. 8.1.3.4. After completing the logout procedures, the party then pays for their bill and/or picks up the receipt at the establishment's checkout counter [360], as explained in the Payment Settlement Logic of FIG. 8.1.1.1. Once the meal has been paid for and the party receives their receipt, if one was specified, the party may then leave the establishment [370].

Referring now to FIG. 6.1.2.1, a diagram depicting the process logic for the terminal solution for restaurants accepting cashless payment mediums only is shown. The process begins by the party entering the establishment [10]. Depending on the preferences of the owners of the establishment, they may choose to use or not use the automated seating system [20], which would allow customers to seat themselves, expedite the entire ordering process, and save on labor costs for the establishment. If the establishment is using the automated seating system [20:yes], then the logic would proceed as described in FIG. 8.1.3.1 [30] and later resume with the party proceeding to the table [230]. However, if the establishment is not using the automated seating system [20:no], then a staff person would need to ask the party for the number of people in the party and their smoking preference [40]. After inputting the party's information into the system [50], one of the party members (henceforth, referred to as "party leader") would then need to select (on the terminal at the entrance of the establishment) the type of cashless payment medium he/she is using (e.g. credit card, debit card, smart card, pre-paid card, electronic wallet, etc.) [58]. Next, the party leader inputs or transfers his/her cashless payment medium information to the terminal [60]. In the event that the party leader is using a pre-paid card or other cashless payment medium for which the name cannot be discerned, the system will prompt the party leader to enter his/her name.

The party leader's cashless payment medium will then be verified [65]. Although not noted in the figure, if the medium is not accepted, the party leader will be prompted to try a different medium. Otherwise, if the cashless payment medium is accepted, the logic continues as listed.

If a table is available [70:yes], then the staff person will activate a particular table or tables (and associated terminals) for use by the party [210], and then tell the party their table number(s) or show the party to their table [220]. The party then proceeds to their table [230]. If a table is not available [70:no], then the party can see if a "guest terminal" is available in the waiting area [80].

If the establishment provides a guest terminal in the waiting area [80:yes], then whether the party will be able to use it depends on whether there are other customers in the waiting area using the terminal [90]. When there are no other customers using the terminal in the waiting area [90:no], then the party may browse/pre-order items [170] in accordance with the logic in FIG. 8.1.3.5. When a table becomes available, the staff person retrieves the party's information from the system [200].

It is possible for the establishment to specify that the system automatically display, on the staffs' terminal, the information of the party for whom a table has become available. If the party is still present (i.e. has not left the establishment), then the staff person will activate a particular table or tables for the party [210]. The staff person directs the party to their table(s) [220], and the party proceeds to the table(s) [230].

In the case that there is no guest terminal in the waiting area [80:no] or there is a guest terminal, but it is in use by other customers [90:yes], then it may be possible for the party to browse or pre-order depending on whether the any party members have a mobile device (e.g. mobile phone, PDA, etc.) [150]. If none of the party members have a mobile device [150:no], then the party must simply wait [160] until notified by a staff person that a table is available. However, in the event one of the party members does have a mobile device [150:yes], then he/she may browse/pre-order [170] as specified in FIG. 8.1.3.5.

When a table (or tables) becomes available for the party, the staff person then retrieves the party's information from the system [200]. As previously mentioned, the system may also automatically display the information of the party for whom a table (or tables) is available. Then the staff person will activate the available table(s) (and associated terminals) for use by the party [210], and tell or show the party their table [220]. The party then proceeds to the table [230].

Once the party has been seated at their table(s), the party leader once again selects on the terminal his/her language preference [235], if the system and establishment are configured to display the terminal's screens in languages other than the primary language of the country where the establishment is located. The party leader also selects the type of cashless payment medium [240] that was specified upon entering the establishment (in Step 58). Next, the party leader inputs/swipes (e.g. card-based medium) or transfers (e.g. electronic-based medium) his/her cashless payment information to the terminal [250]. The party leader must use the same cashless payment medium that was used upon entering the establishment.

Since it is possible for one party to be seated at two or more tables and use several terminals (e.g. one at each table), then the party members at the other tables may log into the system using their own cashless payment medium. However, the party leader will need to approve the other member's login to ensure that the table and terminal are being used by a recognized member of his/her party and not by non-affiliated customers.

Once the party leader has logged into the terminal, then a check must be performed as to whether the establishment allows members within the same party to pay separately [260]. If forbidden [260:no], then the party leader simply continues with the other login procedures [310]. However, if the establishment allows party members to pay separately

[260:yes], then the party leader will be asked if any other members would like to pay separately [270]. If no one else wants to pay separately [270:no], then the party leader continues to complete the other login procedures [310]. But if there are party members who do wish to pay separately [270:yes], each paying member must 1) select the type of the cashless payment medium he/she will use [278] and input/transfer the medium (or its information) in/to the terminal [280]. The member's cashless payment medium must then be validated by the system [290]. If it's not accepted [300:no], then the member will be given the opportunity to cancel (not depicted in figure) or try again by completing steps 278-290 again. If the party member's cashless payment medium is accepted [300:yes], then the terminal will ask if any others wish to pay separately. If yes [270:yes], steps 278-300 will repeat. Otherwise [270:no], the party leader will continue with any other necessary login procedures [310].

Once the party leader has completed the other login procedures, he/she enters any discount or promotion code that he/she may have, in addition to seeing if he/she qualifies for loyalty/appreciation rewards [315], as detailed in FIG. 8.3.3. The customer then selects the order menu on the terminal [320], and places orders [330] in accordance with the Order Processing Logic in FIG. 8.3.1. Upon completing all ordering, the party leader logs out of the system [340], as described in the Restaurant Logout Logic in FIG. 8.1.3.4. After completing the logout procedures, the bill is then charged to the party leader's (and other paying member's) cashless payment medium [350], as detailed in FIG. 8.1.2.1. The party may then leave the establishment [360].

FIG. 6.1.3.1 is a diagram depicting sample screen shots of the terminal solution at a restaurant. The various parts of the screen are not described, as they may change slightly, and as this diagram is provided more to lend visual support to the proceeding process logic diagrams of what the customer most likely will see.

FIG. 6.2.1.1 is a diagram depicting the process logic of the terminal solution for stores accepting cash and cashless payment mediums. The process begins by the customer entering the establishment [10] and proceeding to the terminal to use for ordering [20]. First, the customer selects his/her language preference [22], if the system and establishment are configured to display the terminal's screens in languages other than the primary language of the country where the establishment is located. Next, before ordering, the customer enters any discount or promotion code that he/she may have, in addition to seeing if he/she qualifies for loyalty/appreciation rewards [25], as detailed in FIG. 8.3.3. Then, after the customer has selected all of the items to add to his/her order [30], in accordance with the Order Processing Logic in FIG. 8.3.1:steps 25-100, he/she then selects his/her method of payment [40]. If the customer selects the cashless payment medium [50:cashless], then he/she inputs or transfers his/her cashless payment medium (or its information) into the terminal [60]. The cashless payment medium is then validated and the amount of the customer's order is charged to the medium [70]. If the cashless payment medium has been accepted [80:yes], then the logic proceeds as described in the "Post Payment Logic" section below.

If the customer decides to pay in cash [50:cash], then the system prints out a slip, containing an order number and bar code [100], and logs the customer out of the order placement system [110]. The customer then proceeds to take the slip to the payment counter [120]. If the establishment is using a cash deposit machine [130:yes], then the customer simply scans the bar code on the slip into the machine [140]. The machine will then display the amount due [150]. After the customer insert his/her money into the machine [160], the machine will return the change, if any [170]. The logic then proceeds in accordance with the "Post Payment Logic" below.

In the case where the establishment is not using a cash deposit machine [130:no], then the customer will present his/her order slip to the staff person [180], who then proceeds to scan the slip's bar code into the system [190]. After the customer then pays the amount due [200], the staff person records the customer's payment [210]. The logic then proceeds in accordance with the "Post Payment Logic" below.

Post Payment Logic

The system prints the customer's receipt, which also contains the customer's order number and its associated bar code [220]. Immediately following, the customer is logged out of the order placement system, if not already [250]. At the same time that the customer's reward points information is being updated [253], as explained in FIG. 8.3.4, the customer's order is dispatched and the order begins to be processed by the establishment [260], in accordance with the Order Processing Logic (steps 110-390) in FIG. 8.3.1. While this is occurring, the customer takes his/her receipt [230] and simply waits for his/her order number to be called [240]. Once the order is ready, if the establishment is not using an order number display panel [270:no], then a staff person calls out the customer's order number [290]. However, if the establishment is using an order number display panel [270:yes], then the customer's order number is automatically displayed when his/her order is ready [280]. After either of the two types of notification, the customer may then proceed to the order pickup counter [300]. When the customer presents his/her receipt to a staff person [310], the staff person scans the bar code on the customer's receipt [320]. This step eliminates any confusion as to which order belongs to which customer, as often happens in establishments today when two customers place similar orders at nearly the same time.

Once the staff person has scanned the customer's bar code and confirms the order, the staff person then gives the ordered items to the customer [330]. The customer may then leave the establishment or find open seating [340], if the establishment offers seating.

Referring now to FIG. 6.2.2.1, a diagram depicting the process logic of the terminal solution for stores using cashless payment mediums only is shown. This process begins by the customer entering the establishment [10] and proceeding to the terminal to use for ordering [20]. First, the customer selects his/her language preference [22], if the system and establishment are configured to display the terminal's screens in languages other than the primary language of the country where the establishment is located. Then, the customer enters any discount or promotion code that he/she may have, in addition to seeing if he/she qualifies for loyalty/appreciation rewards [25], as detailed in FIG. 8.3.3. After the customer has selected all of the items to add to his/her order [30] (in accordance with the Order Processing Logic in FIG. 8.3.1:steps 25-100), he/she then selects the type of cashless payment medium that he/she wishes to use [40]. After inputting or transferring his/her cashless payment medium (or its information) to the terminal [50], the system validates and charges the amount due to the cashless payment medium [60].

If the cashless payment medium is not accepted [70:no], then the customer must try a different cashless payment medium and repeat Steps 50-70, or (not depicted) cancel his/her order. In the case where the cashless payment medium has been accepted [70:yes], the system prints the customer's receipt, which also contains the customer's order number and its associated bar code [80]. Immediately following, the customer is logged out of the order placement system [110]. At the same time that the customer's reward points information is being updated [113], as explained in FIG. 8.3.4, the customer's order is dispatched and the order begins to be processed by the establishment [120], in accordance with the Order Processing Logic (steps 110-390) in FIG. 8.3.1. While this is occurring, the customer takes his/her receipt [90] and simply waits for his/her order number to be called [100]. Once the order is ready, if the establishment is not using an order number display panel [130:no], then a staff person calls out the customer's order number [140]. However, if the establishment is using an order number display panel [130:yes], then the customer's order number is automatically displayed when his/her order is ready [150]. After either of the two types of notification, the customer may then proceed to the order pickup counter [160]. When the customer presents his/her receipt to a staff person [170], the staff person scans the bar code on the customer's receipt [180]. Again, this eliminates any confusion as to which order belongs to which customer, as often happens in establishments today when two customers place similar orders at nearly the same time. Once the staff person has scanned the customer's bar code and confirms the order, the staff person then gives the ordered items to the customer [190]. The customer may then leave the establishment or find open seating [200], if the establishment offers seating.

FIG. 6.2.3.1 is a diagram depicting sample screen shots of the terminal solution at a store. The various parts of the screen are not described, as they may change slightly, and as this diagram is provided more to lend visual support to the proceeding process logic diagrams of what the customer most likely will see.

FIG. 7.1.1.1 is a diagram depicting the process logic of the mobile device solution for restaurants accepting both cash and cashless payment mediums. This process begins by the party entering the establishment [10]. Depending on the preferences of the owners of the establishment, they may choose to use or not use the automated seating system [20], which would allow customers to seat themselves, expedite the entire ordering process, and save on labor costs for the establishment. If the establishment is using the automated seating system [20:yes], then the logic would proceed as described in FIG. 8.1.3.1 [30] and later resume with the logic described in the below section, entitled "Customer Proceeds to Table". However, if the establishment is not using the automated seating system [20:no], then a staff person would need to ask the party leader for his/her name, the number of people in his/her party, and the party's smoking preference [40].

The staff person then inputs the party leader's name, the party count, and the party's smoking preference into the system [50]. Upon entering the information, the system will then generate a "visit code" for the customer and his/her party [60]. The staff person then prints out a slip containing the visit code and a bar code, and gives it to the party leader [70]. The slip can also be automatically printed out and dispensed by the system after the visit code has been generated in step 50.

The staff person will then check to see if a table is available [80]. If a table is available [80:yes], then the ensuing logic is described in the below section, entitled "Staff Activates Table(s)".

If a table is not available [80:no], then the party may browse or pre-order items [100], in accordance FIG. 8.1.3.5. This process makes the assumption that the establishment is not using a guest terminal. However, if the establishment has also made a guest terminal available, then the customer is free to use the terminal for browsing/pre-ordering, provided that no other customers are currently using it. When a table becomes available for the party, the staff person then retrieves the party's information from the system [140]. As previously mentioned, the system may also automatically display the information of the party for whom a table (or tables) is available.

Staff Activates Table(s)

The staff person activates the party's visit code for the available table(s) [150], and direct the party their table(s) [160].

Customer Proceeds to Table

The party proceeds to their table(s) [170]. Once the party has been seated at their table(s), if the customer has previously logged into the system [180:yes], then the logic continues in the below section entitled "Table Number Transferred Check". If the customer did not previously log into the system [180:no], then he/she must login [190] in accordance with the Mobile Login-Registration Logic in FIG. 7.3.1. Afterwards, the customer logs into the restaurant's system [200] as detailed in the Establishment Login Logic in FIG. 7.3.2.

Table Number Transferred Check

If the table number has already been transferred to the mobile device [205:yes], then the logic continues in the below section, entitled "Complete Other Login Procedures". One particular case in which this would occur is if the customer uses his/her mobile device in an establishment that employs the automated-seating functionality and the system is able to electronically transfer the customer's table number to his/her mobile device, perhaps via a short-range, electronic communications medium (i.e. infrared or Bluetooth).

On the other hand, if the table number has not already been transferred to the mobile device [205:no], then the customer can select the menu option on his/her mobile device to enter the table number [210]. It is important to note that in the mobile device implementation of this present invention, upon system login, it is not necessary for the customer to select his/her preferred language, as with the terminal implementation. This is because when the customer first registers to use the ordering system for his/her mobile device, he/she will download the appropriate version of the program or access the appropriate web page for his/her preferred language, if it is supported.

Continuing with the diagram logic, the customer proceeds to enter his/her table number [220]. Although the system knows the party's table number(s), it is necessary for the customer to enter his/her table number in the situation where the party may be disbursed across two or more tables. In such a case, if the customer did not enter his/her table number, the staff person would not know which of the two or more tables (assigned to the party) to deliver a particular member's order. Furthermore, the input of the table number by the customer is meant as an additional security check.

Complete Other Login Procedures

After completing the other login procedures [230], the customer inputs any discount or promotion code that he/she may have, in addition to seeing if he/she qualifies for loyalty/appreciation rewards [235], as detailed in FIG. 8.3.3. Next, the customer selects the order menu option on his/her mobile device [240].

In the next step [250], how the customer orders depends on whether the establishment offers a detail menu listing in the system. Some establishments, who offer the ordering system for wireless devices only and who wish to use their traditional printed menu for one reason or another, would most likely not provide detailed item descriptions in the system. In such a situation [250:no] or where the customer does not wish to view/download the entire menu, orders would be placed [270] by simply entering in the item's code from the printed menu, instead of selecting the items from an electronic menu. The Order Processing Logic in FIG. 8.3.1 would be essentially the same, except that in step 30, rather than "selecting an item" from a displayed list, the customer would simply "enter the item's code". This is an optional feature to allow more traditional establishments to take advantage of allowing customers to place orders wirelessly, but still retain the "look and feel" of the menus as an integral part of their establishment's atmosphere. This feature may also be considered an intermediary step as the establishment makes a gradual transition to the electronic menu-only system.

If the establishment offers a detailed menu listing in the system [250:yes], then the customer may place orders the standard way [270]—by selecting the order item from a listing, and not using a code—as depicted in the Order Processing Logic in FIG. 8.3.1. Upon completing all ordering, all the party members log out of the system [280], as described in the Restaurant Logout Logic in FIG. 8.1.3.4. The party then pays for their bill and/or picks up the receipt at the establishment's checkout counter [290], as explained in the Payment Settlement Logic of FIG. 8.1.1.1. Once the meal has been paid for and the party receives their receipt, if one was specified, the party may then leave the establishment [300].

FIG. 7.1.2.1 is a diagram depicting the process logic of the mobile device solution for restaurants accepting cashless payment mediums only. This process begins by the party entering the establishment [10]. Depending on the preferences of the owners of the establishment, they may choose to use or not use the automated seating system [20], which would allow customers to seat themselves, expedite the entire ordering process, and save on labor costs for the establishment. If the establishment is using the automated seating system [20:yes], then the logic would proceed as described in FIG. 8.1.3.1 [30] and later resume with the logic outlined in the below section, entitled "Customer Proceeds to Table".

However, if the establishment is not using the automated seating system [20:no], then a staff person would need to ask the party leader for his/her name, the number of people in his/her party, and the party's smoking preference [40]. The staff person then inputs the party leader's name, the party count, and the party's smoking preference into the system [50]. The staff person will then check to see if a table is available [60]. If a table is available [60:yes], then the ensuing logic is explained in the below section, entitled "Staff Activates Table(s)".

If a table is not available [60:no], then the party may browse or pre-order items [70], in accordance FIG. 8.1.3.5. This process again is based on the assumption that the establishment is not using a guest terminal. However, if the establishment has also made a guest terminal available, then the customer is free to use the terminal for browsing/pre-ordering, provided that no other customers are currently using it. When a table becomes available for the party, the staff person then retrieves the party's information from the system [80]. As previously mentioned, the system may also automatically display the information of the party for whom a table (or tables) is available.

Staff Activates Table(s)

The staff person will activate the party's visit code for a particular table (or tables) [90], and direct the party their table(s) [100].

Customer Proceeds to Table

The party proceeds to their table(s) [110]. Once the party has been seated at their table(s), if the customer has previously logged into the system [120:yes], then the logic continues in the below section entitled "Table Number Transferred Check". If the customer did not previously log into the system [120:no], then he/she must login [130] in accordance with the Mobile Login-Registration Logic in FIG. 7.3.1. Afterwards, the customer logs into the restaurant's system [140] as detailed in the Establishment Login Logic in FIG. 7.3.2.

Table Number Transferred Check

If the table number has already been transferred to the mobile device [145:yes], then the logic continues in the below section, entitled "Complete Other Login Procedures". One particular case in which this would occur is if the customer uses his/her mobile device in an establishment that employs the automated-seating functionality and the system is able to electronically transfer the customer's table number to his/her mobile device, perhaps via a short-range, electronic communications medium (i.e. infrared or Bluetooth).

On the other hand, if the table number has not already been transferred to the mobile device [145:no], then the customer can select the menu option on his/her mobile device to enter the table number [150]. It is important to note that in the mobile device implementation of this present invention, upon system login, it is not necessary for the customer to select his/her preferred language, as with the terminal implementation. This is because when the customer first registers to use the ordering system for his/her mobile device, he/she will download the appropriate version of the program or access the appropriate web page for his/her preferred language, if it is supported.

Continuing with the diagram logic, the customer proceeds to enter his/her table number [160]. Although the system knows the party's table number(s), it is necessary for the customer to enter his/her table number in the situation where the party may be disbursed across two or more tables. In such a case, if the customer did not enter his/her table number, the staff person would not know which of the two or more tables (assigned to the party) to deliver a particular member's order. Furthermore, the input of the table number by the customer is meant as an additional security check.

Complete Other Login Procedures

After completing the other login procedures [170], the customer inputs any discount or promotion code that he/she may have, in addition to seeing if he/she qualifies for loyalty/appreciation rewards [175], as detailed in FIG. 8.3.3. Next, the customer selects the order menu option on his/her mobile device [180].

In this step [190], how the customer orders depends on whether the establishment offers a detail menu listing in the system. Some establishments, which offer the ordering system for wireless devices only and who wish to use their traditional printed menu for one reason or another, would most likely not provide detailed item descriptions in the system. In such a situation [190:no] or where the customer does not wish to view/download the entire menu, orders would be placed [200] by simply entering in the item's code from the printed menu, instead of selecting the items from an electronic menu. The Order Processing Logic in FIG.

8.3.1 would be essentially the same, except that in step 30, rather than "selecting an item" from a displayed list, the customer would simply "enter the item's code". This is an optional feature to allow more traditional establishments to take advantage of allowing customers to place orders wirelessly, but still retain the "look and feel" of the menus as an integral part of their establishment's atmosphere. This feature may also be considered an intermediary step as the establishment makes a gradual transition to the electronic menu-only system.

If the establishment offers a detailed menu listing in the system [190:yes], then the customer may place orders the standard way [200]—by selecting the order item from a listing, and not using a code—as depicted in the Order Processing Logic in FIG. 8.3.1. Upon completing all ordering, all the party members log out of the system [210], as described in the Restaurant Logout Logic in FIG. 8.1.3.4. The party then pays for their bill and/or picks up the receipt at the establishment's checkout counter [220], as explained in the Payment Settlement Logic of FIG. 8.1.2.1. Once the party receives their printed receipt, if one was specified, the party may then leave the establishment [230].

FIG. 7.1.3.1 is a diagram depicting sample screen shots of the mobile device solution at a restaurant. The various parts of the screen are not described, as they may change slightly, and as this diagram is provided more to lend visual support to the proceeding process logic diagrams of what the customer most likely will see. Note that in this depiction, the customer is adding a menu item to his/her order using a menu. However, depending on the establishment's preferences and the customer's preferences, it may be also possible for the customer to add an item to his/her order by inputting the item's code.

FIG. 7.2.1.1 is a diagram depicting the process logic of the mobile device solution for stores accepting cash and cashless payment mediums. After the customer enters the establishment [10], he/she must log into the system [20] (in accordance with the System Login-Registration Logic specified in FIG. 7.3.1) and then into the establishment's system [30] (as specified in the Establishment Login Logic in FIG. 7.3.2). It is important to note that in the mobile device implementation of this present invention, upon system login, it is not necessary for the customer to select his/her preferred language, as with the terminal implementation. This is because when the customer first registers to use the ordering system for his/her mobile device, he/she will download the appropriate version of the program or access the appropriate webpage for his/her preferred language, if it is supported. Continuing with the diagram logic, the customer next enters any discount or promotion code that he/she may have, in addition to seeing if he/she qualifies for loyalty/appreciation rewards [35], as detailed in FIG. 8.3.3. After which, the customer selects the order menu on his/her device [40], Some establishments, who offer the ordering system for wireless devices only (e.g. no terminals involved) and who wish to use their traditional display/printed menu for one reason or another, may not provide detailed item descriptions in the system (i.e. on the mobile device). In such a situation [45:no], orders would be placed [50] by simply entering in the item's code from the display/printed menu, instead of selecting the items from an electronic menu. The Order Processing Logic in FIG. 8.3.1 would be essentially the same, except that in step 30, rather than "selecting an item" from a displayed list, the customer would simply "enter the item's code". This is an optional feature to allow more traditional establishments to take advantage of allowing customers to place orders wirelessly, but still retain the "look and feel" of the menus as an integral part of their establishment's atmosphere. This feature may also be considered an intermediary step as the establishment makes a gradual transition to the electronic menu-only system.

If the establishment offers a detailed e-menu listing in the system [45:yes], then the customer may place orders the standard way [50]—by selecting the order item from a listing, and not using a code—as depicted in the Order Processing Logic in FIG. 8.3.1. The ensuing process logic varies depending on the payment method that the customer specified upon login [60].

Paid by Cashless Payment Medium

If the customer is using a cashless payment medium [60:cashless], then the system charges the amount of the order to the customer's medium [70], updates the customer's payment status within the system [80], and while the system updates the customer's reward points [85], as described in FIG. 8.3.4, it also asks the customer if a receipt is needed [90]. The customer then specifies whether a receipt is needed, and if so, what type of receipt [92]. If no receipt is needed [100:no], then the logic proceeds according to the "Cashless: Post Receipt Logic" below. In the case where a receipt is needed [100:yes], the customer must select the receipt type [110]. If an email-only version of the receipt is desired [110:email], then the system emails the receipt to the customer [130]. The ensuing logic then proceeds with the process specified below in the "Cashless: Post Receipt Logic" section. In the event that the customer would like both a printed receipt and an email-version of the receipt [110:email & print], then a receipt is emailed to the customer [120]. The customer must then follow similar procedures as those paying by cash, beginning with Step 200 in the section entitled "Paid-by-Cash" below. If the customer only wants a printed receipt [110:print], then the logic ensues with step 200 in the section entitled "Paid-by-Cash" below.

Cashless: Post Receipt Logic

Because the customer's order is being placed via the central processing center's Internet website, the system sends the customer's order information and payment status to the establishment's in-house server [140]. A natural extension of the present invention will be to send the customer's order and payment information directly to the establishment's in-house server via a wireless technology such as 802.11, Bluetooth, etc., but due to current technology limitations and security precautions, the current method is as specified above.

Once the establishment receives the order information, two different processes begin to simultaneously occur. One is described below in the section entitled "Post Order Transfer", and the other is focused on the customer and his/her device, which is described as follows. The system then displays a temporary (paid) "e-ticket" (electronic ticket) on the customer's mobile device [160]. The e-ticket will contain the customer's paid status, a modified order number, and optional bar code. Since the order number will be very simple (e.g. "123" or other short alpha-numeric combination), it may be possible for someone to duplicate it at home and send the duplicated image to their mobile device. As a result, the system will dynamically append a short, random, alphanumeric combination on to the end of the basic order number, which the staff person can use to confirm the validity of the order. This is referred to as the "modified order number". The bar code is optional, as limitations in current technology and variations in the various mobile devices screen material (which may or may not allow the bar code to be read) exist.

The customer then simply waits for his/her order number to be called or displayed on the establishment's order pickup display, if available [170]. The logic that ensues, when the customer's order is in process or ready, is detailed in the "Post Order Transfer" section below.

Paid-by-Cash

If the customer opts to pay in cash [60:cash], then the system asks him/her if a receipt is needed [180]. The customer then specifies if a receipt is needed, and if so, the type of receipt [190]. After which, the system sends the customer's order information and payment status to the establishment's in-house server [200]. A temporary (not-paid) e-ticket will then be displayed on the customer's mobile device [210]. This temporary e-ticket varies from the previous described e-ticket in that the customer's paid status is "not paid" and the order number being displayed is the basic order number and not the modified one. The e-ticket's paid status is set to "paid" and the modified order number is displayed only after the customer has paid for his/her order. If the customer had previously paid for his/her order using a cashless payment medium and simply needs a receipt, then the paid status would be set to "paid" and the order number being displayed would be the modified one.

The customer then proceeds to the payment/receipt counter [220]. If the establishment is using a cash deposit/receipt machine [230:yes], then the customer may input/scan/transfer his/her e-ticket information into the machine [240]. In the case where the customer already paid for his/her order using a cashless payment medium [250:yes], then the system will print the customer's receipt [260]. After the customer takes his/her receipt [262], he/she will wait for his/her order number to be called/displayed [390]. When the order is ready, the logic continues with Step 410 as described in the section entitled "Post Order Transfer" below. If the customer had yet to pay for his/her order [250:no], then the cash deposit/receipt machine would display the amount due [270]. After the customer inserted the amount due into the machine [280], the logic would continue with the "Post Paid-By-Cash" section below.

If the establishment is not using a cash deposit/receipt machine [230:no], then the customer would show/scan/transfer his/her e-ticket information to the staff's device or terminal [290]. In the situation where the customer's e-ticket information is not scanned or transferred directly into the staff's device or terminal, the staff will input the customer's order number directly into the system [300]. In the event that the customer has already paid for his/her order using a cashless payment medium [310:yes], then the process proceeds with Step 360 in the "Post Paid-By-Cash" logic below. If the customer has yet to pay [310:no], then he/she pays the staff for the amount of the order [320]. After the staff inputs the customer's payment into the system [330], the process continues with the "Post Paid-By-Cash" logic below.

Post Paid-By-Cash

At this point, the system updates the customer's payment status [340]. Following which, three processes occur simultaneously. The first is described in the section below entitled "Post Order Transfer". Second, the system updates the customer's reward points [345], as described in FIG. 8.3.4. The last being whether or not the customer specified if a receipt was needed [350]. If the customer previously specified that a receipt was needed [350:yes], then the system will take the appropriate action (i.e. email and/or print the appropriate receipt). In the case of a receipt not being required [350:no], the customer selects update on his/her mobile device [370]. The system will then update the e-ticket on the customer's mobile device [380]. The e-ticket should now indicate that the order status is "paid" and that the order number has alphanumeric characters appended.

The customer then only needs to wait until his/her order number is called or displayed [390]. When the customer's order is ready, then the logic proceeds in accordance with Step 410 in the section below entitled "Post Order Transfer".

Post Order Transfer

The establishment processes the order [400] in accordance with Steps 110-390 of the Order Processing Logic in FIG. 8.3.1. The staff person then calls the customer's order number, or the system displays the order number on the establishment's pickup display [410]. The customer then proceeds to the order-pickup counter [420]. Depending on the technology available, the customer either shows the staff person the e-ticket on his/her (customer's) mobile device, scans the bar code on his/her mobile device into the system's bar code reader, or electronically transfers his/her e-ticket info to the establishment's terminal or device [430]. The staff person then verifies the customer's e-ticket [440] and gives the ordered item(s) to the customer [450]. After receiving his/her order item(s), the customer may leave the establishment or find free seating within the establishment [460].

FIG. 7.2.2.1 is a diagram depicting the process logic of the mobile device solution for stores that accept cashless payment mediums only. After the customer enters the establishment [10], he/she must log into the system [20] (in accordance with the System Login-Registration Logic specified in FIG. 7.3.1) and then into the establishment's system [30] (as specified in the Establishment Login Logic in FIG. 7.3.2). It is important to note that in the mobile device implementation of this present invention, upon system login, it is not necessary for the customer to select his/her preferred language, as with the terminal implementation. This is because when the customer first registers to use the ordering system for his/her mobile device, he/she will download the appropriate version of the program or access the appropriate webpage for his/her preferred language, if it is supported. Continuing with the diagram logic, the customer next enters any discount or promotion code that he/she may have, in addition to seeing if he/she qualifies for loyalty/appreciation rewards [35], as detailed in FIG. 8.3.3. The customer selects the order menu on his/her device [40].

Some establishments, that offer the ordering system for wireless devices only and who wish to use their traditional display/printed menu for one reason or another, may not provide detailed item descriptions in the system. In such a situation [45:no] or where the customer does not wish to view/download the entire menu, orders would be placed [50] by simply entering in the item's code from the display/printed menu, instead of selecting the items from an electronic menu. The Order Processing Logic in FIG. 8.3.1 would be essentially the same, except that in step 30, rather than "selecting an item" from a displayed list, the customer would simply "enter the item's code". Again this is an optional feature which allows more traditional establishments to take advantage of allowing customers to place orders wirelessly, but still retain the "look and feel" of the menus as an integral part of their establishment's atmosphere. This feature may also be considered an intermediary step as the establishment makes a gradual transition to the electronic menu-only system. If the establishment offers a detailed e-menu listing in the system [45:yes], then the customer may place orders the standard way [50]—by selecting the order item from a listing, and not using a code—as depicted in the Order Processing Logic in FIG. 8.3.1.

Next, the system charges the amount of the order to the customer's cashless payment medium [60] and updates the customer's payment status within the system [70]. At the same time that the system asks the customer on his/her mobile device if a receipt is needed [100] and updates the customer's reward points [75], as described in FIG. 8.3.4, the system also sends the customer's order information and payment status to the establishment's in-house server [80] and the establishment begins to process the order [90] (in accordance with steps 110-390 of the Order Process Logic in FIG. 8.3.1). It may be possible to also send the customer's order and payment information directly to the establishment's in-house server via a wireless technology such as 802.11, Bluetooth, etc., but due to current technology limitations and security precautions, the current method is as specified above.

While the order is being processed, the customer specifies on his/her mobile device if a receipt is needed [110]. If a receipt is not needed [120:no], then the process continues with the logic specified in the below section, entitled "Post Receipt Specification Logic". In the case where a receipt is needed [120:yes], the customer must select the receipt type [140]. If an email-only version of the receipt is desired [140:email], then the customer must specify and/or confirm the email address(es) to which he/she wishes the receipt to be sent [150]. Following confirmation, the system emails the receipt to the customer [160]. The process continues with the logic specified in the below section, entitled "Post Receipt Specification Logic".

In the event that the customer would like both a printed receipt and an email-version of the receipt [140:email & print], then again, the customer first specifies and/or confirms the email address(es) to which he/she wishes the receipt to be sent [170]. After the system emails the receipt to the specified address(es) [180], the process continues below with the logic specified in the section entitled "Printed Receipt Logic". If only a printed receipt is needed [140:print], then the process continues below with the logic specified in the section entitled "Printed Receipt Logic".

Printed Receipt Logic

The system then prompts the customer on his/her mobile device to proceed to the receipt dispenser at the establishment [190]. After the customer inputs/scans/transfers his/her e-ticket information into the machine [200], the system dispenses the customer's printed receipt [210]. The e-ticket will contain the customer's paid status, a modified order number, and optional bar code. Since the order number will be very simple (e.g. "123" or other short alpha-numeric combination), it may be possible for someone to duplicate it at home and send the duplicate image to their mobile device. As a result, the system will dynamically append a short, random, alphanumeric combination on to the end of the basic order number, which the staff person can use to confirm the validity of the order. This is referred to as the "modified order number". The bar code is optional, as limitations in current technology and variations in the various mobile devices screen material (which may or may not allow the bar code to be read) exist.

The process that begins after the customer takes his/her receipt [220] is specified in the below section, entitled "Post Receipt Specification Logic".

Post Receipt Specification Logic

After the system displays the customer's e-ticket on the customer's mobile device [240], the customer must then wait for his/her order number to be called or displayed [250]. When the customer's order is ready, the staff person will then call the customer's order number or display it on the establishment's "order-pickup" display, if available [260]. The customer then proceeds to the counter to pick up his/her order [270]. Before receiving his/her order though, the customer must show/scan/transfer his/her e-ticket information to the staff person (or to the staff person's device or terminal) [280]. The staff person then verifies the customer's e-ticket [290]. Upon successful verification, the staff person gives the customer his/her ordered items [300]. The customer is then free to leave the establishment or find seating, if available [310].

FIG. 7.2.3.1 is a diagram depicting sample screen shots of the mobile device solution at a store. The various parts of the screen are not described, as they may change slightly, and as this diagram is provided more to lend visual support to the proceeding process logic diagrams of what the customer most likely will see. Note that in this depiction, the customer is adding a menu item to his/her order using the item's code. However, depending on the establishment's preferences and the customer's preferences, it may be also possible for the customer to add an item to his/her order by selecting from a menu.

FIG. 7.3.1 is a diagram depicting the system login and registration process logic for mobile devices. If it is not the customer's first time using the system [10:no], he/she simply accesses the order system's application or web page on his/her mobile device [200]. A check is then performed to see if the customer has enabled his/her mobile device for auto-login upon startup [210]. Auto-login simply refers to the system automatically sending the customer's login information (i.e. id and password) to server, rather than requiring the customer to manually enter and send it him/herself. This depends in part on the customer's security preferences and if the feature is available on the mobile device. If the customer has not enabled auto-login [210:no], then the logic continues in the below section, entitled "Login Logic". On the other hand, if he/she has enabled auto-login [210:yes], then the logic continues in the below section, entitled "Verify Login".

However, if it is the customer's first time using the system [10:yes], then he/she needs to access the central processing center's website using his/her mobile device [20]. The customer then registers his/her personal information to become a member of the service [25]. Next, the customer downloads the system's ordering application or accesses the next corresponding web page [30]. It is to be stressed that the ordering application is capable of being deployed either as a program downloaded to the customer's mobile device or as a web service whereby the customer would simply access various web pages. As such, this diagram describes the logic such that it is applicable to either method of using the ordering system. However, this system prefers the method of having the customer download the application to his/her mobile device since keeping core parts of the application and its related data on the mobile device will reduce the amount of data traveling over the network, which will reduce costs for the customer (whereby the customer pays for each packet of data transmitted) and improve response times.

The customer then may need to register other personal information and his/her system preferences [40]. Next, because it is possible that payments can be processed via the mobile device's mobile phone gateway provider or internet service provider (whereby a customer's purchase will appear on his/her mobile provider's bill, and the mobile provider in turn pays the merchant), a check must be made to see if the mobile provider's payment mechanism is being used to handle payments [45]. If so [45:yes], the logic continues with that specified in the below section entitled "Save Customer Information". Otherwise, if the mobile provider's payment mechanism is not being used [45:no], then the customer is asked by the system if he/she would like to register a cashless payment medium [50], which offers the benefit to the customer of avoiding extra procedures and waiting time faced by those paying in cash. If the customer does not wish to register a cashless payment medium at this time [50:no], the logic continues with that specified in the below section, entitled "Save Customer Information".

However, if the customer does wish to register a cashless payment medium [50:yes], then he/she inputs the information for his/her cashless payment medium [60].

Confirms Cashless Payment Medium

The customer confirms that his/her cashless payment medium information is correct [70]. If the customer determines that there is a mistake in the information inputted [80:no], he/she may then modify the cashless payment medium's information [90] and the logic returns to the above section entitled "Confirms Cashless Payment Medium". Otherwise, if the information is correct [80:yes], the system then validates the cashless payment medium [100]. If the customer's cashless payment medium is accepted [110:yes], then the process continues with the below section, entitled "Save Customer Information".

In the event that the cashless payment medium is not accepted [110:no], the customer has two options depending on whether the system is a cashless only one or not. If the system accepts cashless payment mediums (i.e. no cash) only [120:yes], then the customer will need to modify his/her medium's information [90] and the logic returns to the above section, entitled "Confirms Cashless Payment Medium". If the system also accepts cash [120:no], then the customer will be asked if he/she would like to simply use cash or try again at registering a cashless payment medium [130]. If the customer wants to continue trying to register a cashless payment medium [130:no], then he/she must modify his/her cashless payment medium [90], after which the logic returns to the above section, entitled "Confirms Cashless Payment Medium". On the other hand, if the customer simply wants to use cash (i.e. he/she may not have another cashless payment medium) [130:yes], he/she may do so and the process will continue as specified in the below section, entitled "Save Customer Information".

Save Customer Information

The system saves the customer's preferences and other information [145]. If the customer does not wish to currently use the ordering feature [150:no], then the system will display the main menu or web page [160]. However, if the customer does wish to use the system immediately [150:yes], then the logic continues as follows.

Login Logic

The customer inputs his/her login information [300].

Verify Login

After the system verifies that the customer's login information is correct [302], a check is performed to see if the system automatically transferred the establishment's id to the customer's mobile device [305]. This may occur if the establishment is employing the automated seating system and the system automatically transfers the establishment's id to the mobile device, perhaps via a short-range, electronic communications medium (i.e. infrared or Bluetooth).

If the establishment's id is not automatically transferred to the customer's mobile device [305:no], then the customer must enter the establishment's id or select the establishment from a pre-existing list of registered establishments [310]. However, if the establishment's id has been automatically transferred to the customer's mobile device [305:yes], then no further system login input is required of the customer.

FIG. 7.3.2 is a diagram depicting the establishment login process logic for mobile devices. If the establishment is a store [10:store], then the logic proceeds in accordance with the steps described in the below section, entitled "System Type Logic". In the case where the establishment is a restaurant (or other seated establishment) [10:restaurant], then the logic that follows depends on the type of system being used by the establishment [20]. If the system accepts cash and cashless payments [20:cash & cashless], then the customer must enter his/her visit code [30], as well as the party leader's name, and if not the party leader, his/her own party-unique name [40]. If the system accepts cashless-only payments [20:cashless only], then the customer only needs to input the party leader's name, and if not the party leader, his/her own party-unique name [40]. Other members of the party, besides the party leader, can log into the system using the party's visit code, the party leader's name, and their own party-unique name. It is important to note that once the party leader has logged in, it is not possible for anyone else to log in with the same name and visit code. Non-party leader members will be able to add items to the order, as presented in FIG. 8.3.1, but he/she will not be able to place the order. The party leader will need to confirm the member's order [FIG. 8.3.1:104-106], unless the leader specifies that the member is a trusted orderer, in which case the member will then be able to directly place orders.

The system then checks to see whether the customer is the party leader [50]. If so [50:yes], then the logic proceeds in accordance with the steps described in the below section, entitled "System Type Logic". If the customer is not the party leader [50:no], then system must check the establishment's preferences to see if it allows party members to pay separately [60]. In the event party members are not allowed to pay separately [60:no], then refer the below section entitled "Continue". If party members can indeed pay separately [60:yes], then the customer will be asked if he/she does in fact want to pay for his/her own order(s) [70]. In the case that the party member does not wish to pay for him/herself [70:no], then refer the below section entitled "Continue". Otherwise [70:yes], the logic proceeds in the below section, entitled "System Type Logic".

System Type Logic

If the system is a cashless only system [80:cashless only], then the system validates the customer's cashless payment medium [100] and the logic continues as specified in the below section entitled "Continue". If the system accepts both cash and cashless payments [80:cash & cashless], and the customer wishes to pay with his/her cashless payment medium [90:cashless], then the system again validates the customer's cashless payment medium [100] and the logic continues as specified in the below section, entitled "Continue". Otherwise, if the customer is simply paying in cash [90:cash], then the logic continues as specified in the below section entitled "Continue".

It is to be noted that in the event that a cashless payment medium is not registered, where one is required, or there is a problem with the validation, then the customer will be prompted to try again or register a different medium. This holds true for all cases in this diagram where the system "validates cashless payment medium".

Continue

The process logic returns to the diagram that referenced this process logic diagram.

Referring to FIG. 8.1.1.1, a diagram depicting the payment settlement logic for restaurants accepting cash and cashless payment mediums is shown. This process begins with the assumption that the customer has logged out of the order system. If the customer previously specified that he/she would pay using a cashless payment medium [10: cashless], then his/her medium is charged for the amount that he/she owes [20]. Afterwards, the ensuing logic is the same as if the customer had previously specified that he/she would pay by cash [10:cash]. The customer proceeds to the checkout counter or cashier area [30]. If the establishment has a payment/receipt machine [35:yes], which automatically accepts payments from and issues receipts to customers, then the logic continues in the below section, entitled "Automated Payment Acceptance". Otherwise, if the establishment is not using a payment/receipt machine [35:no], the logic proceeds as explained in the below section, entitled "Manual Payment Acceptance".

Automated Payment Acceptance

If the customer used his/her mobile device for ordering and the mobile device has short-range communication capability (i.e. infrared, Bluetooth) [100:yes], then the customer may wirelessly transfer his/her customer id and other information to the payment/receipt machine [110]. However, if the customer was not using or does not have a mobile device with short-range communication capability [100:no], then he/she must scan the bar code from his/her visit slip into the payment/receipt machine [120]. In either case (110 or 120), the next step depends upon the customer's payment method [130]. If the customer is paying in cash [130:cash], then the payment/receipt machine will display the amount due [140]. The ensuing logic is described in the below section entitled "Pay Bill".

If the customer's preferred payment method is cashless [130:cashless], then the bill should have already been charged to his/her cashless payment medium upon finishing ordering. As such, the payment/receipt machine simply needs to confirm that the customer's payment has been accepted and that the customer successfully logged out of the ordering system [150]. As a security measure, if the customer has not specified that he/she needs a receipt, the payment/receipt machine may issue a simple slip, indicating that the customer paid in full and which may be presented to a staff person, security person, or other individual upon exiting the establishment. The ensuing logic continues in the below section, entitled "Receipt Logic".

Manual Payment Acceptance

If the customer used his/her mobile device for ordering and the mobile device has short-range communication capability (i.e. infrared, Bluetooth) [40:yes], then the customer may wirelessly transfer his/her customer id and other information to the staff person's terminal or other device [45]. The ensuing logic continues in the below section, entitled "Manual Payment Acceptance: Display Customer Information". However, If the customer did not use a mobile device, which has short-range communication capability, for ordering [40:no], then he/she simply presents his/her visit slip to the staff person [50]. The staff person then scans the bar code on the visit slip into the system [55].

Manual Payment Acceptance: Display Customer Information

The system then displays the customer's order information [60]. If the customer paid using a cashless payment medium [70:cashless], then the staff person simply needs to confirm that the customer has indeed logged out of the system successfully and that the customer's payment was accepted [80]. The logic continues as described in the below section entitled "Receipt Logic". However, if the customer previously specified that he/she would pay in cash [70:cash], then the staff person tells the customer the bill total [90].

Pay Bill Logic

The customer then pays for his/her bill by inserting cash or other payment medium into the machine [200].

Receipt Logic

The system checks to see if a receipt was previously requested by the customer [210]. If not [210:no], refer to the below section, entitled "Close Transaction". If a receipt was previously specified [210:yes], the system queries itself to determine which type of receipt was requested [220]. If the customer specified that he/she would like to receipt an email-only receipt [220:email], then the system emails or electronically transfers a receipt to the customer [260]. The ensuing logic is explained in the below section, entitled "Close Transaction". In the case that the customer specified that he/she would like both an emailed and printed receipt [220:email & print], then the system emails or electronically transfers a receipt to the customer [230]. The ensuing logic, which is the same as if the customer had specified a printed receipt [220:print], is described in the below section, entitled "Print Receipt".

Print Receipt

After the system prints out the customer's receipt [240], the customer takes his/her receipt [250].

Close Transaction

The customer and his/her party's visit transaction is closed automatically by the system, if the customer used the payment/receipt machine, or manually by a staff person, if no payment/receipt machine was used [270]. The visit transaction will not be officially closed until all of the paying members in the party have paid, if paying separately and have requested receipts.

FIG. 8.1.2.1 is a diagram depicting the payment settlement logic for restaurants accepting cashless payment mediums only. At the point that the customer and his/her party logs out of the system, the amount due is charged to the customer's cashless payment medium [10]. It is noted that in the situation where several of the party members have registered that they will pay separately, then each paying member's cashless payment medium is also charged. Because each cashless payment medium transaction usually incurs a slight fee, the customer's medium may not be charged after each order placed (in FIG. 8.3.1), but rather after he/she and his/her party has indicated that they have finished all ordering. Another reason for waiting until logout to charge the customer's medium is that there are mediums (e.g. credit card, debit card, etc.) that allow a temporary charge to be placed on the medium until the full or actual bill charged. However, for cashless payment mediums where the process of storing the medium's information and charging it later may not be possible or does not make good business sense, then the medium may be charged before each placed order is accepted. This may be the case with some forms of pre-paid cards.

If there is a problem with the transaction [20:yes], then a staff person will be notified [30]. Otherwise [20:no], the system will be queried to see if the customer had previously requested a receipt [40]. In this case a printed receipt was not specified [40:no], then the logic continues with the below section, entitled "Close Transaction". Otherwise [40:yes], the system queries itself to determine which type of receipt was requested [50].

If the customer specified that he/she would like to receive an email-only receipt [50:email], then the system emails or electronically transfers a receipt to the customer [60] and the ensuing logic is explained in the below section, entitled "Close Transaction". In the case that the customer specified that he/she would like both an emailed and printed receipt [50:email & print], then the system emails or electronically transfers a receipt to the customer [70]. The ensuing logic, which is the same as if the customer had specified a printed receipt [50:print], is described in the below section, entitled "Notify Customer".

Notify Customer

The system notifies the customer to proceed to the checkout/receipt counter to obtain his/her printed receipt [80]. The customer then goes to the checkout/receipt counter [90]. If the customer used a mobile device, having short-range communications capability [95:yes], then he/she simply transfers his/her customer id and other information to the receipt device [97]. The ensuing logic continues in the below section, entitled "Print Receipt". Otherwise [95:no], he/she selects his/her cashless payment medium type [100] and swipes/inputs/transfers his/her medium or its information to the receipt device or terminal [110].

Print Receipt

After the system prints out the customer's receipt [120], the customer may take his/her receipt [130].

Close Transaction

The system then closes the customer and his/her party's visit transaction [140]. The visit transaction will not be officially closed until all of the paying members in the party have paid and received their receipts.

FIG. 8.1.3.1 is a diagram depicting the automated seating logic for restaurants. This process begins with the pre-table available check, as described in FIG. 8.1.3.2 (Step 10:pre-table avail. check) [10]. Based on information that is input, the system will determine if a table is available [20]. A check will then be performed by the system to determine if there are any tables available and that the automated seating system is not on hold [30]. The automated seating system may be placed on hold by the wait staff if they need, for some reason or another, to resolve a seating situation manually, and temporarily do not want the system to automatically seat customers.

If there are table(s) available and the automated seating system is not on hold [30:yes], then the system will check to see if an available table will accommodate the total number of customers in the party [40]. If the party size is not greater than the maximum seat count of the available table(s) [40:no], implying that a table is available that will accommodate the party, then the logic continues with that described in the below section, entitled "Table Immediately Available".

In the situation where none of the available tables will accommodate the entire party [40:yes], the system will perform a check to see if any two adjacent tables are available [100]. If there are [100:yes], the ensuing logic is explained in the below section, entitled "Table Immediately Available". On the other hand, if two adjacent tables are not available [100:no], then a message indicating such will be displayed to the party leader [110]. The party leader must then indicate whether he/she and his/her party want to 1) check if any combination of tables to accommodate the party is available, 2) wait for adjacent tables, or 3) not wait (and leave the establishment) [120].

If the party does not wish to wait [120:not wait], they may leave the establishment [130]. In the situation where the party wishes to wait for adjacent tables [120:wait for adjacent tables], then the party leader enters his/her information into the login terminal/device [140] as outlined in FIG. 8.1.3.2 (Step 300:post-table avail. check). The system will then add the party to a wait queue (for adjacent tables) [150].

The party must then wait [200] until adjacent tables become available. The logic for what occurs when a table becomes available is described in the below section entitled "Table Becomes Available". If the party leader decides that any combination of available tables is acceptable [120:any tables], then the system will check to see if the number of tables necessary is available for the party [160]. If there are [160:yes], the ensuing logic is explained in the below section, entitled "Table Immediately Available". If the necessary number of tables is not available [160:no], the party leader may then decide whether or not his/her party will wait [170]. If the party does not wish to wait [170:no], then they are free to leave the establishment [130]. If the party decides to wait [170:yes], then the party leader will need to input his/her information [180] as outlined in FIG. 8.1.3.2 (step 300:post-table avail. check). The system will then add the party to the wait queue (for any available tables) [190], after which the party simply waits [200]. The logic for what occurs when a table becomes available is described in the below section entitled "Table Becomes Available".

Frequently, there will be times when absolutely no tables are available (and thus no party size versus table seating size checks will be able to be done) [30:no]. In such case, the party may decide whether they would like to wait or not [300]. If they do not wish to wait [300:no], they may leave the establishment [310]. However, if the party would like to wait [300:yes], then the party leader must enter his/her information [320], as specified in FIG. 8.1.3.2 (Step 300: post-table avail. check). Once completed, the party is then added to the wait queue [330].

If there is a guest terminal in the waiting area [340:yes], then the party may browse the menu or pre-order items [350], in accordance with the logic outlined in FIG. 8.1.3.5 (Step 10:terminal). In the event that a guest terminal is not available [340:no], then the party members may still be able to browse the menu [380]. If the party members do not have a mobile device or choose not to browse/pre-order using their mobile device [380:no], then they must wait until a table becomes available [400]. The logic for what occurs when a table becomes available is described in the below section entitled "Table Becomes Available". If any of the party members wishes to browse/pre-order with their mobile device [380:yes], he/she may do so as specified in FIG. 8.1.3.5 (Step 10:mobile) [390].

Regardless of whether the guest terminal or a mobile device was used for browsing/pre-ordering, the logic to describe the process when a table becomes available is described in the below section, entitled "Table Becomes Available".

Table Becomes Available

If the establishment is using a cash and cashless capable system [500:cash & cashless], then the system will show on a special, "table-available" display, the party leader's name, party count, and directions to confirm the party's seating [510]. The ensuing logic is described in the below section, entitled "Table Becomes Available: Visit Slip Check". On the other hand, if the establishment is using a cashless only system [500:cashless only], then the "table-available" display will show the party leader's name, party count, and table number(s) [520]. The ensuing logic immediately follows (below).

Table Becomes Available: Visit Slip Check

If the party leader has a visit slip [530:yes], then he/she proceeds to the auto-seating or similar device, scans the bar code on his/her party's visit slip [540]. The system may optionally print out the party's table number on the visit slip or on a separate piece of paper [550], and the logic continues in the below section, entitled "Activate Visit Code". If the party leader does not have a visit slip [530:no], then the logic varies depending on whether the customer/party leader is using a mobile device with short-range communication capability (i.e. infrared, Bluetooth) [560]. If he/she is not using a mobile device with such capability [560:no], the ensuing logic is explained in the below section, entitled "Activate Visit Code". Otherwise, if the party leader does have such a mobile device [560:yes], then he/she must transmit his/her customer id and other information to the auto-seating or similar device/terminal [570]. The system then wirelessly transfers the available table number(s) to the customer's mobile device [580]. The ensuing logic is described in the below section, entitled "Activate Visit Code".

Table Immediately Available

The party leader proceeds to input his/her information [50], as described in FIG. 8.1.3.2 (Step 300:post-table avail. check), and the logic continues as described below.

Activate Visit Code

The system activates the party's visit code or the customer's account [590], and the logic flow returns to the diagram that referenced the logic in this diagram.

FIG. 8.1.3.2 is a diagram depicting the customer information input process logic, which is used primarily by FIG. 8.1.3.1 in the automated seating process logic, for restaurants. The point at which the process begins depends upon the timing from the Automated Seating Process Logic diagram [FIG. 8.1.3.1] [10]. If the request for the customer to input his/her information occurs before the table availability check [10:pre-table avail. check], then the logic that ensues is described in the below section, entitled "Pre-Table Availability Check". However, if the request for the customer's information occurs after the check to see if a table is available or not [10:post-table avail. check], then the logic continues with that explain in the below section, entitled "Post-Table Availability Check".

Pre-Table Availability Check

If the customer does not have a mobile device, which is equipped with short-range communication capability (i.e. infrared, Bluetooth), nor a system card, which is a card specifically for use with the ordering system [20:no], then he/she must use the special seating device or terminal and select his/her language preference [30]. Next, the customer inputs his/her party count and the party's smoking preference [40]. The ensuing logic is explained in the below section, entitled "Pre-Table Availability Check: Transfer Information to Server".

If the customer does have a mobile device, which is equipped with short-range communication capability (i.e. infrared, Bluetooth), or a system card [20:yes], then the logic that follows varies depending on whether the customer is using a mobile device or a system card [50]. If the customer is using a system card [50:card], then he/she inputs (or swipes) the system card into the seating device or terminal [60]. The ensuing logic is described in the below section, entitled "Send Customer ID to Server".

On the other hand, if the customer is using a mobile device with short-range communication capability [50:mobile], then the ensuing logic varies depending on whether the mobile device has a wireless auto-notify capability and is activated [70]. A wireless device has this capability if it is equipped with a short-range communication technology (i.e. Bluetooth), whereby the mobile device is able to auto-negotiate wireless communication with a nearby device equipped with identical or similar technology. In such a scenario, it is possible for the nearby device to actually initiate wireless communication with the customer's mobile device, if the customer has activated this feature on his/her device. If the customer does not have this type of mobile device, or does but the auto-notify feature is not activated [70:no], then he/she must log into the ordering system, as outlined in FIG. 7.3.1 [80]. The customer then manually transmits his/her customer id to the seating device or terminal (i.e. by pushing a button on the mobile device) [90]. The ensuing logic is described in the below section, entitled "Send Customer ID to Server".

However, if the customer does possess a mobile device with wireless, auto-negotiating communication capability and has the auto-notify feature activated [70:yes], the system or auto-seating device or terminal wirelessly auto-negotiates a connection with the mobile device as soon as the customer enters the establishment [100]. Even without the customer removing the mobile device from his/her pocket or bag, the system is able to automatically log the customer into the system [110]. This adds the extra benefit to the customer of not having to manually login, nor having to press any buttons to indicate to the establishment that he/she has arrived. The establishment benefits in that, because the customer's id is automatically transferred to the server, they know who (i.e. a preferred or valued customer) has entered their establishment and allows management to greet the customer and add a personal touch to that customer's experience during their visit.

Send Customer ID to Server

The system sends the customer's id from the seating device or terminal to the server [120], at which point the customer's information and preferences are retrieved [130]. While a notification of this particular customer's arrival can optionally be sent to the staff's terminal and display the customer's information (this feature is known as "auto-notification of customer arrival") [140], the customer confirms his/her party's smoking preference and enters the number of people in his/her party [150].

Pre-Table Availability Check: Transfer Information to Server

The customer's information and preferences are transferred to the server [160], and the logic returns to the diagram that referenced this diagram's logic.

Post-Table Availability Check

If the customer used a mobile device or a system card previously (in the Pre-Table Availability Check) [300:yes], then the logic that ensues is described in the below section, entitled "Post-Table Availability Check: Used Mobile Device or System Card". Otherwise, if the customer did not use a mobile device or a system card [300:no], then the auto-seating device or terminal will prompt the customer to input his/her information, including payment details [310].

If the system handles both cash and cashless payments [320:cash&cashless], then the customer selects his/her desired payment method [330]. If the payment method specified is cash [340:cash], then the logic proceeds in the below section, entitled "Post-Table Availability Check: Input Name". In the case where the preferred payment is cashless [340:cashless], the ensuing logic is described in the below section, entitled "Post-Table Availability Check: Select Cashless Payment Medium". Given that the system is setup for cashless only processing [320:cashless only], the logic proceeds as follows.

Post-Table Availability Check: Select Cashless Payment Medium

The customer selects his/her cashless payment medium type (i.e. credit, debit, pre-paid, smart card) on the auto-seating device/terminal [350] and then inputs into or transfers his/her medium's information to the auto-seating device/terminal [360]. If the auto-seating device/terminal is able to discern the customer's name from his/her cashless payment medium [370:yes], then the logic continues as described in the below section, entitled "Post-Table Availability Check: System Type". However, if the customer's name is indeterminable from the medium [370:no], the logic proceeds as follows.

Post-Table Availability Check: Input Name

The customer manually inputs his/her name [380]. Note that this can be any arbitrary name and not necessarily his/her full name. The logic that ensues depends upon the type of system being deployed [600] and is described in the below section entitled "Post-Table Availability Check: System Type".

Post-Table Availability Check: Used Mobile Device or System Card

If the customer previously used a system card to transfer/input his/her preferences [500:card], then the logic ensues in the below section, entitled "Post-Table Availability Check: System Type". Otherwise, if the customer used a mobile device, having short-range communication capability (i.e. infrared, Bluetooth) [500:mobile], the server will transfer, save, and display the customer's bar code and visit code on his/her mobile device [510]. In the event that the system has determined that a table is immediately available for the customer [520:yes], then the server will additionally transfer, save, and display the customer's table number on his/her mobile device [530].

Whether a table is available (as just described) or not available [520:no], the server checks to see if it is also necessary to print out a slip, for additional verification purposes, for the customer, depending on the preferences of the establishment or system [540]. The reason being is that should two customer or parties have a discrepancy over the same table (i.e. in the extremely unlikely event that a customer has created a fake image on the mobile device to create seemingly valid information), the slip will ultimately decide which customer or party has valid information. Such a scenario is extremely unlikely, but the additional logic for slip verification is provided here as a safeguard. If printed slip verification is necessary [540:yes], then the ensuing logic is described in the below section, entitled "Post-Table Availability Check: System Type". Otherwise [540:no], the logic flow returns to the diagram that referenced the logic described in this diagram.

Post-Table Availability Check: System Type

If the system accepts cash and cashless payment mediums [600:cash & cashless], then the system will generate and print out a slip, with a visit code and bar code, for the customer and his/her party [610]. The ensuing logic is described in the below section, entitled "Post-Table Availability Check: Table Availability". If the system accepts cashless payment mediums only [600:cashless only], then a check is performed to see if the system is configured to print slips in the cashless-only environments [620]. If not [620:no], then if a table is available [624:yes], then the customer's table number is displayed on the auto-seating device or terminal [626] (provided that the customer is using the auto-seating device or terminal and not his/her own mobile device). However, if a table is not available [624:no], then the logic flow returns to the logic diagram that referenced this logic diagram. In the case where the system is configured to print slips in the cashless-only setting [620:yes], then the system generates and prints a visit slip for the customer that includes a bar code and the customer's name [630].

Post-Table Availability Check: Table Availability

If a table is available for the customer [640:yes], then the auto-seating device will also print the table number on the customer's visit slip [650]. Whether a table is available or not [640:no], the customer takes the generated slip [660] and the process returns to the logic diagram that referenced this logic diagram.

FIG. 8.1.3.4 is a diagram depicting the logout logic for restaurants. Upon the customer selecting the logout button on his/her terminal or mobile device, the system asks the customer if he/she would like to leave feedback to the establishment about the quality of the food, service, etc. [10]. Asking the customer for this information is optional and whether this question is asked to the customer depends upon the preferences of the establishment.

If the customer wishes to leave feedback [10:yes], then the customer may proceed to enter comments about the quality of the food, service, etc. [20]. The system then displays the customer's input and asks the customer to confirm the input [30]. If the confirmation is acceptable to the customer [40:no], the system saves the customer's feedback [43] and the logic continues in the below section entitled "Tip Logic". Otherwise [40:yes], the customer may modify his/her input by repeating steps 20-30.

In the case where the customer does not wish to leave feedback [10:no], then the logic continues as follows.

Tip Logic

Next, the system asks the customer if he/she would like to leave a tip [50]. Asking the customer for this information is completely optional, as some restaurants automatically include the tip as a gratuity charge. Also, in some countries, tipping is not commonplace. As a result, whether this question is asked to the customer depends upon the preferences of the establishment and in some cases, on cultural standards. In a party where members other than the party leader are also paying, then this question is only asked of the party leader.

If the establishment asks this question of the customer and the customer wishes to leave a tip [50:yes], then the system displays the total order/bill amount (to aid the customer in making his/her decision) [55]. After the customer enters the tip amount or percentage [60], the system displays the customer's input and asks the customer to confirm [70]. If no modifications are necessary [80:no], then the system saves the tip information [83] and the logic continues in the below section, entitled "Receipt Logic". Otherwise if modifications are needed [80:yes], the customer may modify his/her input by repeating steps 55-80.

Receipt Logic

The customer next specifies his/her receipt preferences [90], in accordance with the Receipt Specification Logic described in FIG. 8.3.2. After the customer has specified his/her receipt preferences, the system executes the Reward Points Update Logic [95], as set forth in FIG. 8.3.4, and officially logs the customer out of the establishment's system [100].

Referring now to FIG. 8.1.3.5, a diagram depicting the browsing/pre-ordering process logic for restaurants is shown. If the establishment has a guest terminal and the customer wishes to use it to browse/pre-order [10:terminal], then the customer may proceed to the guest terminal [80]. He/she then enters his/her language preference [85] into the terminal, if the system and establishment are configured to display screens in languages other than the primary language of the country where the establishment is located. Next, the customer may browse/pre-order items as explained in the below section, entitled "Browse/Pre-Order". In the case where the customer wishes to use his/her mobile device to browse/pre-order [10:mobile], then he/she must log into the ordering system [15], as described in the System Login-Registration Logic of FIG. 7.3.1, but only if he/she has not logged in previously (i.e. using auto-seating system). The customer then selects the browse/pre-order option on his/her mobile device [20].

If an "e-menu" listing is not available [25:no], then the customer must complete the login procedures for the establishment [30] (if he/she has not done so already), which are detailed in FIG. 7.3.2, in order to pre-order items. An "e-menu", short for "electronic menu", refers to an actual listing of the menu items on the customer's mobile device. The menu listing would include, but not limited to, name of the item, description, price, an optional picture, and other details. As mentioned in previous diagram descriptions, some establishments may prefer to use their existing printed menus and offer a basic ordering system, in which the customer would simply input the menu item's code into his/her mobile device. Such a system would not include an "e-menu", as all of the menu item details would be presented on the printed menu and not on the customer's mobile device.

After the customer enters the code of the item that he/she wishes to pre-order [35], the system saves the customer's pre-ordered item [40]. If the customer is finished pre-ordering items [50:finished], the ensuing logic is described in the below section, entitled "Finished". In the event a table is available [50:table avail.], the ensuing logic is described in the below section, entitled "Table Available". However, if the customer has not finished pre-ordering or a table is not yet available [50:no], he/she may continue to pre-order by repeating steps 35-50. If an e-menu listing is available [25:yes], whereby the customer may see the actual menu items on his/her device, then the logic that ensues depends on whether or not the e-menu is publicly visible [60]. Depending on the establishment's preferences, it may not want to allow anyone to view their e-menu (possibly for competitive reasons). As such, the establishment can require that the customer complete the establishment's login procedures in order to browse/pre-order (i.e. require that the customer be physically present to browse/pre-order).

If the e-menu is not publicly accessible [60:no], then the customer will be required to complete the establishment's login procedures [70], as detailed in FIG. 7.3.2, but only if he/she has not done so already. Otherwise [60:yes], the customer may browse/pre-order as described in the below section, entitled "Browse/Pre-Order".

Browse/Pre-Order

The customer, whether using the guest terminal or his/her own mobile device, proceeds to browse the available menu items [90]. While browsing the items, he/she may decide to pre-order a particular item [90:pre-order], in which case the system will then check to see if the customer previously completed the establishment's login procedures [110]. If the customer previously completed the establishment's login procedures [110:yes], then the ensuing logic is explained in the below section, entitled "E-menu—Save Pre-Ordered Item". Otherwise [110:no], then establishment login will be required depending on the device type [120].

If the customer is using a mobile device for browsing/pre-ordering [120:mobile], then he/she will need to complete the establishment's login procedures [130], as explained in FIG. 7.3.2, but only if he/she has not done so already. The ensuing logic is explained in the below section, entitled "E-menu—Save Pre-Ordered Item". However, in the case that the customer is using the establishment's guest terminal [120:terminal], then the login procedure varies depending on the system type [140].

If the establishment's system accepts both cash and cashless payment mediums [140:cash & cashless], then the customer simply enters the party's visit code, the party leader's name, and if he/she is not the party leader, his/her screen name [150]. The ensuing logic is explained in the below section, entitled "E-menu—Save Pre-Ordered Item". In the situation that the establishment's system only accepts cashless payment mediums [140:cashless], then the customer must select his/her cashless payment medium type [160] and then input or transfer his/her cashless payment medium (or its information) to the terminal [170]. The system then verifies that the cashless payment medium specified is identical to the one given by the customer upon walk-in [180], as depicted in the process logic of FIG. 6.1.1.1. The ensuing logic is explained in the below section, entitled "E-menu—Save Pre-Ordered Item".

E-Menu—Save Pre-Ordered Item

The system saves the menu item that the customer pre-ordered [190]. If the customer is finished pre-ordering items [200:finished], the ensuing logic is described in the below section, entitled "Finished". In the event a table is available [200:table avail.], the ensuing logic is described in the below section, entitled "Table Available". However, if the customer has not finished pre-ordering or a table is not yet available [200:no], he/she may continue to pre-order by repeating the steps given in the above section, entitled "Browse/Pre-Order".

Table Available

If a table becomes available while the customer is still browsing/pre-ordering, the system displays a message on the guest terminal or the customer's mobile device that a table is available [210]. If the establishment is not using the automated seating system [220:no], the ensuing logic is described in the below section, entitled "Finished". However, if the establishment is using the automated seating system [220:yes], then the message displayed next on the guest terminal or customer's mobile device depends on the system type [230].

If the establishment's system accepts cash and cashless payment mediums [230:cash & cashless], then the system will display a message to the customer to scan the bar code on his/her visit slip into the bar code reader [240]. In the case that the establishment only accepts cashless payment mediums [230:cashless], then the system will display the table number(s) that are available for the customer and his/her party [250]. The ensuing logic for both system types is described in the below section, entitled "Finished".

Finished

The customer's next action depends on which type of device he/she is using [260]. If the customer is using his/her own mobile device [260:mobile], then he/she will select the option to finish browsing/pre-ordering [280]. Otherwise, if the customer is using the establishment's guest terminal [260:terminal], then he/she will need to select the logout option [270].

Regardless of the device being used, if a table is available [290:yes], the logic flow will return to the diagram that referenced this diagram. However, if a table is not available [290:no], then the customer and his/her party will simply have to wait until a table is available [300]. Upon a table being available, the ensuing logic is that of the diagram which referenced this diagram.

FIG. 8.3.1 serves as the core order processing logic that all implementations share, regardless of establishment (restaurant or store), device type (terminal or mobile device), and payment method (cash-and-cashless or cashless only). The logic beings by checking to see if a customer has previously added any items to his/her order list or "basket" [10] during pre-ordering. This would be true if the customer had previously added items using a guest terminal or his/her mobile device while waiting to be seated.

In the event that items were previously added to the customer's order list [10:yes], then the saved items would be loaded from the system [20]. If, however, the customer had no previously added items in his/her order list [10:no], then the order process would begin by the customer 1) selecting the new order option/button [25], 2) selecting an item to order [30]; 3) selecting the item quantity, optionally specifying for whom the item is for, and the preparation options associated with the item [40]; and 4) adding the item to the order list [50]. The customer is then asked if they would like to add more items to their order [60]. If "yes" [60:yes], then steps 30-60 will be repeated. Otherwise, if the customer does not wish to add any more items [60:no], the system will display all of the items in the order list [70] and ask for confirmation of the order [80]. If the order is not acceptable [80:no], then the customer will be able to modify the order [90], in which case steps 70-80 will be repeated again. Once the customer has confirmed that the order is acceptable [80:yes], he/she will then submit the order [100].

The system will then check to see if the customer placing the order is a "trusted orderer" [104]. A "trusted orderer" is another customer in the party, besides the "party leader" (the person whose name was taken by the wait-staff and/or entered into the system as the party representative or "leader"), who is also placing orders and whom the party leader has specified that his/her orders can be submitted without approval. Basically, this is a security measure, more applicable to the cash and cashless restaurant scenario, because the party leader is responsible for all orders placed by his/her party and although extremely unlikely, it is not impossible for an outside "hacker" to guess the party's visit code and randomly place orders on the party's account. As such, all orders placed by anyone besides the party leader will require confirmation, unless the party leader specifies that he/she trusts the orderer and does not need to confirm an order every time.

If the orderer is not a trusted orderer [104:no], then the party leader will approve or disapprove the order or select items within the order [106]. Otherwise, the orderer is "trusted" [104:yes]. Then, all (confirmed and/or approved) orders are sent to the establishment's server [110]. In the terminal solution, orders are sent directly to the establishment's in-house server. However, in the mobile device solution, the customer's orders are sent via the Internet to central processing center's website, which then forwards the order electronically and automatically to the establishment's in-house server for processing. It may be possible for mobile devices to submit orders directly to the establishment's in-house server, but for security reasons, it is preferred that mobile device submit orders indirectly via the Internet to the central processing center's website.

The order is then "broken apart" and its individual items are added to a master item-processing list [120]. Depending on whether or not the item needs to be cooked or not [130], the path that the item then travels varies. We will first address the path that is taken when the item requires cooking [130:yes], as the path that is taken when the item does not require cooking [130:no] is still followed once an item has been cooked.

If an item requires cooking [130:yes], then the item will be added to the chefs' processing list [140]. Then, based on the establishment's preference, items that are the same and which have not begun being cooked yet, can be grouped together or not grouped together for processing [150]. This grouping feature basically allows efficiencies to be recognized when several items, which are the same or have very similar cooking and/or preparation options, appear on the chef's processing list. By grouping same items together, they may be prepared or cooked in batch, which will save the chef preparation time, cooking time, and cleanup time than if each item were prepared and cooked individually in sequential, chronological order of time placed.

If the establishment's preference is to take advantage of the grouping feature [150:yes], then the same items will be grouped together to all be prepared and cooked at the same time [160]. Once items have been grouped or even if the grouping feature is not employed in the establishment [150: no], the system then determines which chef can cook the item [170], if so specified by the establishment, and which chef is available or less busy [180]. This will help the establishment in routing ordered items to the chef who is most skilled to cook a particular item and who is able to begin cooking the item first, thus reducing processing time further. Once the system has been determined that a particular chef is able to cook a particular item, the item is added to that particular chef's processing list (or assigned to that chef) [190]. Next, the item is sent to the chef's terminal for processing [200]. In situations where several chefs are sharing the same terminal, then the item will appear with the responsible chef's name next to it, or in a special listing showing items only for that particular chef. The chef will then select the item, verbally or manually by pressing the touch-screen, in his/her list that is ready to be cooked; doing so will indicate that the particular item is being prepared [210]. At this point, the item is marked as in process [230] and the chef begins to cook the item [260]. Once the item's status has been updated as in process, an optional notification is sent to the customer, informing him/her that the item is being prepared [250]. At the same time, the cost of the item is also added to the customer's bill [240]. Upon finishing cooking the item, the chef indicates that the item is ready, either verbally or manually by pressing the touch-screen [270]. The item's status will be updated to ready on the server [280] and is assigned a high priority [290].

At this point, the cooked item is then added to the staff's processing list [300]. It is also important to note that items, which did not require cooking [130:no], also follow the same step in that they are added to the staff's processing list [300]. Then the item's information is forwarded to the staffs' terminal [310]. High priority items (e.g. item just cooked and need to be served while still hot) are moved to the top of the processing list [320]. Any available staff person may then select the item and specifies his/her name as the wait-staff handling the order [330]. The item is then registered in the particular staff's processing list (or simply assigned to that wait-staff) [380]. Simultaneously, items that were not prepared by a chef [340:no] are marked as in process on the server [350]. Once this occurs, an optional notification is sent to the customer, informing him/her that the item is being prepared [370], and at the same time, the cost of the item is also added to the customer's bill [360]. While these events are occurring, the wait-staff begins to handle or prepare the item [390] (e.g. fix a salad or pick up a cooked dish from the kitchen). Once finished, the wait-staff then takes the item to the customer [400].

If the customer is paying by cash and the establishment requires payment upon delivering the item to the customer [403:yes], then the customer pays the establishment [405].

To make the payment transaction smoother and avoid dealing with change, the establishment may accept an even bill denomination payment and maintain a running balance for the customer. Then, upon checkout, if the customer has paid an excess amount, that amount will be refunded to him/her upon checkout. This is one way to ensure that customers paying with cash cannot "eat and run". Although not depicted in the diagram, to prevent "order and run" situations, the establishment may also configure the system such that this check and balance/payment be performed before orders are actually sent to the kitchen for processing (step 110). If the customer is not paying by cash and the establishment does not require payment from the customer upon delivery of the item [403:no], the process continues as follows.

The wait-staff updates his/her processing list on the terminal or device to indicate that the item has been serviced or completed [410]. Once this is done, the customer's order status and billing information is updated [420], and information indicating that the item has been completed is written to the establishment's log file [430].

Depending on the establishment's preferences, it may display a dialog or question to the customer when certain conditions are met (e.g. all items completed) or when a certain amount of time passes, whether or not the customer has finished all ordering; the customer may also specify on his or her own free will that he/she has finished all ordering or not [440]. If the customer has finished all ordering [440:yes], then the customer indicates that he/she has indeed finished all ordering [450]. Otherwise [440:no], the customer may proceed to begin the ordering process all over again, beginning with step 25.

FIG. 8.3.2 is a diagram depicting the receipt specification process logic. This logic begins by the system asking the customer if he/she needs a receipt [10]. If a receipt is not needed [10:no], then the system simply saves the customer's receipt preferences [40]. If a receipt is in fact needed [10:yes], then the system asks the customer what type of receipt is needed [20]. If an email receipt [20:email] or a printed and email receipt [20:print & email] is required, then the customer specifies the email address(es) to which he/she would like the receipt to be sent [30]. The system then saves the customer's receipt preferences [40]. In the case the customer simply wants a printed receipt [20:print], then no other input is required and the system saves the customer's preferences [40].

FIG. 8.3.3 is a diagram depicting the discount (or promotion) and rewards points process logic. As the offering of discounts and/or promotions varies from establishment to establishment, a discount/promotion program is optional and depends on the preferences of the establishment [10]. If the establishment does not offer a discount/promotional program [10:no], the ensuing logic continues in the below section, entitled "Reward Points Logic". However, if the establishment does offer a discount/promotional program [10:yes], then the system asks the customer if he/she has a discount or promotional code [20].

If the customer does not have a discount or promotional code [30:no], the ensuing logic continues in the below section, entitled "Reward Points Logic". On the other hand, if the customer does have a discount or promotional code [30:yes], then he/she enters the discount or promotional code or, if previously saved and retrievable for the customer, selects the discount/promotion from a list [40]. Next, the system saves the customer's discount/promotion information [50], and displays the discount or promotion that will be applied to his/her order [60].

Reward Points Logic

The prefer embodiment of the system is to include the rewards point feature. However, given the complexity and the fact that many establishments may have their own reward system currently in place, it may not be included. Regardless, the logic has been included and it most likely will be implemented in the overall system.

If the system does not include the reward points feature [70:no], then the logic continues as specified in the below section, entitled "Continue". However, if the system does in fact include the reward points feature [70:yes], then a check must be performed to see whether the establishment has or offers a reward points program [80]. If the establishment does not offer a reward points program [80:no], then the logic continues as specified in the below section, entitled "Continue". Otherwise [80:yes], the system checks to see which device the customer is using to access the system [90].

In the case that the customer is using a mobile device [90:mobile], then the ensuing logic continues in the below section, entitled "Sufficient Reward Points Logic". If the customer is accessing the system from a terminal [90:terminal], then the system must see if it can determine the customer's reward points account information from when he/she logged into the system, if in fact he/she is logged in [100]. Customers, who are using mobile devices, will automatically have their reward points information stored because all mobile users are required to register for a system account in order to use the system. However, customers using terminal to access the system are not required to have registered for a system account. It may be possible to use a customer's cashless payment medium information, as a type of system account, to store his/her reward points information on the system. However, if this is not possible, then users of the terminal will be required to have a system or special points reward card in order to record their reward points information.

If the customer's reward points account information is able to be determined from his/her cashless payment medium [100:yes], then the ensuing logic continues in the below section, entitled "Sufficient Reward Points Logic". Otherwise, if not [100:no], then the system will ask the customer if he/she has a system/reward points card, account, or related information [110].

If the customer does not have a system/rewards point card/account/information [120:no], then the logic continues as specified in the below section, entitled "Continue". Otherwise [120:yes], the customer then inputs/swipes/transfers his/her reward points card, account, or its related information to the terminal [130].

Sufficient Reward Points Logic

The system then determines if the customer has a sufficient number of points, as determined by the establishment's preferences in accordance with their own customized reward points program, to receive a reward [140]. The type of reward offered varies according to the establishment's preferences and may include, but not limited to, a discount on the customer's bill or awarding complimentary order items to the customer. Fundamentally, reward points from one establishment will not be redeemable at another establishment, unless the establishment specifies otherwise, the establishments are part of a national or international chain, or establishments have entered into a partnership together to honor one another's reward points.

If the customer does not have enough points for a reward [150:no], then the logic continues as specified in the below section, entitled "Continue". However, if the customer does have enough points [150:yes], then the system will ask the customer if he/she would like the system to show his/her reward [160]. It is noted that the reason why the system asks the customer if he/she would like to "show" his/her reward is because it is quite possible that the customer may be with a party and may not necessary want others to see the reward that he/she has received. In other words, the customer may have accumulated points on his/her own and may want to show/use the reward at a time of his/her choosing, and not necessarily when with others. This is simply a small measure to maintain the customer's privacy and allow him/her to decide if/when to show and use the reward. It may be possible for the customer to override this check if he/she changes his/her system settings/preferences.

In the case that the customer chooses not to show his/her reward [170:no], then the logic continues as specified in the below section, entitled "Continue". Otherwise, if yes [170: yes], the system will display the reward [180] and ask the customer if he/she would like to use the reward [190]. It is possible, for one reason or another, that the customer may not wish to use the reward at the present time. However, the system will and the customer must also take into consideration any time limits set upon the reward by the establishment.

If the customer decides not to use the reward [200:no], then the logic continues as specified in the below section, entitled "Continue". Otherwise [200:yes], the system will apply the reward to the customer's order [210].

Continue

The process logic returns to the diagram that referenced this process logic diagram. FIG. 8.3.4 is a diagram depicting the process logic for updating a customer's reward points. The preferred embodiment of the system is to include the rewards point feature. However, given the complexity and the fact that many establishments may have their own reward system currently in place, it may not be included. Regardless, the logic has been included and it most likely will be implemented in the overall system.

If the system does not include the reward points feature [10:no], then the logic continues as specified in the below section, entitled "Continue". However, if the system does in fact include the reward points feature [10:yes], then a check must be performed to see whether the establishment has or offers a reward points program [20]. If the establishment does not offer a reward points program [20:no], then the logic continues as specified in the below section, entitled "Continue". Otherwise [20:yes], the system checks to see which device the customer is using to access the system [30].

In the case that the customer is using a mobile device [30:mobile], then the ensuing logic continues in the below section, entitled "Saving Reward Points Logic". If the customer is accessing the system from a terminal [30: terminal], then the system must determine if the customer previously input/swiped/transferred a card, account, or related information that contained his/her reward points information [40].

If the system did previously obtain the customer's reward points information [40:yes], then the ensuing logic continues in the below section, entitled "Saving Reward Points Logic". Otherwise [40:no], then the logic continues as specified in the below section, entitled "Continue".

Saving Reward Points Logic

The system saves the customer's reward points that were accumulated for his/her current visit [50].

Continue

The process logic returns to the diagram that referenced this process logic diagram. FIG. 8.3.5 depicts the process logic of the dynamic selling feature of the system. This process begins with the staff person selecting the dynamic selling option on his/her terminal [10]. Next, the staff person selects or inputs the item [20], which is to be sent dynamically (in real-time or near real-time) to all the devices that are currently in use at the establishment. In the next step, the staff person inputs the number of items to be offered (or quantity limit), the time limit (if applicable), and any other necessary options [30]. After the staff indicates that he/she is finished [40], the system will display the dynamic selling information for the specified item [50]. If the information is not acceptable to the staff person [60:no], then he/she can modify the information [70] and steps 50-60 are repeated. However, if the staff person confirms that all the information is correct [60:yes], the system then checks the devices that the logged-in customers are using at the establishment [80].

If the customer is using a terminal [80:terminal], then the ensuing logic continues in the below section, entitled "Send Dynamic Selling Information". In the case that the customer is using a mobile device [80:mobile], then the system will check the registered customer's device configuration information to determine if it is a messaging-aware device or if the program/technology supports messaging [90]. For purposes of this disclosure, "Messaging-aware" means that the mobile device and/or the program/technology deployed on the device allows it to receive asynchronous (one-way) messages/information from the server without first having to make a request (from the device to the server—synchronous) for messages/information.

In the situation where the customer's mobile device is truly messaging-aware [90:yes], then the ensuing logic continues in the below section, entitled "Send Dynamic Selling Information". Otherwise, if the customer's mobile device does not support messaging [90:no], then the system will check the customer's system preferences to see if he/she allows "polling" [100]. Polling is a technique used for devices that are not truly messaging-aware whereby the client (in this case, the customer's mobile device) accesses the server at a certain time interval to see if there are any messages/information available for the client/device.

If the customer has not enabled the polling feature for his/her mobile device [100:no], then the ensuing logic continues in the below section, entitled "Store Item Information Temporarily". However, if the customer has enabled his/her device for polling [100:yes], then two actions occur simultaneously. One action is described in the below section, entitled "Store Item Information Temporarily". The other action is that the program on the mobile device checks itself to see if the polling interval (to check the server for messages) has been reached [105]. If the polling feature on the mobile device has been activated previously, then the device is actually polling the server already at time intervals specified by the customer in his/her system preferences.

If the polling interval has been reached [105:yes], then the ensuing logic continues in the below section, entitled "Device Contacts Server". Otherwise, if the polling interval has not been reached [105:no], then the program on the mobile device waits a certain amount of time and then checks again to see if the polling interval has been reached [105].

Store Item Information Temporarily

The system stores the information for the dynamic selling item in the customer's polling queue on the server [110] until he/she next access the server. Almost any action the customer makes on his/her mobile device will need to contact the server. As such, the next time the customer accesses the system, which makes a call to the server that is holding the dynamic selling item information for the customer [110: customer access], the logic proceeds with that described in the below section, entitled "Device Contacts Server".

Device Contacts Server

When the customer's mobile device contacts the server [113], the system checks to see if the dynamic selling item is still valid [116]. The validity check is important as the dynamic selling item may have an available quantity or time limit restriction placed on it by the staff person. As a result, the system needs to make sure that the item is still available for dynamic selling.

In the event that the dynamic selling item is no longer valid [120:no], then the system will notify the customer of such and the process ends [125]. Otherwise, if the item is still available [120:yes], the ensuing logic continues in the below section, entitled "Send Dynamic Selling Information".

Send Dynamic Selling Information

The server sends the information regarding the dynamic selling item to the device [130]. After the staff person has confirmed the dynamic selling item's information (previously described), all messaging-capable devices receive this information. However, as described above, non-messaging-capable devices may or may not receive the information, if the dynamic selling item is no longer valid/available.

Next, the information for the dynamic selling item is displayed on the appropriate device (terminal or mobile device) [140]. If the customer does not wish to order the item [150:no], then the system returns the customer to the previous screen that he/she was viewing [160] and the dynamic selling process logic ends.

In the case that the customer is interested in ordering the item [150:yes], then he/she selects the item quantity (if possible; the staff person may have specified that the item is limit one per customer) and specifies for whom the item is for (optional), preparation options, and any other necessary information [170]. Next, the customer selects the send option on the device that he/she is using [180], and the system sends the order to the server [190].

Since the dynamic selling feature is basically first-come-first-serve, it is possible that other customers may have been first to claim the item since a customer sent the dynamic selling item's order to the server. As such, the system (again) needs to check if the dynamic selling item is still valid/available [200].

If the item is not available [200:no], then the system notifies the customer of the item's availability status [210], in this case, that the item is unfortunately no longer available. However, in the event that the dynamic selling item is available [200:yes], then two actions occur simultaneously. One, the system notifies the customer of the item's availability status [210]. In this case, the customer is notified that his/her order for the item has been accepted. The other action that occurs is the execution of steps 104-430 in the Order Processing Logic of FIG. 8.3.1 [220].

The preferred embodiment includes a method for ordering food and drink for one or more food service establishments over a wide area computer network. The method has its deployment through at least one wireless device of a customer having a touch screen. The method then routes through a central processing center independent of the food service establishment. More particularly, the method has these steps: 1) receiving the orders in said central processing center; 2) forwarding, or transmitting, the orders from the central processing center's computer server to the food service establishments; 3) monitoring quantity of food and drink of an order along with related data and statistics; and 4) denoting cashless payment of an order and generating an electronic receipt for the order.

Receiving the orders in the central processing center utilizes order information that encodes components of an order at time of entry for later usage through a food service establishment. The order information begins with an establishment code within each of the orders and that establishment code identifies a food service establishment. The method also adds food and drink items to the order information from a predetermined list. Adding of food and drink items occurs by receiving key strokes from the customer's device into the invention. The keystrokes denote an item code corresponding to each food and each drink listed on a menu.

Forwarding the orders, or transmitting them, from the central processing center's computer server utilizes the establishment code from the order information and sends the order information to the corresponding food service establishment. This forwarding preferably occurs over a secure electronic communications network. That network often has short message service, texting, and other forms of instantaneous messaging that travels bi-directionally. Moreover, the invention, through the forwarding of the orders, communicates continuously with the food service establishments. The forwarding the orders communicates solely and directly to the food service establishments.

Monitoring quantity of food and drink of an order augments the establishment code and further operates the order information. The monitoring tracks the customer who placed the order, the time of placement of the order, the preparation and cooking time of the order, scheduled time of arrival of the order at the customer's seat, the actual arrival time of the order at the customer's seat, and of course the food service establishment that the customer selected when beginning an order.

The monitoring quantity of food and drink of an order then includes additional steps. The first additional step has applying a time stamp to each of the orders upon placement of it by a customer. The second additional step then has identifying the time of each order reaching a food service establishment and the time of each order departing a food service establishment. The second step then calculates the amount of time to fulfill the orders at a food service establishment. Thirdly, the monitoring has calculating a time of arrival of each of the orders to a customer. The fourth step then has applying a time stamp to each of the orders upon actual arrival of each order to a customer, more particularly his seat or bar position. The fourth step then calculates the amount of time between actual arrival and the calculated arrival time at order placement for each order. The fifth step has checking the amount of time to fulfill each order at a food service establishment and the amount of time between actual arrival and the calculated arrival time of an order. The additional steps of the monitoring just described allow an operator of the invention to check its performance during usage.

Eventually, an order comes to an end upon arrival to the customer seated at a restaurant table, or perhaps standing at the bar. Orders end with payment and described above. Here the method of the invention denotes cashless payment for the order by the customer on his choice of payment. The method of the invention then generates an electronic receipt and sends it to an electronic destination specified by the customer.

Along with the above four steps, the method also has identifying the leader of a dining party. This identifying designates to a seat position, who will pay for the meal and control ordering, distinctly from the other members of the dining party. The method also performs computing the payment of tips and gratuities based on the location of the customer's wireless device in a country and compares that to cultural preferences for that country.

The method then has additional components such as providing browsing and pre-ordering menu items by a customer using his wireless device, displaying seating availability and providing to the customer a seat reservation in the food service establishment using the wireless device. The forwarding step of the method, or transmitting step, also has communicating upon an always on feed with the food service establishments and communicating bi-directionally in real time with the food service establishments.

Turning to another form of the preferred embodiment, a system for food and drink orders at a food service establishment begins with at least one wireless mobile communication device operated by a customer and a central processing center containing at least one computer server away from and independent of the food service establishment, and a non-transitory computer readable media that has within it computer readable instructions for receiving the orders in the central processing center's computer server and then forwarding the orders to the food service establishment. This system further utilizes an order information that has multiple, or a plurality of fields, that denote the components of an order. The fields include an order identification field, timestamp field, a customer field, an establishment field, a food items field, a drink items field also called a beverage item field, a table field, a seat field, and a terminal field. This order information encodes a food and drink order for transmission from a customer's wireless mobile communication device to the computer server at the central processing center, and then on to the food service establishment for cooking and presentation to the customer.

The order information operates as a string of components, such as characters, to encode an order for successful transmission. Let's look at the fields closer. The establishment field identifies a food service establishment with a unique string of characters, often five or six characters. The terminal field identifies a place within a food service establishment for one or more wait staff and uses at least one character for the field. The food items field identifies an edible item with a unique identification string of characters, often at least four characters, and the drink items field, or beverage field, also has a unique identification string of characters, often at least four characters, for a drinkable item. The table field marks or identifies a dining table within a food service establishment by using at least three characters. Tables have seats and the seat field identifies, or shows, a seat at a table from the table field also with at least one character.

The system has the order information with selected sequence of characters, or components. The order information embeds the order identification field, the timestamp field, the establishment field, the customer field, the terminal field, the table field, the seat field, the food items field, and the drink items field, also called the beverage items field. The food items field contains the food items of an order where each food item has a unique identifier, its size, its quantity, and the customer's preparation preferences, such as medium well or sautéed. The drink items field contains the drink items of an order where each drink item has its unique identifier that also has its size, its quantity, and the customer's preparation preferences, such as shaken or stirred. The food items field and the drink items field locate between the establishment field and the terminal field. This sequence of components produces a string of characters representing the order information having a minimum length of twenty-four characters. As needed, the order information lengthens in number of characters, or elongates, in an increment, such as three characters, for each entry in the food items field and in the drink items field.

The order information uses its components for additional functions. Those functions include the following ones. The order information tracking an order and payment status. The order information identifying a leader of a dining party with a special leader field. The order information providing information of an order, such as pricing and total price, for computation of recommended tips and gratuities based on the location of the customer's wireless device in a country compared to a table of cultural preferences for that country. The system of the invention coordinates with the establishment field, the table field, and the seat field thus, displaying seating availability and reservations in the food service establishment upon the customer's device.

The system of the invention has the order information, each individual item encodes in the food items field filling its unique identifier of characters by manual input of a food item identifier, by selecting textual lists displayed on the device, and by selecting from graphical lists displayed on the mobile communication device. The invention's system also coordinates with the establishment field, the food items field, and the drink items field aggregating the food item characters and the beverage characters for subsequent processing by a section of the food service establishment most appropriate for processing an individual menu item. The order information assembles and marshals information into a form for compact real time transmission from a customer's device into the central processing server. Meeting those goals, the order identification field has a structure of:

OOOOOOOOOOOOOOOOOOOOOOOOOOO-
OOOOOOOOO.

In this structure, O represents one character in a string of characters forming the order identification field. The structure above has thirty-six characters as the expected minimum number of characters, that is, at least thirty-six characters. The timestamp field has an expected length of sixteen characters, the establishment field has an expected length of ten characters, the customer identification field has an expected length of thirty-six characters, the table field has an expected length of three characters and the seat field of two characters. Then the food items field has for each embedded individual food item field having an expected length of at least 10 characters, and said drink items field has for each embedded individual drink item field having an expected length of at least 10 characters.

In accordance with the detailed descriptions of the present invention in the above sections, the main advantages are that the system: makes use of hardware devices, namely internet-capable, mobile devices and specially designed thin terminals, that are optimal for use at food service establishments and that customers can use to place orders wirelessly without staff intervention; provides a complete order processing solution, addressing order placement, fulfillment, and payment settlement; is cost effective, in that the system is built upon primarily open-source software such as Linux; is reliable, in that the server implements fault-tolerance and redundancy, and that establishments' critical data is backed up frequently off-site and its systems constantly monitored for errors; is secure, in that a visit code is used to ensure that customers placing orders are actually present at the establishment and that sensitive communications and data are always encrypted; makes establishments' operations more efficient by splitting orders to be directed to either the staff or the chef(s) and by grouping similar order items in the wait queue to be processed together; significantly reduce customer wait times since the customer no longer needs to wait for a staff person to 1) present him/her with a menu (restaurant setting), 2) take his/her order, and 3) process payment, in addition to the speed gained from other recognized efficiencies; further reduce wait times and increase table turnover by offering customers the ability to browse/pre-order while waiting; improve customer service and the customer's overall experience at food service establishments since customers spend less time waiting and some staff's responsibilities can be re-assigned to ensure that customers are satisfied and have no questions nor concerns; alleviate establishments' concerns over labor shortage and cost since the system will be able to handle some of the roles previously performed by overworked and understaffed employees; consolidate customers' management of reward points in a single place; and allow more sales opportunities for establishments to dynamically promote and/or reduce inventories of certain items.

The descriptions and examples, given above, should not be interpreted as limitations on the possible scope of the invention. As other variations are feasible, the scope of this invention is determined by the claims and their legal equivalents.

I claim:

1. A method for ordering food and drink for one or more food service establishments over a wide area computer network upon at least one wireless device of a customer having a touch screen through a central processing center independent of the food service establishment, said method comprising:
   receiving the orders in said central processing center including an establishment code within each of the orders, each establishment code identifying a food service establishment;
   forwarding the orders from said central processing center's computer server to each of the food service establishments specified in said establishment codes over a secure electronic communications network;
   monitoring quantity of food and drink of an order, the customer who placed the order, time of placement of the order, preparation and cooking time of the order, scheduled time of delivery of the order, actual time of delivery of the order, and the food service establishment for which the order was placed; and,
   denoting cashless payment of an order and generating an electronic receipt to an electronic destination specified by said customer.

2. The method of claim 1 further comprising:
   adding food and drink to the order from a predetermined list.

3. The method of claim 1 further comprising:
   adding food and drink to the order by receiving key strokes denoting an item code corresponding to each food and each drink listed on a menu.

4. The method of claim 1 further comprising:
   said forwarding the orders communicating continuously with the food service establishments.

5. The method of claim 4 further comprising:
   said forwarding the orders communicating solely and directly to the food service establishments.

6. The method of claim 1 further comprising:
   said monitoring quantity of food and drink of an order including;
   applying a time stamp to each of said orders upon placement;
   identifying a time of each of said orders reaching a food service establishment and calculating the amount of time to fulfill said orders at a food service establishment:
   calculating a time of arrival of each of said orders to a customer;
   applying a time stamp to each of said orders upon actual arrival of each of said orders to a customer; and,
   checking the amount of time to fulfill each of said orders at a food service establishment and the amount of time between actual arrival and the calculated arrival time of each of said orders.

7. The method of claim 1 further comprising:
   identifying a leader of a dining party who will pay for the order and control ordering distinctly from the other members of dining party; and,
   computing the payment of tips and gratuities based on the location of said at least one wireless device in a country based on cultural preferences for that country.

8. The method of claim 1 further comprising;
   providing browsing and pre-ordering menu items by a customer using said at least one wireless device; and,
   displaying seating availability and providing to the customer a seat reservation in the food service establishment using said at least one wireless device.

9. The method of claim 1 further comprising:
   said forwarding the orders communicating upon an always on feed with the food service establishments.

10. The method of claim 9 further comprising:
    said forwarding the orders communicating bi-directionally in real time with the food service establishments.

11. A system for food and drink orders at a food service establishment having at least one wireless mobile communication device operated by a customer and a central processing center, containing at least one computer server away from and independent of said food service establishment, for receiving the orders from said wireless mobile communication device, then forwarding the orders to the food service establishment wherein the improvement comprises;
    an order information, said order information having a plurality of fields denoting components of an order;
    said fields including order identification field, timestamp field, customer field, establishment field, food items field, drink items field, table field, seat field, and terminal field; and,
    said order information encoding a food and drink order for transmission from said wireless mobile communication device to said at least one computer server at central processing center, and then to said food service establishment for preparation and delivery.

12. The system of claim 11 further comprising:
    said establishment field having a string of characters to identify the food service establishment; and,
    said terminal field identifying a place within a food service establishment for one or more staff with at least one character.

13. The system of claim 12 further comprising:
    said food items field identifying edible items, each item having a unique identification string of characters;
    said drink items field identifying drinkable items, each item having a unique identification string of characters;
    said table field identifying a dining table within a food service establishment with three characters; and, said seat field identifying a seat at a table denoted by said table field with at least one character.

14. The system of claim 13 further comprising:
said order information embedding said order identification field, said timestamp field, said establishment field, said customer field, said terminal field, said table field, said seat field, said food items field, and said drink items field;
said food items field containing food items, each having a unique identifier, size info, quantity, and preparation preferences:
said drink items field containing drink items, each having a unique identifier, size info, quantity, and preparation preferences.

15. The system of claim 14 further comprising:
said order information tracking an order and payment status;
said order information identifying a leader of a dining party with a special party leader field;
said order information providing information of an order for computation of recommended tips and gratuities based on the location of said at least one wireless device in a country compared to a table of cultural preferences for that country;
said system in coordination with said establishment field, said table field, and said seat field displaying seating availability and reservations in said food service establishment upon said device;
each individual food item of said food items field being entered by one of manual input of the food item identifier, of selection from textual lists displayed on said device, and of selection from graphical lists displayed on said mobile communication device; and,
said system in coordination with said establishment field, said food items field, and said drink items field aggregating said food items and said drink items for subsequent processing by a section of the food service establishment most appropriate for processing said individual menu item.

16. The system of claim 15 further comprising:
said order identification field having the structure of OOOOOOOOOOOOOOOOOOOOOOOOOO-OOOOOOOOOO;
wherein said order identification field has at least 36 characters;
a timestamp field of 16 characters,
said establishment field of 10 characters,
a customer identification field of 36 characters,
said table field of 3 characters,
said seat field of 2 characters,
said food items field, each embedded individual food item field having at least 10 characters, and said drink items field, each embedded individual drink item field having at, least 10 characters.

17. A method for ordering food and drink for one or more food service establishments over a wide area computer network upon at least one wireless device of a customer having a touch screen through a central processing center independent of the food service establishment, said method comprising:
providing browsing and pre-ordering menu items by a customer using said at least one wireless device;
receiving the orders in said central processing center including an establishment code within each of the orders, each establishment code identifying a food service establishment;
transmitting the orders from said central processing center's computer server to each of the food service establishments specified in said establishment codes over a secure electronic communications network;
monitoring quantity of food and drink of an order, the customer who placed the order, time of placement of the order, preparation and cooking time of the order, actual time of arrival of the order, and the food service establishment for which the order was placed;
said monitoring quantity of food and drink of an order including:
applying a time stamp to each of said orders upon placement;
identifying a time of each of said orders reaching a food service establishment and a time of each of said orders reaches completion by staff, and calculating the amount of time to prepare said orders at a food service establishment;
applying a time stamp to each of said orders upon arrival of each of said orders to a customer, and calculating the amount of time between preparation completion by staff and the time of each of said orders arrives at a customer; and,
checking the overall amount of time to fulfill each of said orders at a food service establishment from the time each of said orders commences and the time each of said orders reaches a customer;
said transmitting the orders data continuously, securely, and bi-directionally, said transmitting the orders is adapted to operate over a wide area computer network between wireless device of a customer and a central processing center, and between said central processing center and food service establishments;
identifying a leader of a dining party distinctly from other members of a dining party wherein said identifying denotes who will pay for the order and control ordering;
displaying seating availability and providing to the customer a seat reservation in the food service establishment using said at least one wireless device;
computing the payment of tips and gratuities based on the location of said at least one wireless device in a country based on cultural preferences for that country; and,
denoting cashless payment of an order and generating an electronic receipt to an electronic destination specified by a customer.

18. The method of claim 17 further comprising:
providing an order information, said order information having a plurality of fields denoting components of an order;
said fields including, order identification field, timestamp field, customer field, establishment field, food items field, drink items field, table field, seat field, and terminal field;
said establishment field identifying a food service establishment with a unique string of characters;
said terminal field identifying a place with a food service establisher ent for one or more establishment staff with at least one character;
said food items field identifying edible items, each item having a unique identification string of characters;
said drink items field identifying drinkable items, each item having a unique identification string of characters;
said table field identifying a dining table within a food service establishment with at least one character;
said seat field identifying a seat at a table denoted by said table field with at least one character;
said order information embedding said order identification field, timestamp field, said establishment field, said customer field, said terminal field, said table field, said seat field, said food items field, and said drink items field;

said food items field containing food items, each having a unique identifier, size info, quantity, and preparation preferences:

said drink items field containing drink items, each having a unique identifier, size info, quantity, and preparation preferences;

said order information encoding a food and drink orders for transmission from said wireless mobile communication device to said at least one computer server at the central processing center, and then to said food service establishment for preparation and delivery.

\* \* \* \* \*